US012467277B2

(12) United States Patent
McKibben et al.

(10) Patent No.: US 12,467,277 B2
(45) Date of Patent: Nov. 11, 2025

(54) DOOR HARDWARE NOISE REDUCTION AND EVALUATION

(71) Applicant: Schlage Lock Company LLC, Carmel, IN (US)

(72) Inventors: Aaron P. McKibben, Fishers, IN (US); Gregory Musselman, Indianapolis, IN (US); Brian C. Eickhoff, Danville, IN (US); Benjamin L. Miller, Indianapolis, IN (US); Paul R. Arlinghaus, Fishers, IN (US); Vijayakumar Mani, Bangalore (IN); Saagar Mohammed, Alappuzha (IN)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 17/573,305

(22) Filed: Jan. 11, 2022

(65) Prior Publication Data

US 2022/0349212 A1 Nov. 3, 2022

Related U.S. Application Data

(63) Continuation of application No. 16/058,249, filed on Aug. 8, 2018, now Pat. No. 11,220,838.

(Continued)

(51) Int. Cl.

*E05B 65/10* (2006.01)
*E05B 17/00* (2006.01)

(52) U.S. Cl.

CPC ...... *E05B 17/0041* (2013.01); *E05B 17/0045* (2013.01); *E05B 65/1006* (2013.01); *E05B 65/1053* (2013.01)

(58) Field of Classification Search

CPC ............. E05B 17/0041; E05B 17/0045; E05B 65/1006; E05B 65/1053; E05B 1/003;

(Continued)

(56) References Cited

U.S. PATENT DOCUMENTS 2,098,776 A 11/1937 Edwards
3,097,007 A * 7/1963 Eichacker ........... E05B 65/1013 70/92

(Continued)

FOREIGN PATENT DOCUMENTS

EP 2439363 A2 4/2012
EP 3453817 A1 * 3/2019

(Continued)

OTHER PUBLICATIONS

Australian Examination Report; IP Australia; Australian Patent Application No. 2018313165; Feb. 2, 2022; 3 pages.

(Continued)

*Primary Examiner* — Kristina R Fulton
*Assistant Examiner* — Noah Horowitz
(74) *Attorney, Agent, or Firm* — Taft Stettinius & Hollister LLP

(57) ABSTRACT

An exemplary noise-reducing mechanism for door hardware includes a housing, a damper, and a stop. The door hardware includes a first component and a second component, and an operational movement of the door hardware causes relative movement of the first and second components. The housing is mounted to the first component, and the damper is mounted to the housing. The stop is mounted to the second component such that the stop engages the damper during the operational movement. The damper is configured to slow the operational movement, thereby reducing noise generated by operation of the door hardware.

19 Claims, 25 Drawing Sheets

Related U.S. Application Data

(60) Provisional application No. 62/667,807, filed on May 7, 2018, provisional application No. 62/545,898, filed on Aug. 15, 2017, provisional application No. 62/542,758, filed on Aug. 8, 2017.

(58) Field of Classification Search
CPC .. E05B 65/10; E05B 65/1046; E05B 65/1093; E05B 65/106; E05B 65/30; E05B 81/30; Y10T 292/0908; Y10T 292/0909; Y10T 292/091
USPC .......................................... 292/92, 94; 70/92
See application file for complete search history.

(56) References Cited

U.S. PATENT DOCUMENTS 3,767,238 A 10/1973 Zawadzki
4,418,552 A * 12/1983 Nolin .................. E05B 65/1086 70/92
4,765,444 A * 8/1988 Bauer ..................... D06F 37/20 188/129
4,796,931 A 1/1989 Heid
4,839,988 A 6/1989 Betts et al.
4,934,800 A * 6/1990 Choi ....................... E05B 53/00 292/DIG. 60
4,982,986 A * 1/1991 Gressett, Jr. ............ E05B 53/00 292/336.3
4,988,136 A * 1/1991 Gressett, Jr. ............ E05B 3/065 292/336.3
5,067,757 A 11/1991 Cohrs et al.
5,088,786 A * 2/1992 Linder ................ E05B 65/1066 292/336.3
5,129,879 A 7/1992 Mattson
5,205,596 A * 4/1993 Ralph ..................... E05B 3/065 292/336.3
5,290,077 A 3/1994 Fleming
5,445,423 A * 8/1995 Mader ................... E05B 15/004 292/336.5
5,520,427 A * 5/1996 Mader ....................... E05C 9/04 70/222
5,564,760 A * 10/1996 Mader ................. E05B 17/0058 292/336.3
5,570,916 A * 11/1996 Mader ................... E05B 13/005 292/336.3
5,611,227 A * 3/1997 Solovieff ................ E05B 55/06 70/DIG. 73
5,658,026 A * 8/1997 Nigro, Jr. .............. E05B 13/002 70/210
5,904,232 A 5/1999 Shen
6,409,238 B1 6/2002 Mikenis et al.
6,536,080 B2 3/2003 Bella et al.
6,733,049 B2 5/2004 Piorkowski et al.
7,007,341 B2 3/2006 Wang
7,201,409 B2 * 4/2007 Adachi ..................... E05C 5/00 292/341.15
7,216,402 B2 * 5/2007 Nishiyama .............. E05B 77/42 292/336.3
7,257,973 B2 * 8/2007 Romero .................... E05B 9/02 292/336.3
7,634,927 B1 * 12/2009 Tien ...................... E05B 13/004 70/DIG. 60
7,740,116 B2 6/2010 Cultraro
7,815,228 B2 10/2010 Grunow et al.
7,975,351 B2 7/2011 King
8,001,818 B2 * 8/2011 Imedio .................... E05B 63/16 70/222
8,011,702 B2 * 9/2011 Tien .................... E05B 65/1006 70/92
8,042,660 B2 10/2011 Cultraro
8,123,262 B2 2/2012 Meernik et al.
8,267,441 B2 * 9/2012 Lin ......................... E05C 9/048 292/DIG. 65
8,267,442 B2 * 9/2012 Tien ........................ E05B 53/00 292/93
8,544,898 B2 10/2013 Zimmer et al.
8,616,591 B2 12/2013 Parker
8,776,315 B2 7/2014 Wach et al.
8,824,148 B2 9/2014 Kim
8,959,710 B2 2/2015 Wach et al.
9,545,152 B2 1/2017 Egger
9,617,760 B2 * 4/2017 Dragon ................... E05B 77/36
9,617,763 B2 * 4/2017 Graute .................... E05B 15/04
9,663,969 B2 5/2017 Lila
9,828,793 B2 11/2017 Shah
10,385,895 B2 * 8/2019 Fiedler .................. E05B 47/004
10,493,871 B2 * 12/2019 Tone .................... B60N 2/2245
2005/0262906 A1 * 12/2005 Romero .............. E05B 63/0056 70/107
2008/0012350 A1 1/2008 Condo et al.
2010/0026012 A1 2/2010 Lin
2010/0253101 A1 10/2010 Seto et al.
2012/0032455 A1 2/2012 Lin
2012/0126548 A1 5/2012 Zhuo
2012/0261928 A1 10/2012 Dye et al.
2013/0276375 A1 10/2013 Carmona et al.
2014/0109479 A1 4/2014 Morstatt et al.
2014/0217752 A1 * 8/2014 Lujan ...................... E05B 77/38 292/216
2015/0035298 A1 * 2/2015 Yokoo ................. E05B 17/0041 292/336.3
2015/0184426 A1 7/2015 Arlinghaus et al.
2015/0240540 A1 8/2015 John
2016/0115719 A1 4/2016 Coleman et al.
2016/0130846 A1 5/2016 Shah
2016/0177611 A1 6/2016 Rissone
2016/0258195 A1 9/2016 Fukumoto
2016/0326771 A1 11/2016 Qi
2016/0333621 A1 11/2016 Lehner, Jr. et al.
2016/0340942 A1 11/2016 Anderson et al.
2017/0191288 A1 7/2017 Lin
2017/0275918 A1 9/2017 Colligan
2018/0044955 A1 2/2018 Shah
2018/0148955 A1 5/2018 Yalamati et al.

FOREIGN PATENT DOCUMENTS

GB 2214556 A 9/1989
GB 2325020 A * 11/1998 ......... E05B 17/0058
WO 1995013445 A1 5/1995
WO 2000050710 A1 8/2000
WO 2013024202 A1 2/2013
WO 2018/102351 A2 6/2018

OTHER PUBLICATIONS

Australian Examination Report; IP Australia; Australian Patent Application No. 2018313165; Jan. 20, 2022; 4 pages.
New Zealand Examination Report; New Zealand Intellectual Property Office; New Zealand Patent Application No. 762892; Mar. 3, 2022; 3 pages.
Australian Examination Report; IP Australia; Australian Patent Application No. 2022202985; Jun. 9, 2023; 11 pages.
New Zealand Examination Report; New Zealand Intellectual Property Office; New Zealand Patent Application No. 762892; Oct. 18, 2021; 5 pages.
Extended European Search Report; European Patent Office; European Patent Application No. 18843938.4; Apr. 16, 2021; 9 pages.
Australian Examination Report; IP Australia; Australian Patent Application No. 2018313165; Mar. 1, 2021; 5 pages.
International Search Report; International Searching Authority; International Application No. PCT/US2018/045756; Dec. 26, 2018; 5 pages.
Written Opinion; International Searching Authority; International Application No. PCT/US2018/045756; Dec. 26, 2018; 8 pages.
Allegion; Von Duprin 990 Series Outside Trim Service Manual; 28 pages; Copyright 2017 Allegion.
European Examination Report; European Patent Office; European Patent Application No. 18843938.4; Mar. 31, 2023; 6 pages.

(56) References Cited

OTHER PUBLICATIONS

Australian Examination Report; IP Australia; Australian Patent Application No. 2022202985; Aug. 31, 2023; 4 pages.
Canadian Examination Report; Canadian Intellectual Property Office; Canadian Patent Application No. 3,183,917; Apr. 25, 2024; 4 pages.
New Zealand Examination Report; New Zealand Intellectual Property Office; New Zealand Patent Application No. 792795; Aug. 7, 2024; 3 pages.
New Zealand Examination Report; New Zealand Intellectual Property Office; New Zealand Patent Application No. 792795; Aug. 16, 2024; 1 page.
New Zealand Examination Report; New Zealand Intellectual Property Office; New Zealand Patent Application No. 792795; Jul. 2, 2024; 5 pages.
New Zealand Examination Report; New Zealand Intellectual Property Office; New Zealand Patent Application No. 792795; Jul. 22, 2024; 3 pages.
New Zealand Examination Report; New Zealand Intellectual Property Office; New Zealand Patent Application No. 792795; Jul. 17, 2024; 3 pages.
Examination Report No. 1; IP Australia; Australian Patent Application No. 2024200251; Mar. 6, 2025; 5 pages.
Australian Examination Report; Australian Intellectual Property Office; Australian Patent Application No. 2024200251; Jul. 14, 2025; 4 pages.

* cited by examiner

DOOR HARDWARE NOISE REDUCTION AND EVALUATION

CROSS-REFERENCE TO RELATED APPLICATIONS

The present application is a continuation of U.S. patent application Ser. No. 16/058,249 filed Aug. 8, 2018 and issued as U.S. Pat. No. 11,220,838, which claims the benefit of U.S. Provisional Patent Application No. 62/542,758 filed Aug. 8, 2017, U.S. Provisional Patent Application No. 62/545,898 filed Aug. 15, 2017, and U.S. Provisional Patent Application No. 62/667,807 filed May 7, 2018, the contents of each application are hereby incorporated herein by reference in their entirety.

TECHNICAL FIELD

The present disclosure generally relates to the reduction and evaluation of the noise generated during the operation of door hardware, and more particularly but not exclusively relates to systems and methods for reducing and evaluating the noise generated during the operation of exit devices.

BACKGROUND

Acoustic noise is becoming a growing concern in many different environments, including theaters, auditoriums, schools, libraries, and healthcare settings. Noise is of particular concern in healthcare settings, such as hospitals, nursing homes, and mental health facilities. In healthcare settings, a loud environment can affect the sleep of patients, which can be detrimental to their recovery times. Noise is often one of the lowest scoring items on patient surveys, which can lead to lower reimbursements to the medical facility. In addition to disturbing patients, noise can also be distracting or bothersome to the medical staff, and may lead to loss of focus and errors.

In many settings, door hardware can be a significant factor contributing to undesirable environmental noise. When a person enters or exits a room through a door, the hardware can make loud and distracting sounds. Building codes and other regulatory requirements often dictate that certain doors be equipped with exit devices, which can be louder than certain other types of door hardware. While many manufacturers have made efforts to reduce the noise generated by their devices, certain conventional exit devices nonetheless generate noise in excess of the maximum recommended levels set forth in industry guidelines.

The door hardware industry has many formal standards governed by third parties, including UL (formerly known as Underwriters Laboratories), the Builders Hardware Manufacturers Association (BHMA), the American National Standards Institute (ANSI), and others. These standards are used within the industry to standardize the methods of evaluating and quantifying the performance of products in a number of categories, including longevity, strength, environmental impact, and actuation forces. However, there is not currently an industry-wide standard for evaluating and quantifying the sound output performance of door hardware. This has led to variations in the manner in which noise generation is evaluated and quantified by different industry groups, such as hardware manufacturers and standards organizations. With different metrics being used by different groups, potential consumers may find it difficult to evaluate the sound output performance of a variety of types of door hardware in like-for-like comparisons.

As is evident from the foregoing, certain conventional exit devices generate more noise than is desirable in many environments. Additionally, the lack of an industry-accepted standard for quantifying the noise generation of door hardware has hindered the development of a common metric by which the noise performance of different types of door hardware can be compared and evaluated. For these reasons among others, there remains a need for further improvements in this technological field.

SUMMARY

An exemplary noise-reducing mechanism for door hardware includes a housing, a damper, and a stop. The door hardware includes a first component and a second component, and an operational movement of the door hardware causes relative movement of the first and second components. The housing is mounted to the first component, and the damper is mounted to the housing. The stop is mounted to the second component such that the stop engages the damper during the operational movement. The damper is configured to slow the operational movement, thereby reducing noise generated by operation of the door hardware. Further embodiments, forms, features, and aspects of the present application shall become apparent from the description and figures provided herewith.

DETAILED DESCRIPTION OF ILLUSTRATIVE EMBODIMENTS

Figure 1:
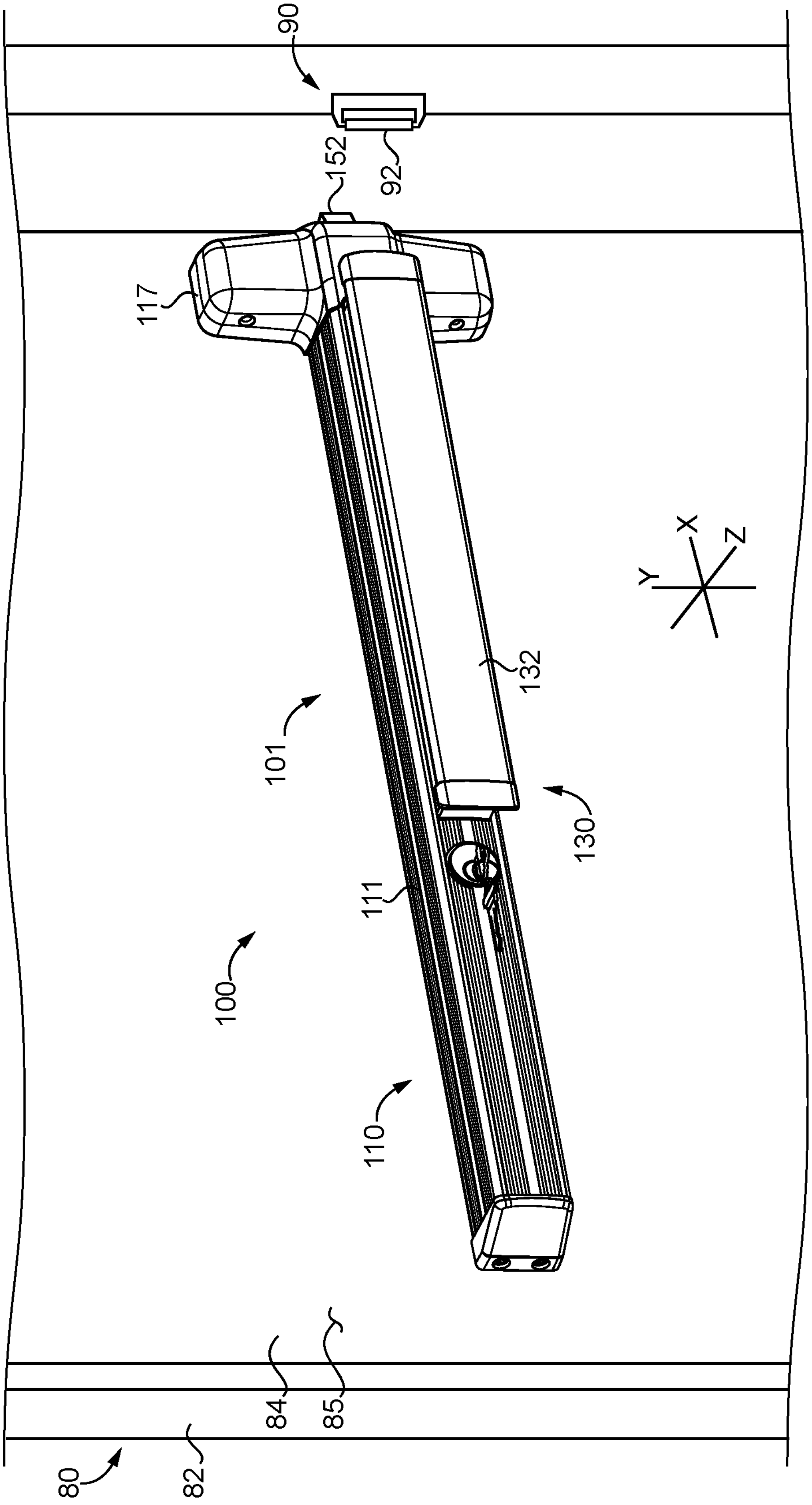
FIG. 1 is an illustration of an exit device installed to a door.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

As used herein, the terms "longitudinal," "lateral," and "transverse" are used to denote motion or spacing along three mutually perpendicular axes. In the coordinate system illustrated in FIGS. 1 and 2, the X-axis defines the longitudinal directions, the Y-axis defines first and second lateral directions, and the Z-axis defines first and second transverse directions. Additionally, the longitudinal directions may alternatively be referred to as the proximal direction (to the right in FIG. 2) and the distal direction (to the left in FIG. 2). These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements which are described as being "laterally offset" from one another may also be offset in the longitudinal and/or transverse directions, or may be aligned in the longitudinal and/or transverse directions. The terms are therefore not to be construed as limiting the scope of the subject matter described herein.

Referring now to FIG. 1, illustrated therein is a closure assembly 80 including a frame 82 and a swinging door 84 pivotally mounted to the frame 82. The door 82 has an interior side face 85 and an opposite exterior side face. The door 84 is mounted to the frame 82 by a set of hinges such that a pushing force on the interior side face 85 urges the door 84 to swing outwardly in an opening direction. An exit device 100 is mounted to the interior side face 85 of the door 84, and is configured to interact with a strike 90 to selectively retain the door 84 in a closed position relative to the frame 82. While other forms are contemplated, the illustrated strike 90 is mounted to the interior side of the frame 82, and includes a roller 92.

Figure 2:
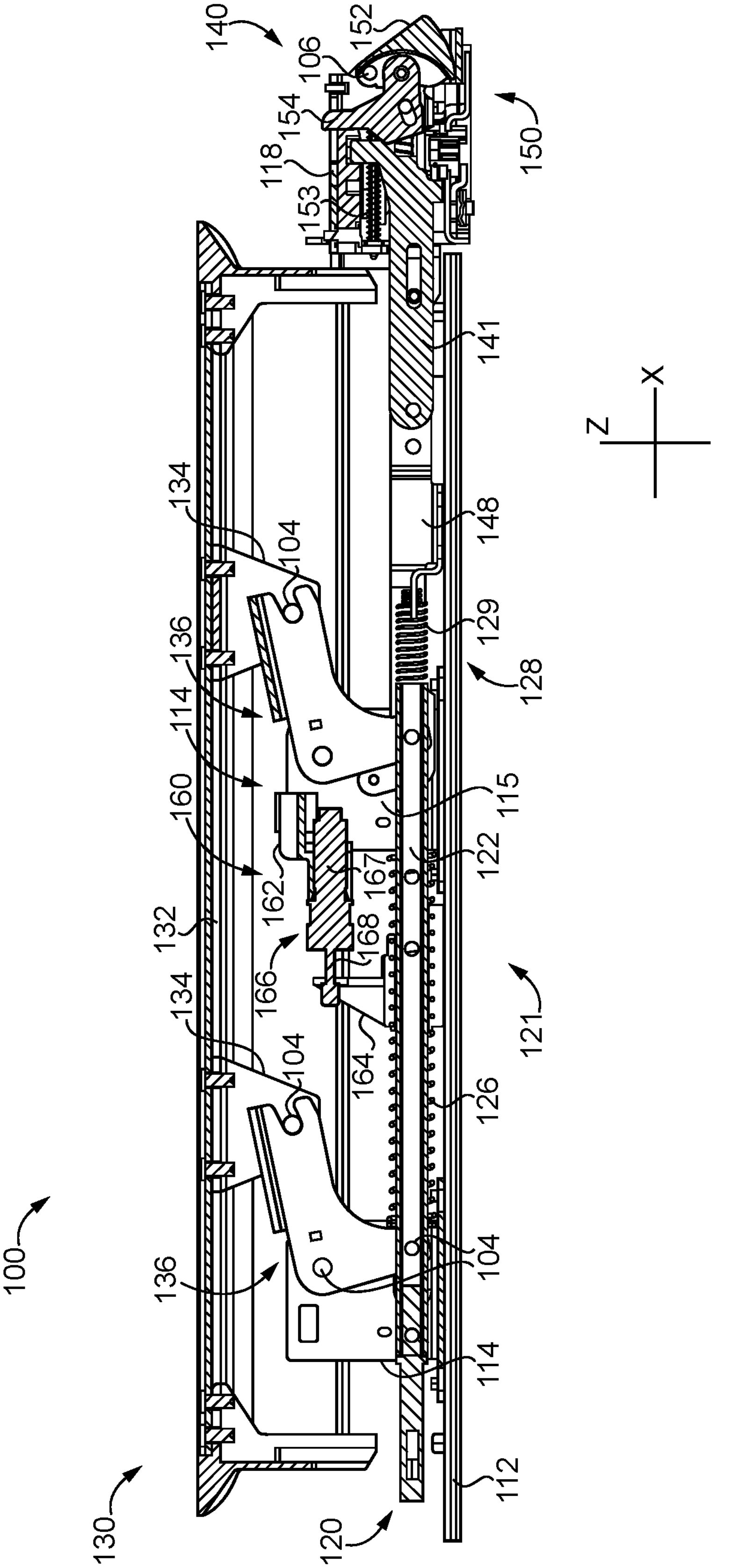
FIG. 2 is a cross-sectional illustration of the exit device.

With additional reference to FIG. 2, the exit device 100 includes a pushbar assembly 101. The pushbar assembly 101 includes a mounting assembly 110 configured for mounting to the door 84, a drive assembly 120 including a pushbar mechanism 130, a latch control assembly 140 operably connected with the drive assembly 120, and a latch mechanism 150 operably connected with the latch control assembly 140. The pushbar mechanism 130 is operable to transition the drive assembly 120 from a deactuated state or condition to an actuated state or condition when manually actuated by a user. Actuation of the drive assembly 120 causes a corresponding actuation of the latch control assembly 140, thereby actuating the latch mechanism 150 and driving a latchbolt 152 of the latch mechanism 150 to a retracted position. When in the retracted position, the latchbolt 152 is capable of clearing the strike 90 such that the door 84 can be moved from the closed position toward the open position. As described herein, the exit device 100 is capable of a plurality of operational movements, one or more of which involves the retraction and/or extension of the latchbolt 152.

The mounting assembly 110 generally includes an elongated channel member 111, a base plate 112 mounted in the channel member 111, and a pair of bell crank mounting brackets 114 coupled to the base plate 112. The channel member 111 extends in the longitudinal (X) direction, has a width in the lateral (Y) direction, and has a depth in the transverse (Z) direction. Each of the mounting brackets 114 includes a pair of laterally spaced walls 115 which extend transversely away from the base plate 112. The illustrated mounting assembly 110 also includes a header plate 116 positioned adjacent a proximal end of the channel member 111, and a header casing 117 mounted to the header plate 116. The mounting assembly 110 also includes a header bracket 118, which is mounted to the header plate 116 within the header casing 117.

The drive assembly 120 includes the pushbar mechanism 130, a drive bar 122 connected between the pushbar mechanism 130 and the latch control assembly 140, and a return spring 126 engaged with the drive bar 122 and the mounting assembly 110. The return spring 126 biases the drive bar 122 in a distal extending direction, thereby biasing the drive assembly 120 toward its deactuated state or condition.

The pushbar mechanism 130 generally includes a manually actuated pushbar 132, a pair of pushbar brackets 134 coupled to the rear side the pushbar 132, and a pair of bell cranks 136 operably connecting the pushbar 132 with the drive bar 122. Each bell crank 136 is pivotably mounted to a corresponding one of the bell crank mounting brackets 114, and includes a first arm pivotably connected to a corresponding one of the pushbar brackets 134 and a second arm pivotably connected to the drive bar 122. The pivotal connections may, for example, be provided by pivot pins 104. The pushbar 132 is transversely movable between an extended or deactuated position and a depressed or actuated position, and the bell cranks 136 translate transverse movement of the pushbar 132 to longitudinal movement of the drive bar 122.

Figure 3:
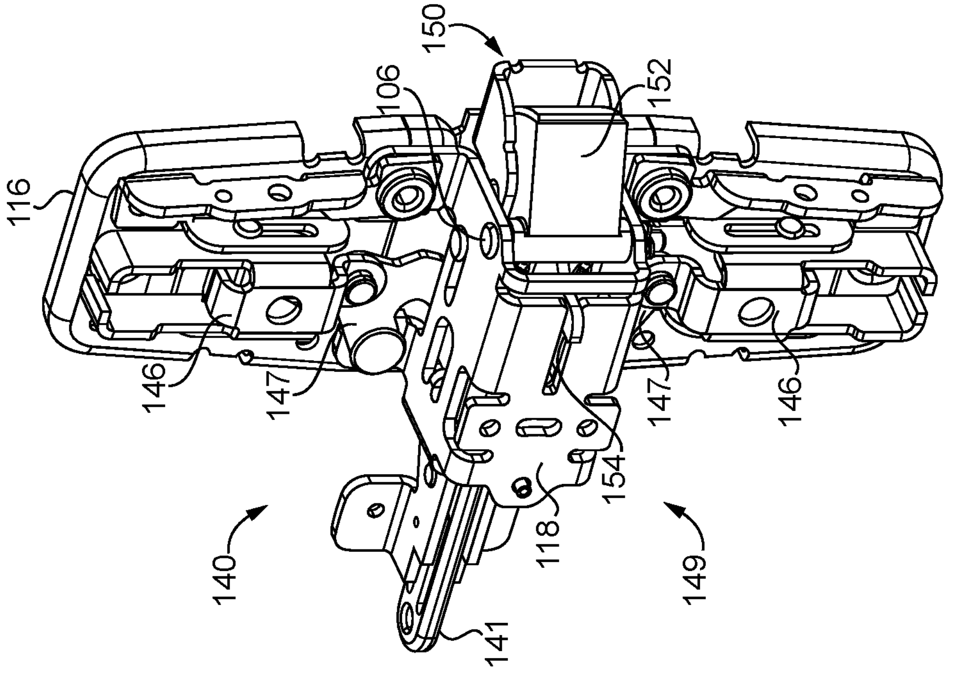
FIG. 3 is an illustration of a latch control assembly of the exit device.

With additional reference to FIG. 3, the latch control assembly 140 generally includes a longitudinally-sliding control link 141 and a fork link 148 connected between the control link 141 and the drive assembly 120. More particularly, the fork link 148 is connected with the drive rod 122 of the drive assembly 120 such that actuation of the drive assembly 120 causes a corresponding actuation of the latch control assembly 140. The latch control assembly 140 further includes a pair of laterally-sliding connector links 146, each of which is connected to the control link 141 via a corresponding pivot crank 147.

The latch mechanism 150 generally includes a pivoting latchbolt 152 and a retractor 154 connected between the control link 141 and the latchbolt 152. The latchbolt 152 is pivotably mounted to the header bracket 118 by a pivot pin 106 such that the latchbolt 152 pivots between an extended latching position and a retracted unlatching position. The latchbolt 152 may be biased toward the extended position, for example by a spring 153 engaged with the retractor 154. The retractor 154 is operably connected with the control link 141 such that actuation of the latch control assembly 140 causes a corresponding actuation of the latch mechanism 150, thereby retracting the latchbolt 152.

While the illustrated latch mechanism 150 is mounted in the header case 117, it is also contemplated that the latch mechanism 150 may take another form. For example, the exit device 100 may include a remote latching assembly including one or more remote latch mechanisms in addition to or in lieu of the illustrated latchbolt 152. Such remote latch mechanisms may, for example, be provided as a top latch mechanism configured to engage the top jamb of a door frame, and/or as a bottom latch mechanism configured to engage the floor. The latch control assembly 140 may further include one or more connectors, such as a rod or cable, and the connectors may operably couple the connector links 146 with the one or more remote latch mechanism. In such forms, movement of the connector links 146 in a laterally inward retracting direction (i.e., toward one another) may serve to actuate the remote latch mechanisms. One example of a remote latching assembly 1150 is described below with reference to FIG. 25.

The control link 141, the connector links 146, the pivot cranks 147, and the fork link 148 may alternatively be referred to as the control components 149 of the latch control assembly 140. Each of the control components 149 has an extended or deactuated position and a retracted or actuated position, and a corresponding extending or deactuating direction and retracting or actuating direction. Each control component 149 is configured to move in its retracting direction (i.e., toward its retracted or actuated position) in response to actuation of the drive assembly 120, and is operable to move in its extending direction (i.e., toward its extended or deactuated position) in response to deactuation of the drive assembly 120. As will be appreciated, the extending and retracting directions for one control component 149 may be different from the extending and retracting directions for another control component 149. By way of example, the extending and retracting directions for the control link 141 and the fork link 148 are horizontal or longitudinal directions, the extending and retracting directions for the connector links 146 are vertical or lateral directions, and the extending and retracting directions for the pivot cranks 147 are rotational or pivotal directions.

In the illustrated embodiment, the control components 149 are operationally coupled with one another for joint movement between the extended and retracted positions thereof. As a result, movement of one of the control components 149 causes a corresponding movement of the remaining components 149, and increasing or decreasing the movement speed of any one of the components 149 can cause a corresponding increase or decrease in the movement speed of each of the remaining components 149. Additionally, the latchbolt 152 and the retractor 154 are operationally coupled with one another for joint movement between the extended and retracted positions thereof, and are operationally coupled with the control components 149 via a lost motion connection that enables the latchbolt 152 to move from its extended position to a partially retracted position without driving the operating components from the extended positions thereof.

One operational movement of the exit device 100 is a drive assembly operational movement, which involves actuation and free release of the drive assembly 120. More specifically, the drive assembly operational movement involves depressing the pushbar 132 to move the drive assembly 120 to its actuated state, and releasing the pushbar 132 to allow the drive assembly 120 to return to its deactuated state under free release conditions. The drive assembly operational movement described herein may alternatively be referred to as a pushbar actuation/release operational movement.

The drive assembly operational movement may begin with each of the drive assembly 120, the latch control assembly 140, and the latch mechanism 150 in the deactuated state thereof. In this state, the latchbolt 152 is in its extended position, and is operable to engage the strike 90 to retain the door 84 in the closed position. If a user attempts to open the door 84 with the latchbolt 152 in the extended position (e.g., by applying a pushing force to the interior side face 85 of the door 84), outward swinging motion of the door 84 is prevented by engagement of the latchbolt 152 with the strike 90.

The drive assembly operational movement involves actuating the drive assembly 120, for example by manually driving the pushbar 132 to its depressed position. As the pushbar 132 is depressed, the bell cranks 136 translate the actuating or retracting motion of the pushbar 132 to distal retracting motion of the drive bar 122. As a result, the control link 141 retracts the retractor 154, which in turn drives the latchbolt 152 to the retracted position. In the retracted position, the latchbolt 152 is able to clear the strike roller 92 to permit opening of the door 84.

The drive assembly operational movement may also involve releasing the pushbar 132 to allow the drive assembly 120 to return to its deactuated state under free release conditions. When the pushbar 132 is released, the spring 126 urges the drive assembly 120 toward the deactuated state, thereby enabling the latch control assembly 140 to return to its deactuated state.

Another operational movement of the exit device 100 is a relatching operational movement which may, for example, occur during closing of the door 84. The relatching operational movement generally involves the latch control assembly 140 being driven to its actuated state by an external component (e.g., the strike 90), and subsequently returning to its deactuated state under free release conditions. The relatching operational movement may begin with the door 84 in an open position, and the drive assembly 120 and latch control assembly 140 in the deactuated states thereof. As the door 84 approaches its closed position, the strike 90 engages and depresses the latchbolt 152, which may drive the latch control assembly 140 toward its actuated state. As the door 84 reaches its fully closed position, the latchbolt 152 clears the strike 90, and the latch control assembly 140 returns to its deactuated state under the force of the internal biasing mechanisms of the exit device 100.

The exit device 100 may include one or more lost motion connections which enable the drive assembly 120 to remain in the deactuated state as the latchbolt 152 is driven to its retracted position by the strike 90. In the illustrated form, a lost motion connection 128 is formed between the drive assembly 120 and the latch control assembly 140, and more specifically is provided between the drive rod 122 and the fork link 148. The lost motion connection 128 transmits pulling forces between the drive rod 122 and fork link 148, such that retraction of the drive rod 122 causes a corresponding retracting movement of the fork link 148. However, the lost motion connection 128 does not transmit pushing forces between the drive rod 122 and the fork link 148, such that distal retracting movement of the fork link 148 does not cause a corresponding distal retracting movement of the drive bar 122. Thus, when the drive assembly 120 is in its deactuated state, the latch control assembly 140 is operable to move between its actuated and deactuated states. As a result, the deactuated drive assembly 120 does not materially affect the operation of the latch control assembly 140 during the relatching operation and certain other operations described herein.

The lost motion connection 128 may include a return spring 129 that compresses to store the energy of the distal force exerted by the fork link 148 as the latch control assembly 140 moves to its actuated state. When the latch control assembly 140 becomes free to return to its deactuated state (e.g., when the latchbolt 152 clears the strike 90), the spring 129 releases the stored energy by expanding, thereby driving the fork link 148 in the proximal direction and returning the latch control assembly 140 to its deactuated state.

In certain embodiments, the exit device 100 may include a noise reduction mechanism in the form of a drive rod damper assembly 160. In the illustrated form, the drive rod damper assembly 160 includes a housing bracket 162 mounted to the proximal mounting bracket 114, a stop arm 164 mounted to the drive rod 122, and a damper 166. The damper 166 includes a body portion 167 mounted to the housing bracket 162, and a plunger 168 movably mounted to the body portion 167. The plunger 168 has a depressed position and a projected position, and is biased toward the projected position, for example by a spring mounted within the body portion. The damper 166 is configured to resist movement of the plunger 168 from the projected position to the depressed position. Such movement of the plunger 168 may, for example, be resisted by the spring that biases the plunger 168 toward the projected position. In certain embodiments, the damper 166 may be provided as a fluid damper, and movement of the plunger 168 may further be resisted a fluid contained within the body portion 167.

With the drive assembly 120 in the deactuated state, the drive bar 122 is in its proximal position, and the stop arm 164 is engaged with the damper 166 and retains the plunger 168 in its depressed position. As the drive assembly 120 is actuated, the drive bar 122 and stop arm 164 move in the distal retracting direction, and the plunger 168 moves to its projected position under the internal biasing force of the damper 166. When the pushbar 132 is released, the drive assembly 120 returns to its deactuated state under the biasing force of the main spring 126, and the stop arm 164 engages the damper 166 and urges the plunger 168 to its depressed position. With such movement of the plunger resisted by the damper 166, the damper 166 slows the deactuating movement of the drive assembly 120, thereby reducing noise generated during deactuation of the drive assembly 120 under free release of the pushbar 132.

As noted above, the drive assembly 120 of the illustrated exit device 100 is connected to the latch control assembly 140 via a lost motion connection 128, which provides for unidirectional transmission of pulling forces between the drive bar 122 and the fork link 148. As a result, actuation of the drive assembly 120 causes a corresponding actuation of the latch control assembly 140, such that the drive rod damper assembly 160 may slow deactuation of the latch control assembly 140 during the deactuation of the drive assembly 120 in the drive assembly operational movement. During the relatching operational movement, by contrast, the latch control assembly 140 transitions to the actuated state under the force of the strike 90, and the lost motion connection 128 permits the drive assembly 120 to remain in its deactuated state. Thus, when latchbolt 152 clears the strike 90 and the latch control assembly 140 returns to its deactuated state, the damper assembly 160 does not slow such deactuating movement of the latch control assembly 140.

Figure 4:
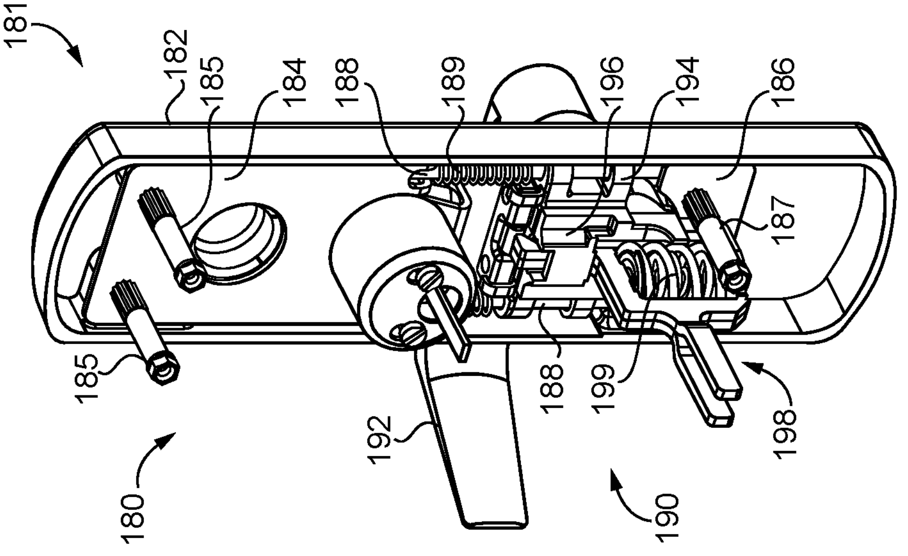
FIG. 4 is an illustration of a trim assembly that may be included in or used in association with the exit device.

With additional reference to FIG. 4, the exit device 100 may further include a trim assembly 180 configured for mounting to the unsecured side of the door 84. The illustrated trim assembly 180 includes a housing assembly or mounting assembly 181, and further includes an actuating assembly 190 movably mounted to the mounting assembly 181. The mounting assembly 181 includes an escutcheon 182, an upper base plate 184, a lower base plate 186, and a pair of guide rods 188. The base plates 184, 186 are mounted to the escutcheon 182 and support the guide rods 188. A pair of upper standoffs 185 are mounted to the upper base plate 184, and a pair of lower standoffs 187 are mounted to the lower base plate 186. A pair of biasing springs 189 are mounted to the guide rods 188 and are captured between the base plates 184, 186.

The actuating assembly 190 includes a handle 192 rotatably mounted to the escutcheon 182, a cam 194 coupled with the handle 192, a slider 196 engaged with the cam 194, a lift arm 198 mounted to the slider 196, and a drive spring 199 engaged between the slider 196 and the lift arm 198. The slider 196 is mounted to the guide rods 188 for sliding movement between a deactuated position and an actuated position, and is biased toward the deactuated position (downward in FIG. 4) by the biasing springs 189. Additionally, the lift arm 198 extends through the header plate 116 and is positioned adjacent the lower connector link 146, such that the lift arm 198 is capable of driving the connector link 146 in its retracting direction (upward in FIG. 3).

With the trim assembly 180 assembled to the exit device 100, the exit device 100 has a trim operational movement, which involves actuation and free release of the trim assembly 180. The trim operational movement may begin with each of the drive assembly 120, the latch control assembly 140, and the trim assembly 180 in the deactuated states thereof. In this state, the handle 192 is in a home position, and the slider 196 is in its deactuated position. When the handle 192 is rotated from a home position toward a rotated position, the cam 194 drives the slider 196 toward the actuated position against the force of the biasing springs 189. In other words, rotation of the handle 192 in its actuating direction causes a corresponding movement of the slider 196 in the actuating direction thereof.

Movement of the slider 196 is transmitted to the lift arm 198 by the drive spring 199 such that the lift arm 198 drives the lower connector link 146 in its actuating or retracting direction. Retraction of the connector link 146 is transmitted to the control link 141 by the pivot cranks 127, thereby causing the control link 141 to actuate the latch mechanism 150 to retract the latchbolt 152. When the handle 192 is subsequently released, the slider 196 returns to the deactuated position under the force of the biasing springs 189, thereby returning the handle 192 and the cam 194 to the home position. Movement of the slider 196 to its deactuated position also causes a corresponding movement of the lift arm 198, thereby enabling the latch control assembly 140 to return to its deactuated state.

As will be appreciated, actuation of the latch control assembly 140 by the trim assembly 180 does not cause a corresponding actuation of the drive assembly 120. More specifically, the lost motion connection 128 enables the drive assembly 120 to remain in its deactuated state during actuation of the trim assembly 180. As a result, the drive rod damper assembly 160 does not slow the deactuating movement of the latch control assembly 140 and the trim assembly 180 during the trim operational movement. Furthermore, the return spring 129 operates in the manner described above to aid in returning the latch control assembly 140 to its deactuated state after actuation by the trim assembly 180.

It has been found that during operation of the exit device 100, various components may contact one another in a manner that results in the generation of audible noise. In certain circumstances, it may be desirable to provide the exit device 100 with one or more noise reduction mechanisms configured to reduce the amount of audible noise generated during operation. Exemplary forms of noise reduction mechanisms according to certain embodiments are described herein.

The noise reduction mechanisms described herein may be used individually or in combination to reduce the noise generated by door hardware, such as an exit device. While the noise reduction mechanisms are illustrated and described herein as being configured for use with the exit device 100 illustrated in FIGS. 1-4, it is to be appreciated that the principles described herein may be applied to achieve similar noise reductions for other types of door hardware, including other forms of exit devices. Various components of the noise reduction mechanisms described herein may be formed of materials having a relatively low hardness, such as plastic, rubber, elastic, and/or polymeric materials. When positioned between two components formed of a relatively harder material, a component formed of a lower-hardness material may reduce noise-producing vibrations that would otherwise be caused by contact between the harder components, such as vibrations resulting from rattle, impact, and/or sliding engagement.

Figure 5:
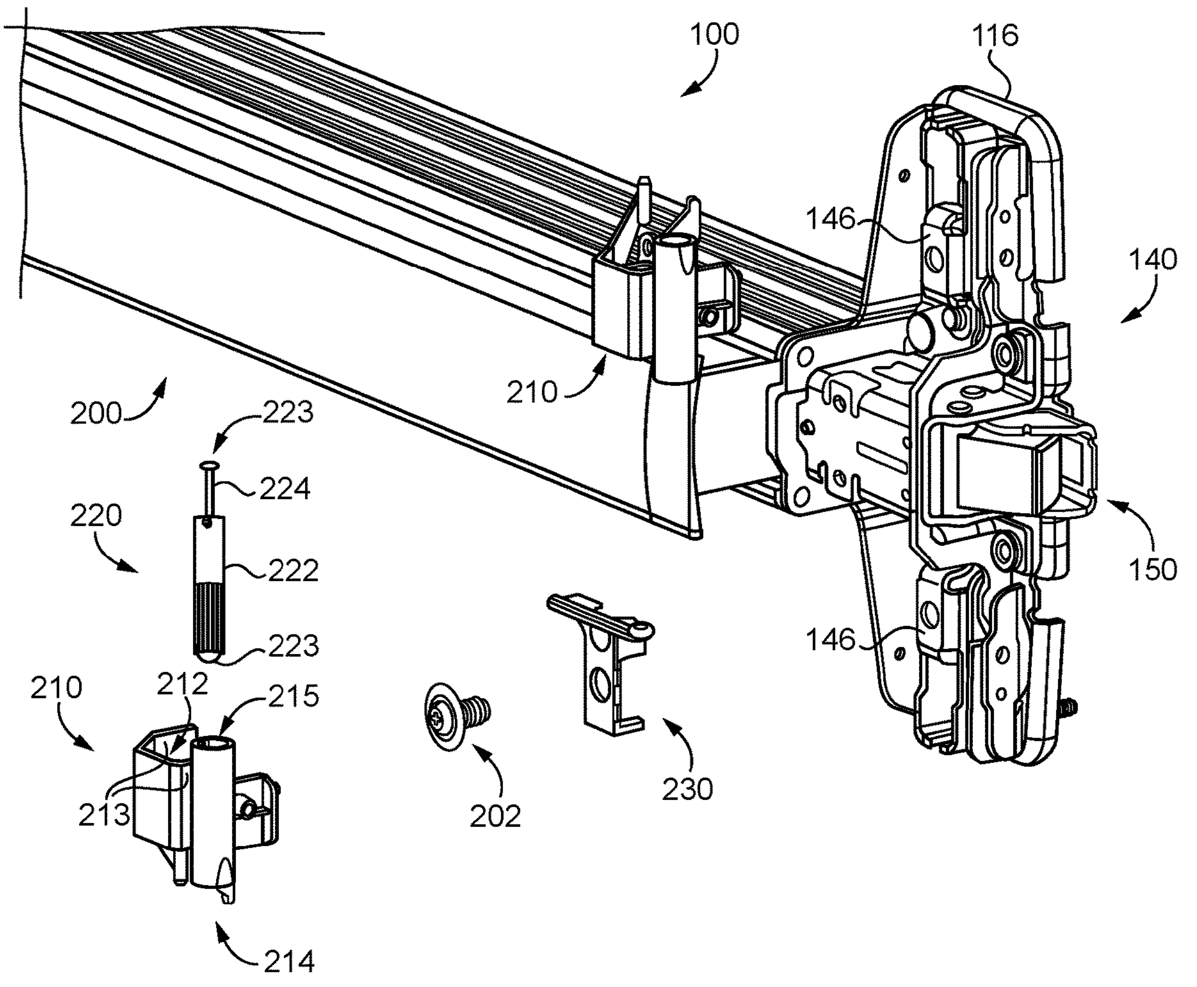
FIG. 5 is an illustration of the exit device along with a connector link damper assembly according to certain embodiments.
Figure 7:
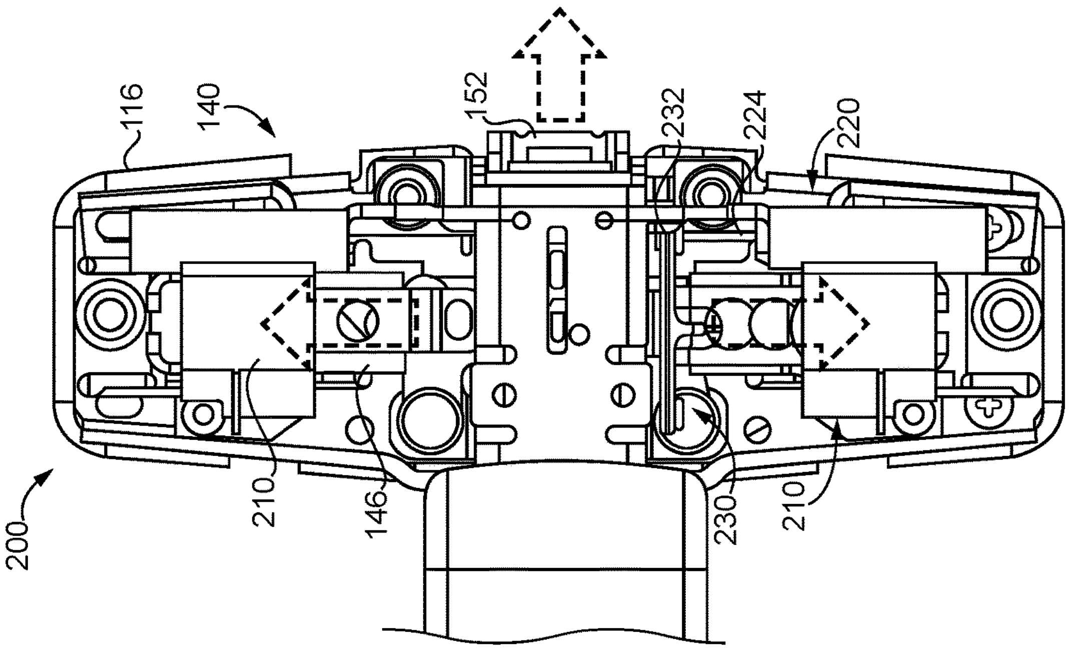
FIG. 7 illustrates the connector link damper assembly with the latchbolt assembly in a retracted state.
Figure 6:
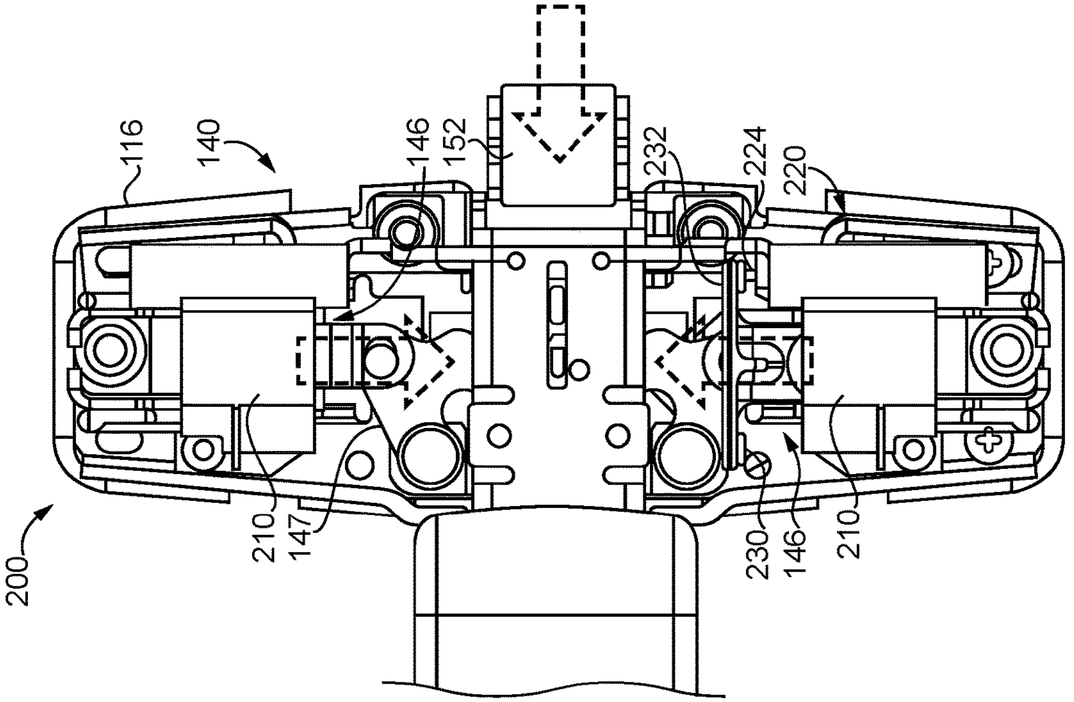
FIG. 6 illustrates the connector link damper assembly with the latchbolt assembly in an extended state.

FIGS. 5-7 illustrate a noise reduction mechanism in the form of a connector link damper assembly 200 configured for use with the latch control assembly 140. The connector link damper assembly 200 includes a pair of housing brackets 210, a damper 220 mounted to one of the housing brackets 210, and a stop member 230 operable to engage the damper 220. As described herein, the damper 220 includes a first member and a second member, and is configured to resist relative movement of the first and second members in one direction of relative movement. The damper 220 may further include one or more bumpers 223 made of a relatively soft elastomeric material in order to reduce vibrations and noise resulting from impact of the stop member 230 with the damper 220.

Each of the housing brackets 210 includes a guide channel 212 defined in part by a pair of sidewalls 213, and at least one of the brackets 210 includes a mounting feature 214 to which the damper 220 can be mounted. For example, the mounting feature 214 may include a tube 215 configured to receive the body portion 222 of the damper 220. Each housing bracket 210 is mounted to the header plate 116 adjacent a corresponding one of the connector links 146. The connector links 146 are at least partially received in the guide channels 212, which serve to guide the connector links 146 between the extended and retracted positions thereof. More specifically, the sidewalls 213 of each housing bracket 210 constrain the corresponding connector link 146 to movement along a guide path defined by guide channels 212. Constraining movement of the connector links 146 may reduce the amount of noise generated during operation of the latch control assembly 140, such as noise resulting from rattle and/or impact involving the connector links 146. Additionally, the housing brackets 210 may be formed of a non-metal such that the sidewalls 213 reduce or prevent metal-on-metal contact of the connector links 146 with other components, such as flanges of the header plate 116.

The damper 220 includes a body portion 222 and a plunger 224 movably coupled to the body portion 222, and has an expanded state and a compressed state. The damper 220 is mounted to one of the housing brackets 210 via the mounting feature 214 such that one of the body portion 222 or the plunger 224 has a fixed position relative to the header plate 116. In the illustrated form, the body portion 222 is coupled to the housing bracket 210 at a fixed location, and the plunger 224 is movable relative to the body portion 222. In other embodiments, the body portion 222 may be mounted for sliding movement relative to the housing bracket 210, and the plunger 224 may have a fixed position relative to the housing bracket 210.

The plunger 224 has a projected position and a depressed position, and is biased toward the projected position by a spring mounted within the body portion 222 such that the damper is biased toward the expanded state. The damper 220 is configured to resist movement of the plunger 224 from its projected position to its depressed position, thereby resisting movement of the damper 220 from its expanded state to its compressed state. Such movement of the plunger 224 may, for example, be resisted by the spring that biases the plunger 224 toward the projected position. In certain embodiments, the damper 220 may be provided as a fluid damper, and movement of the plunger 224 may further be resisted a fluid contained within the body portion 222.

The stop member 230 includes a stop wall 232, and is mounted to one of the connector links 146 such that the stop wall 230 is operable to engage the damper 220 as the connector link 146 moves from its extended position toward its retracted position. The stop member 230 thus defines an interface between the connector link 146 and the damper 220, and may alternatively be referred to herein as an interface member. The stop member 230 may be coupled to the connector link 146 by a fastener 202, such as a screw.

FIG. 6 illustrates the damper assembly 200 with the latch control assembly 140 in its deactuated or extended state. In this state, each of the control components 149 is in its extended or deactuated position. With the connector links 146 in the extended position, the stop wall 232 is engaged with the damper 220 such that the stop member 230 retains the plunger 224 in the depressed position, thereby retaining the damper 220 in its compressed state. As the latch control assembly 140 transitions to the actuated state (FIG. 7), each of the control components 149 moves in its retracting or actuating direction. The retracting directions of the latchbolt 152 and the connector links 146 are illustrated in FIG. 6. As the connector links 146 move to the retracted position, the stop member 230 moves away from the damper 220, and the plunger 224 moves to its projected position under the force of the internal spring.

FIG. 7 illustrates the damper assembly 200 with the latch control assembly 140 in its actuated or retracted state. In this state, the plunger 224 is in the projected position, and the free end of the plunger 224 is engaged with or positioned near the stop wall 232. When the latch control assembly 140 becomes free to return to its deactuated state, the latchbolt 152 and each of the control components 149 moves in the extending direction thereof. The extending directions of the latchbolt 152 and the connector links 146 are illustrated in FIG. 7. As the connector links 146 move toward the extended positions thereof, the stop wall 232 engages the damper 220, and the stop member 230 drives the plunger 224 to the depressed position, thereby compressing the damper 220. Thus, deactuation of the latch control assembly 140 causes the first and second members of the damper 220 (i.e., the body portion 222 and the plunger 224) to move relative to one another in a deactuating direction, thereby causing compression of the damper 220.

As the damper 220 is compressed, the damper 220 resists the relative movement of the body portion 222 and the plunger 224 in the deactuating direction, thereby reducing the speed of the connector link 146 and the other control components 149. By reducing the deactuation speed of the latch control assembly 140, the damper assembly 200 may reduce noise generated as the latch control assembly 140 returns to its extended or deactuated state, such as noise resulting from contact between the control components 149 and other components. The reduced deactuation speed may also reduce noise generated as a result of the latchbolt 152 pivoting about the pivot pin 106 and/or impacting a portion of the strike 90.

As noted above, the drive rod damper assembly 160 slows movement of the drive assembly 120 from its actuated state to its deactuated state, and is therefore capable of slowing deactuation of the latch control assembly 140 during the drive assembly operational movement. However, when the drive assembly 120 remains in its deactuated state while the latch control assembly 140 transitions between its actuated and deactuated states, such as may occur during the relatching operational movement or the trim operational movement, the drive rod damper assembly 160 does not slow the deactuating movement of the latch control assembly 140.

In contrast to the drive rod damper assembly 160, the connector link damper assembly 200 is configured to slow the deactuating movement of the connector link 146, thereby slowing deactuating movement of the latch control assembly 140 regardless of the actuated/deactuated state of the drive assembly 120. As a result, the connector link damper assembly 200 is capable of slowing the deactuating movement of the latch control assembly 140 during each of the drive assembly operational movement, the relatching operational movement, and the trim operational movement. While the illustrated damper assembly 200 is configured to slow deactuation of the latch control assembly 140 by slowing deactuating movement of the connector link 146, it is also contemplated that a damper assembly may be configured to slow deactuation of the latch control assembly 140 by slowing deactuating movement of another control component 149 of the latch control assembly 140, for example as described below with reference to FIGS. 8-10.

The stop member 230 may be configured to engage the damper 220 for unidirectional force transmission in order to reduce the noise generated during deactuation without materially altering the operation of the latch control assembly 140 during actuation. In the illustrated embodiment, the stop member 230 is configured to abut the damper 220 such that the damper 220 and stop member 230 are capable of pushing one another, but cannot pull one another. Transmission of the pushing forces enables the damper 220 to resist movement of the stop 230 in the extending direction, thereby slowing the deactuating movement of the latch control assembly 140. Due to the fact that pulling forces are not transmitted, the damper 220 does not resist movement of the stop 230 in the retracting direction, and the actuation of the latch control assembly 140 is not inhibited. As a result, the amount of force that a user must exert to actuate the drive assembly 120 is not materially altered.

While the illustrated damper assembly 200 is arranged to slow deactuation of the latch control assembly 140 by providing for unidirectional transmission of pushing forces, it is also contemplated that the damper assembly 200 may be arranged to slow deactuation of the latch control assembly 140 by providing for unidirectional transmission of another type of force, such as pulling forces. In other embodiments, the stop 230 may be configured to engage the damper 220 for bidirectional transmission of forces, such that the damper assembly 200 reduces the movement speed of the latch control assembly 140 during both actuation and deactuation thereof.

Figure 8:
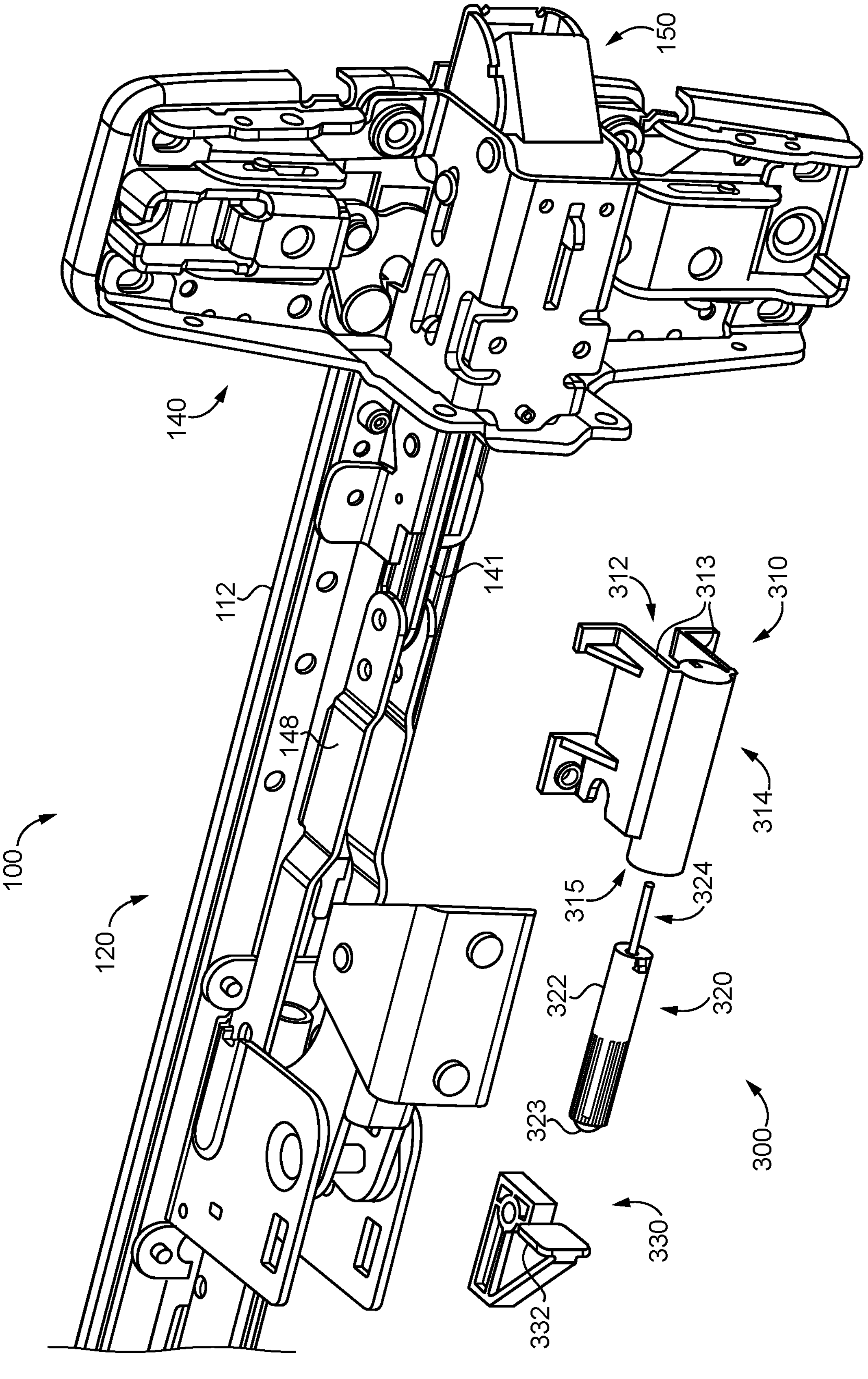
FIG. 8 is an illustration of the exit device along with a control link damper assembly according to certain embodiments.
Figure 10:
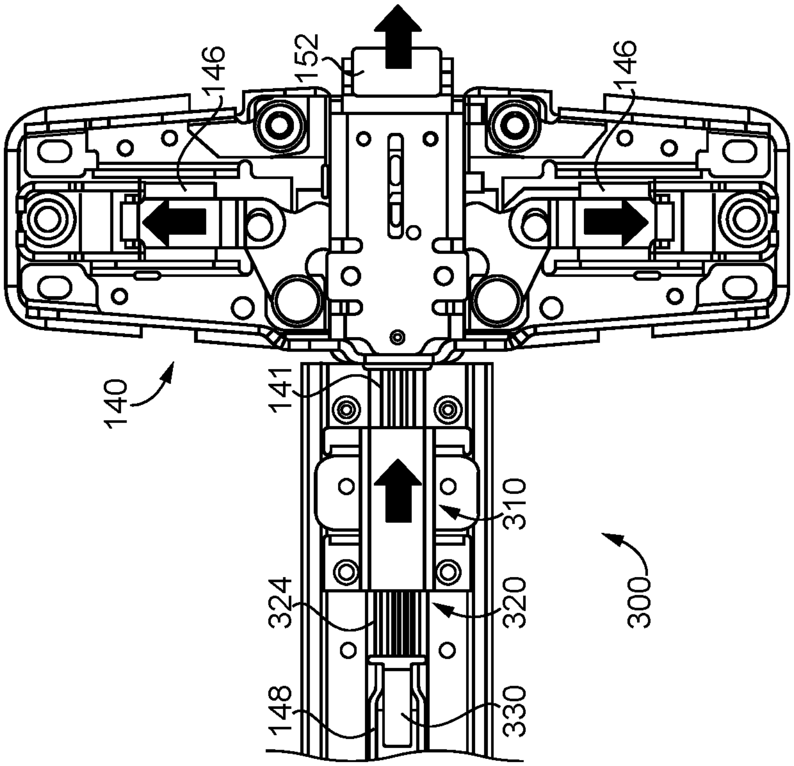
FIG. 10 illustrates the control link damper assembly with the latchbolt assembly in a retracted state.
Figure 9:
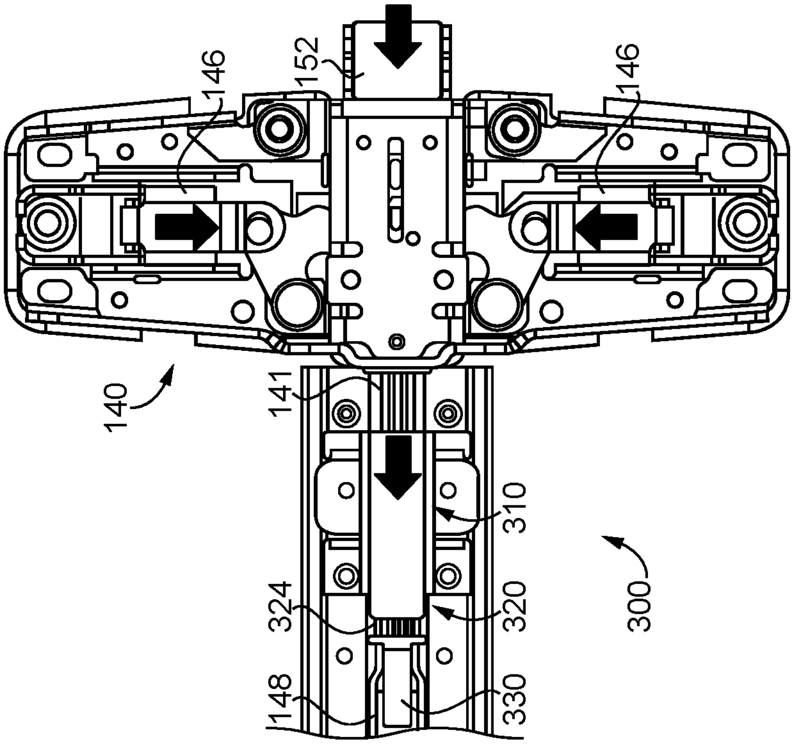
FIG. 9 illustrates the control link damper assembly with the latchbolt assembly in an extended state.

FIGS. 8-10 illustrate a noise reduction mechanism in the form of a control link damper assembly 300 configured for use with the latch control assembly 140. The control link damper assembly 300 is similar to the above-described connector link damper assembly 200, and similar reference characters are used to indicate similar elements and features. For example, the control link damper assembly 300 includes a housing bracket 310, a damper 320, and a stop member 330, which respectively correspond to the housing brackets 210, the damper 220, and the stop member 230 of the connector link damper assembly 200. In the interest of conciseness, the following description focuses primarily on features and functions of the control link damper assembly 300 that are different from those described above with reference to the connector link damper assembly 200.

The housing bracket 310 is mounted to the base plate 112 of the mounting assembly 110 such that the control link 141 extends through the guide channel 312. The damper 320 is mounted to the housing bracket 310 such that one of the body portion 322 or the plunger 324 is movable relative to the base plate 112. In the illustrated form, the body portion 322 is slidably mounted in the tube 315 and the plunger 324 is engaged with a rear wall of the tube 315. As a result, the body portion 322 is movable relative to the base plate 112 to engage the stop member 330, and the plunger 324 has a fixed position relative to the base plate 112. It is also contemplated that the orientation of the damper 320 may be reversed such that the body portion 322 has a fixed position and the plunger 324 moves to engage the stop member 330. The stop member 330 is mounted to the control link 141 and/or the fork link 148 on the distal side of the housing bracket 310, and defines an interface between the control component 149 and the damper 320. The stop wall 332 is operable to engage the damper 320 as the control link 141 moves between its extended and retracted positions.

FIG. 9 illustrates the damper assembly 300 with the latch control assembly 140 in the deactuated or extended state. In this state, the stop wall 332 is engaged with the damper 320 such that the stop member 330 retains the plunger 324 in the depressed position. As the latch control assembly 140 transitions to the actuated state (FIG. 10), each of the control components 149 moves in its retracting or actuating direction. The retracting directions of the latchbolt 152 and the connector links 146 are illustrated in FIG. 9. As the control link 141 moves to its actuated position, the stop member 330 moves away from the damper 320, thereby enabling the plunger 324 to move to its projected position.

FIG. 10 illustrates the damper assembly 300 with the latch control assembly 140 in the actuated or retracted state. In this state, the plunger 324 is in the projected position, and the free end of the plunger 324 is engaged with or positioned near the stop wall 332. When the latch control assembly 140 becomes free to return to its deactuated state, each of the control components 149 moves in its extending or deactuating direction. The extending directions of the latchbolt 152 and the connector links 146 are illustrated in FIG. 10. As the control link 141 moves to its deactuated position, the stop wall 332 engages the damper 320 such that stop member 330 drives the plunger 324 to the depressed position corresponding to the compressed state of the damper 320. The damper 320 resists such movement, thereby reducing the speed of the control link 141 and the other control components 149.

By reducing the deactuation speed of the latch control assembly 140, the damper assembly 300 may reduce noise generated by such deactuation in a manner similar to that described above with reference to the connector link damper assembly 200. Additionally, the stop member 330 may be configured to engage the damper 320 for transmission of forces in manners analogous to those described above with reference to the illustrated and alternative forms of the damper 220 and stop member 230 of the connector link damper assembly 200.

Figure 11:
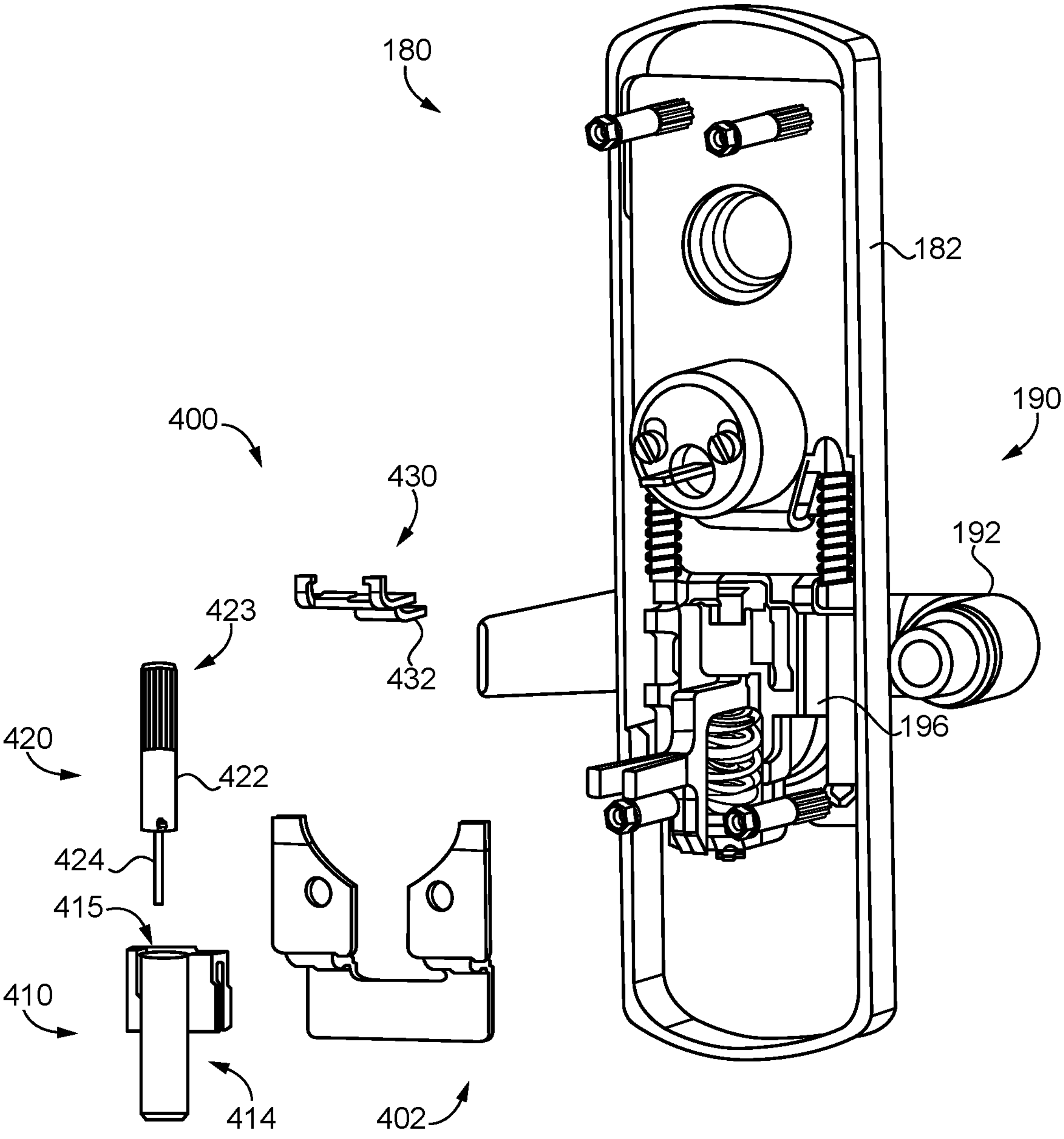
FIG. 11 is an illustration of the trim assembly along with a trim damper assembly according to certain embodiments.
Figure 13:
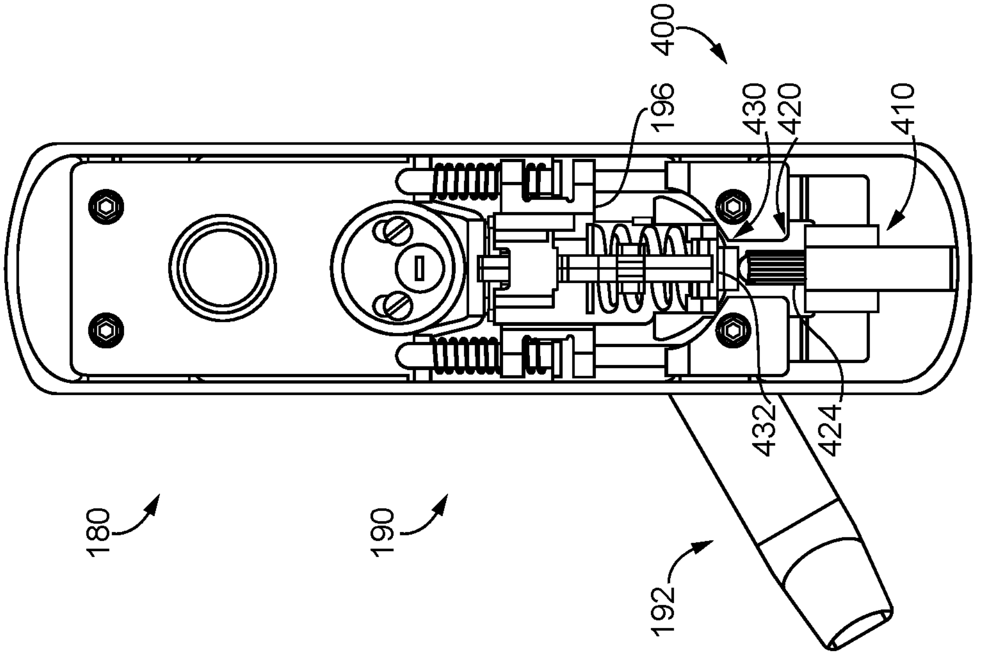
FIG. 13 illustrates the trim damper assembly with the trim assembly in an actuated state.
Figure 12:
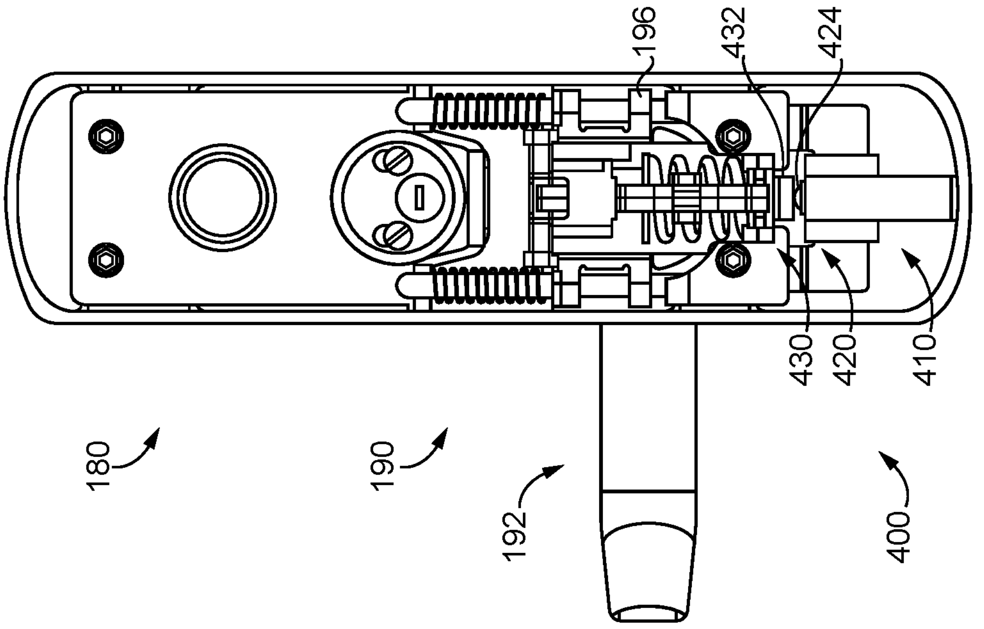
FIG. 12 illustrates the trim damper assembly with the trim assembly in a deactuated state.

FIGS. 11-13 illustrate a noise reduction mechanism in the form of a trim damper assembly 400 configured to reduce noise generated during operation of the trim assembly 180. The trim damper assembly 400 is similar to the above-described connector link damper assembly 200, and similar reference characters are used to indicate similar elements and features. For example, the control link damper assembly 400 includes a housing bracket 410, a damper 420, and a stop member 430, which respectively correspond to the housing brackets 210, the damper 220, and the stop member 230 of the connector link damper assembly 200. In the interest of conciseness, the following description focuses primarily on features and functions of the control link damper assembly 400 that are different from those described above with reference to the connector link damper assembly 200.

The trim damper assembly 400 includes a base plate 402, which is substantially similar to the lower base plate 186 of the trim assembly 180. The base plate 402 is mounted to the escutcheon 182, and the housing bracket 410 is mounted to the base plate 402. The damper 420 is mounted to the housing bracket 410, and the stop member 430 is mounted to the slider 196 such that the stop member 430 is operable to engage the damper 420 during movement of the slider 196, thereby providing an interface between the damper 420 and the slider 196. With the damper assembly 400 installed to the trim assembly 180, the stop member 430 sits over the edge of the slider 196, and may be held in place by one or more fasteners. While other forms are contemplated, the illustrated stop member 430 is coupled to the slider 196 by a pair of hook features and a plastic rivet.

In certain embodiments, the trim damper assembly 400 may be provided in the form of a retrofit kit for an existing trim assembly 180. In such a kit, the damper 420 may be pre-mounted to the housing bracket 410, for example via mating snap features, and the base plate 402 may be configured to replace the existing lower base plate 186. Replacing the existing base plate 186 may, for example, involve removing the standoffs 187 from the existing base plate 186, and mounting the standoffs 187 to the new base plate 402.

FIG. 12 illustrates the trim damper assembly 400 with the trim assembly 180 in a deactuated state, in which the handle 192 in the home or deactuated position. In this state, the slider 196 is retained in its deactuated position by the biasing springs 189. With the slider 196 in the deactuated position, the stop member 430 is engaged with the damper 420 and retains the plunger 424 in the depressed position. When the handle 192 is rotated in its actuating direction, the actuating assembly 190 transitions to the actuated state illustrated in FIG. 13. As the handle 192 rotates, the cam 194 drives the slider 196 to its actuated position, the stop member 430 moves away from the damper 420, and the plunger 424 moves toward its projected position. Movement of the plunger 424 to its projected position corresponds to expansion of the damper 420, which involves relative movement of the body portion 422 and plunger 424 in an actuating direction corresponding to the actuating direction of the stop member 430.

FIG. 13 illustrates the trim damper assembly 400 with the trim assembly 180 in an actuated state, in which the handle 192 is in a rotated or actuated position. In this state, the plunger 424 is in the projected position, and the free end of the plunger 424 is engaged with or positioned adjacent the stop wall 432. As the actuating assembly 190 returns to the deactuated state, the slider 196 moves toward its deactuated position, and the stop member 430 drives the plunger 424 to the depressed position, thereby compressing the damper 420 and causing relative movement of the body portion 422 and the plunger 424 in the deactuating direction of the damper 420. The damper 420 resists the relative movement of the body portion 422 and the plunger 424 in the deactuating direction, thereby resisting deactuation of the actuating assembly 190 and reducing the speed of the slider 196 and the other components of the actuating assembly 190. By reducing the deactuation speed of the actuating assembly 190, the damper assembly 400 may reduce noise generated as the actuating assembly 190 returns to the deactuated state, such as noise resulting from one or more components of the actuating assembly 190 impacting or sliding against other components.

The trim damper assembly 400 is configured to slow the deactuating movement of the slider 196, thereby slowing deactuating movement of the actuating assembly 190 regardless of the actuated/deactuated state of the drive assembly 120 and latch control assembly 140. As a result, the trim damper assembly 400 is capable of slowing the deactuating movement of the trim assembly 180 during the trim operational movement. While the illustrated trim damper assembly 400 is configured to slow deactuation of the trim assembly 180 by slowing deactuating movement of the slider 196, it is also contemplated that a damper assembly may be configured to slow deactuation of the trim assembly 180 by slowing deactuating movement of another component of the actuating assembly 190.

The stop member 430 may be configured to engage the damper 420 for unidirectional force transmission in order to reduce the deactuation speed actuating assembly 190 without materially altering the operation of the actuating assembly 190 during actuation. In the illustrated embodiment, the stop member 430 is configured to abut the damper 420 such that the damper 420 and stop member 430 are capable of pushing one another, but cannot pull one another. Transmission of the pushing forces enables the damper 420 to resist movement of the stop member 430 in the extending direction, thereby slowing the deactuating movement of the actuating assembly 190. Due to the fact that pulling forces are not transmitted, the damper 420 does not resist movement of the stop member 430 in the retracting direction, and movement of the actuating assembly 190 during actuation is not hindered. As a result, the amount of force that a user must exert to rotate the handle 192 for actuation of the actuating assembly 190 is not materially altered.

While the illustrated damper assembly 400 is arranged to slow deactuation of the actuating assembly 190 by providing for unidirectional transmission of pushing forces, it is also contemplated that the damper assembly 400 may be arranged to slow deactuation of the actuating assembly 190 by providing for unidirectional transmission of another type of force, such as pulling forces. In other embodiments, the stop member 430 may be configured to engage the damper 420 for bidirectional transmission of forces, such that the damper assembly 400 reduces the movement speed of the actuating assembly 190 during both actuation and deactuation.

In light of the foregoing descriptions, it is evident that each of the noise reduction mechanisms 200, 300, 400 is configured to reduce noise generation by controlling the deactuating speed of the latch control assembly 140. In contrast to the drive rod damper assembly 160, which at best may slow deactuation of the latch control assembly 140 during the drive assembly operational movement (including free release of the drive assembly 120), each of the noise reduction mechanisms 200, 300, 400 is also operable to slow deactuation of the latch control assembly 140 during the relatching operational movement (including extension of the latchbolt 152 after clearing the strike 90) and/or the trim assembly operational movement (including free release of the handle 192).

In the illustrated embodiments, each of the noise reduction mechanisms 200, 300, 400 includes a fluid damper 220, 320, 420. It is also contemplated that one or more of the noise reduction mechanisms 200, 300, 400 may control the deactuation speed of the latch control assembly 140 using additional or alternative components operable to provide resistive forces, such as magnets and/or springs. In certain forms, one or more of the noise reduction mechanisms may include an adjustment mechanism by which the level of resistance may be adjusted. For example, in embodiments in which the resistive force is provided by a fluid damper, the adjustment mechanism may include a valve operable to adjust the effective cross-sectional area of an opening through which the fluid flows.

Furthermore, while certain exemplary arrangements of the damper assemblies 200, 300, 400 have been illustrated, it is to be appreciated that other arrangements are also contemplated. For example, in the illustrated embodiments, the interface member (i.e., the stop member 230/330/430) is mounted to a moving component, and the housing bracket 210/310/410 is secured to the mounting assembly 110 or the housing assembly 181 such that a portion of the damper 220/320/420 is stationary relative pushbar assembly 101. It is also contemplated that these arrangements may be reversed, such that the interface member is secured to the mounting assembly or the housing assembly, and the housing bracket is mounted to the movable component such that a portion of the damper is stationary relative to the movable component.

As indicated above, each of the noise reduction mechanisms 200, 300, 400 is configured to control the deactuating speed of the latch control assembly 140, thereby reducing vibrations resulting from contact between components (e.g., vibrations resulting from impact and/or sliding engagement). The noise reduction mechanisms 200, 300, 400 may further reduce noise generation in other manners, such as by reducing rattling and/or the amount of metal-to-metal contact between moving components. Further examples of noise reduction mechanisms that may reduce vibrations resulting from contact between moving components will now be described with reference to FIGS. 14-24.

Figure 14:
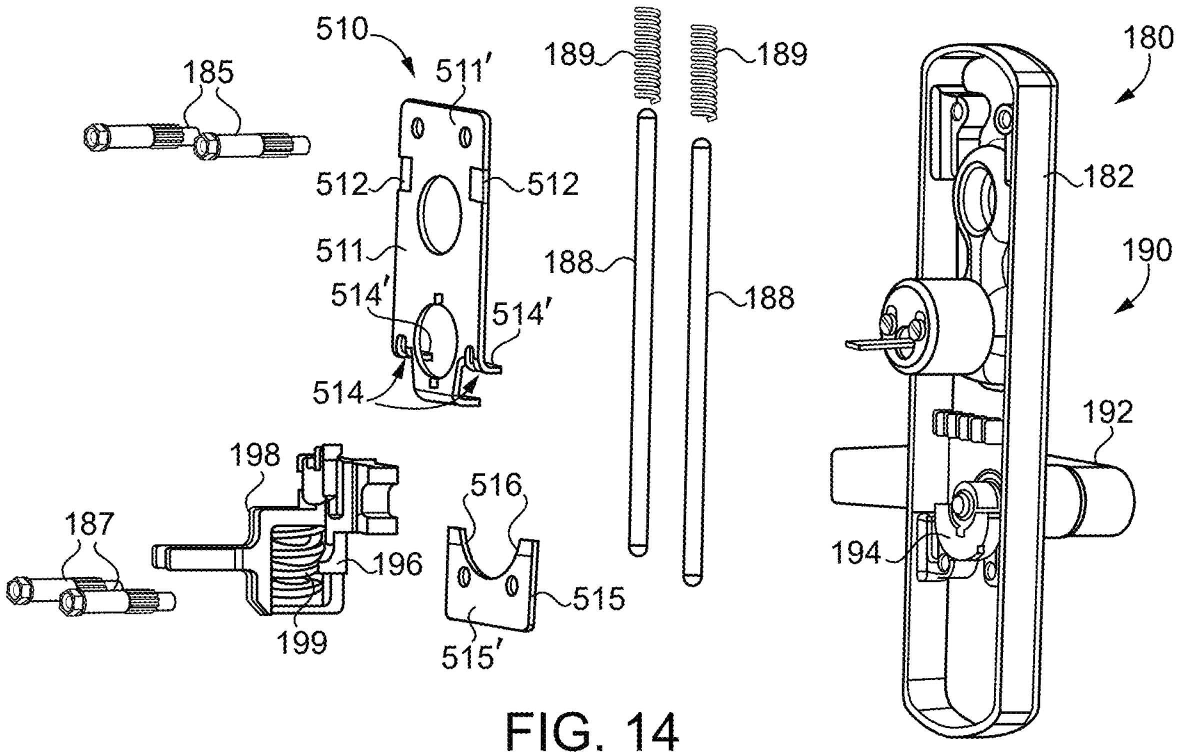
FIG. 14 is an illustration of the trim assembly along with a holder plate according to certain embodiments.
Figure 15:
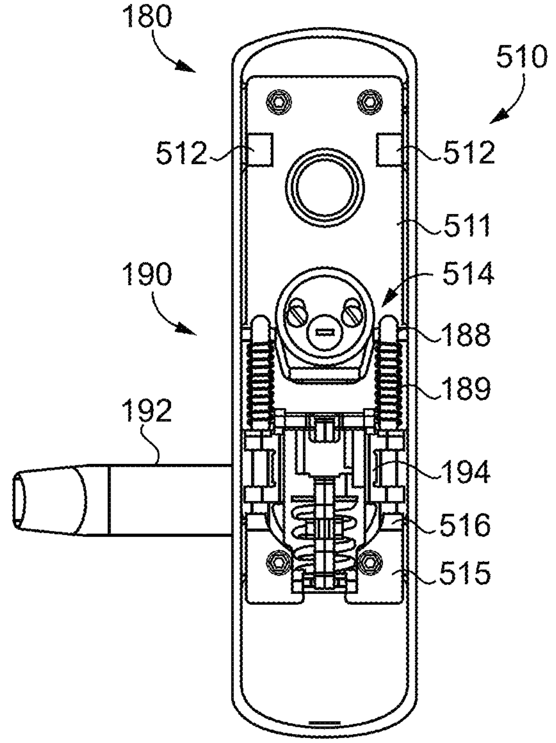
FIG. 15 illustrates the trim assembly with the holder plate installed.

FIGS. 14 and 15 illustrate a noise reduction mechanism in the form of a holder plate assembly 510 configured to reduce noise generated during operation of the trim assembly 180. The holder plate assembly 510 includes an upper plate 511 and a lower plate 515, which are substantially similar to the upper base plate 184 and the lower base plate 186, respectively. In certain forms, the holder plate assembly 510 may be provided in a retrofit kit configured for use with the trim assembly 180. Retrofitting the trim assembly 180 may, for example, involve removing the standoffs 185, 187 from the existing base plates 184, 186 and mounting the standoffs 185, 187 to corresponding locations on the new plates 511, 515. In certain embodiments, the holder plate assembly 510 may be used in combination with the above-described trim damper assembly 400.

In the unmodified trim assembly 180, the guide rods 188 are mounted to the base plates 184, 186 with loose clearance fits. While the clearance fits can improve ease of manufacture and assembly, it has been found that clearance fits may also lead to undesired rattling during operation of the actuating assembly 190. This issue may be alleviated by the holder plate assembly 510, in which the upper plate 511 includes a pair of spring tabs 512, and the lower plate 515 includes a similar pair of spring tabs 516. The upper plate 511 further includes a first plate portion 511' from which the first spring tabs 512 extend, and the lower plate 515 further includes a second plate portion 515' from which the second spring tabs 516 extend. With the holder plate assembly 510 assembled to the trim assembly 180, the rods 188 extend through openings 514 of the upper plate 511. Each of the apertures 514 is formed in a corresponding tab 514' of the upper plate 511. Additionally, the spring tabs 512, 516 resiliently engage the end portions of the guide rods 188, thereby holding the guide rods 188 in place and reducing rattling during operation of the actuating assembly 190. The spring tabs 512, 516 may also reduce undesired movement of the slider 196, thereby further reducing the noise generated by the trim assembly 180. In certain forms, the upper spring tabs 512 and/or the lower spring tabs 516 may urge a portion of the rods 188 into contact with the escutcheon 182.

Figure 17:
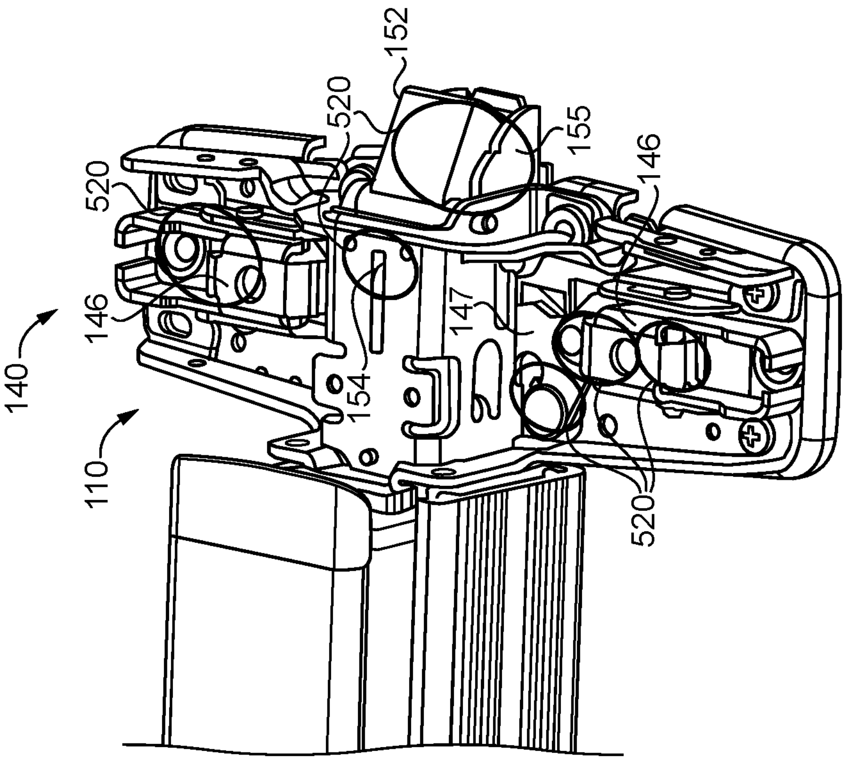
FIGS. 16 and 17 illustrate the latchbolt assembly with damping grease applied according to certain embodiments.
Figure 16:
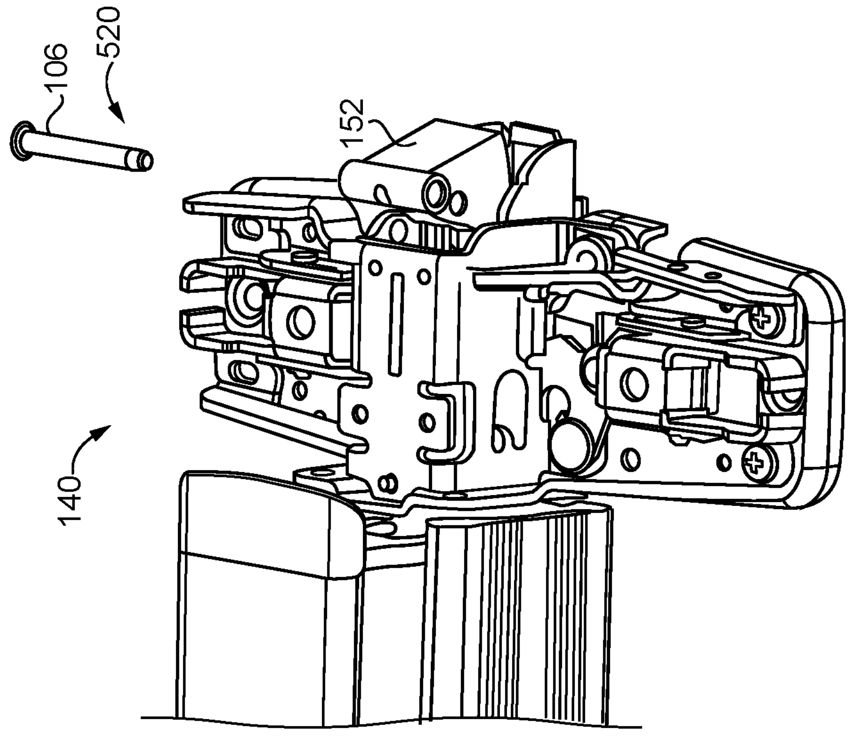

FIGS. 16 and 17 illustrate the latch control assembly 140 with a noise reduction mechanism in the form of damping grease 520. When applied between two relatively movable components, the damping grease 520 provides for slower and smoother relative motion of the components, and may serve to decrease rattling of the components. In the illustrated embodiment, the pivot pin 106 is coated in the damping grease 520, thereby slowing the motion of the latchbolt 152 and reducing the generation of noise.

Figure 18:
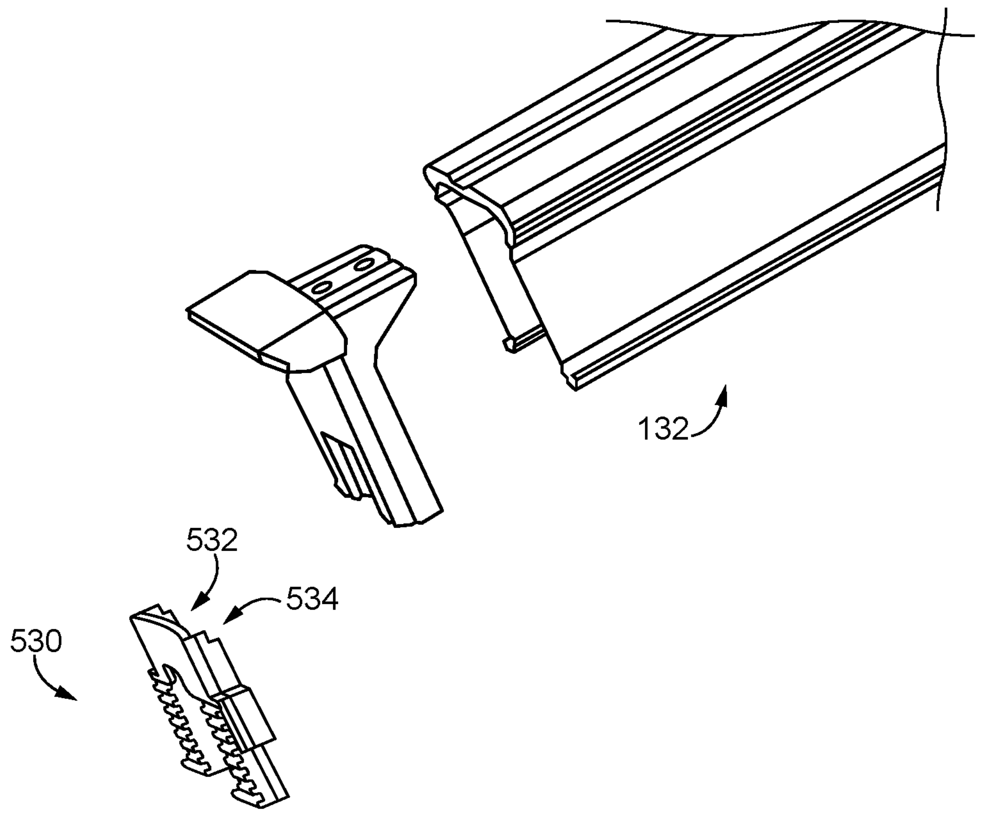
FIG. 18 is an illustration of a pushbar of the exit device along with a pushbar guide according to certain embodiments.

The damping grease 520 may also be applied to other moving parts of the exit device 100. For example, FIG. 18 illustrates several examples of locations at which the damping grease 520 may be applied to the mounting assembly 110, the latch control assembly 140 and the latch mechanism 150. More particularly, these examples include the locations at which the mounting assembly 100 interfaces with the connector links 146, the pivot cranks 147, and the retractor 154, the locations at which the control components 149 interface with one another, and the locations at which the latchbolt 152 interfaces with the guard bolt 155. Applying the damping grease 520 to these and other locations may slow movement of the latch control assembly 140 and the latch mechanism 150 and reduce or eliminate rattling between loose-fitting mating parts. When so applied, the damping grease 520 may greatly reduce the sound coming from within the header case 117 during operation of the latch control assembly 140.

Figure 19:
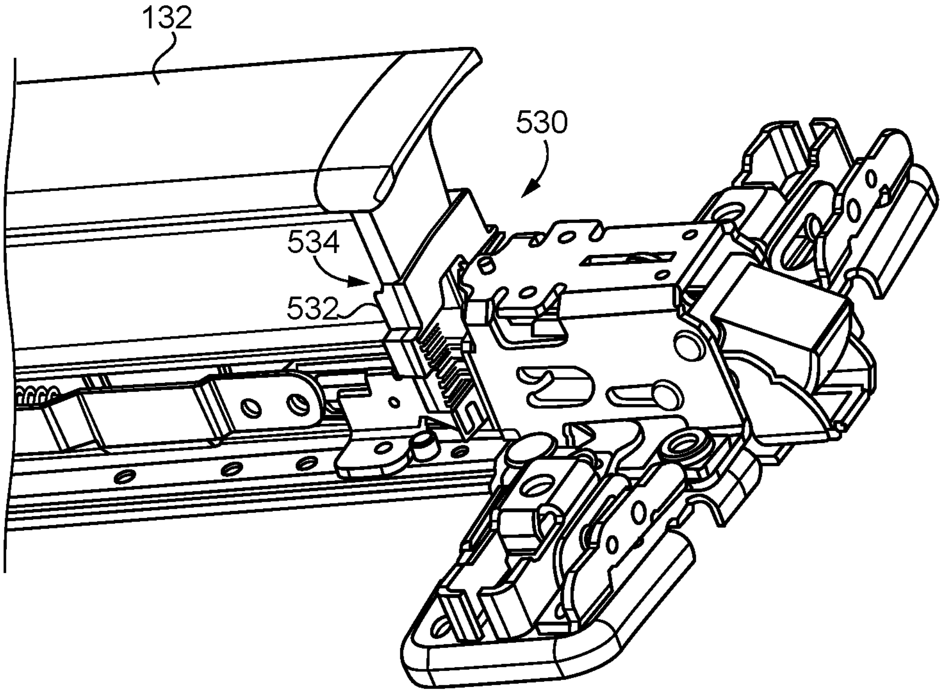
FIG. 19 illustrates the exit device and pushbar guide with the pushbar in an extended position.
Figure 20:
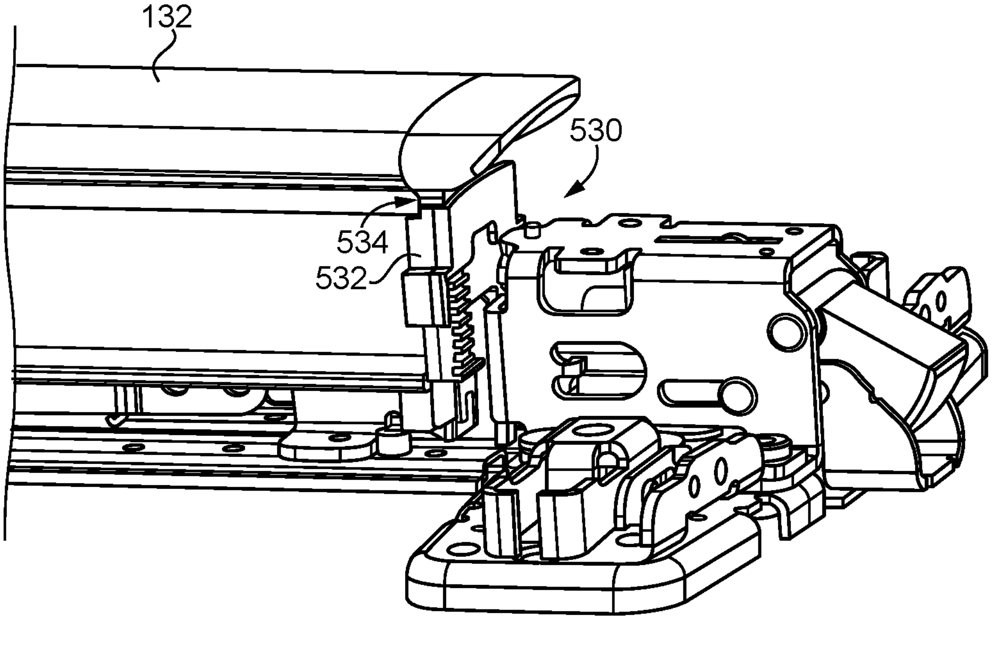
FIG. 20 illustrates the exit device and pushbar guide with the pushbar in a depressed position.

FIGS. 18-20 illustrate a noise reduction mechanism in the form of a pushbar guide 530 configured to reduce noise generated by impact of the pushbar 132 on the header case 117. The pushbar guide 530 is configured to be mounted to the channel member 111 adjacent the proximal end of the pushbar 132. The pushbar guide 530 includes a lip 532 that extends around the proximal end portion of the pushbar 132 and acts as a barrier between the pushbar 132 and the header casing 117. The lip 532 may include a cutout 534 that facilitates movement of the pushbar 132 to its fully depressed position (FIG. 20).

The pushbar guide 530 is formed of a material having a lower hardness than the metal of which the header casing 117 and pushbar 132 are formed, such as a plastic material. In discouraging metal-to-metal contact of the header casing 117 and pushbar 132, the pushbar guide 530 may reduce noise generation during operation of the exit device 100. The lip 532 may also retain the position of the guide 530 during assembly, thereby facilitating such assembly.

Figure 21:
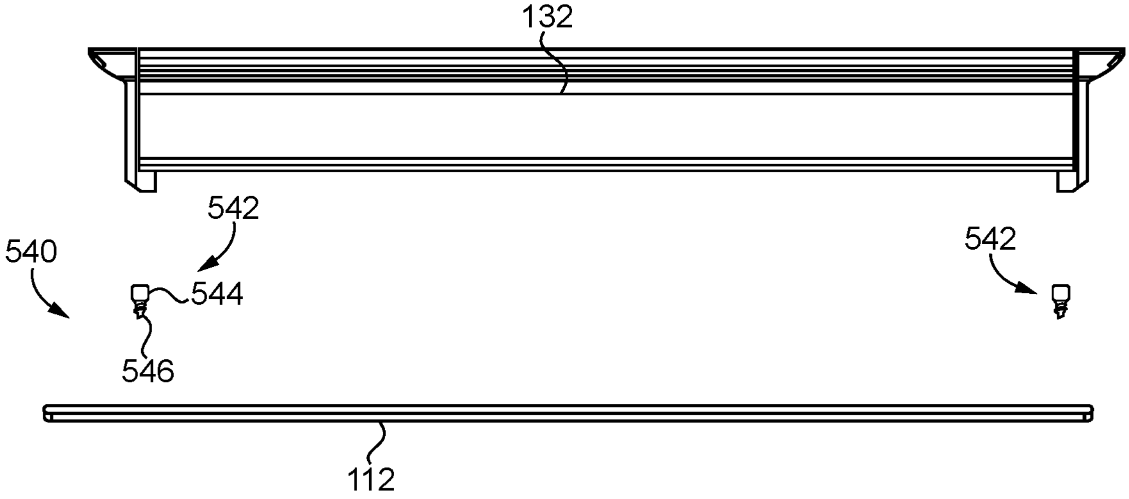
FIG. 21 is an illustration of the pushbar along with a mounting plate bumpstop assembly according to certain embodiments.
Figure 22:
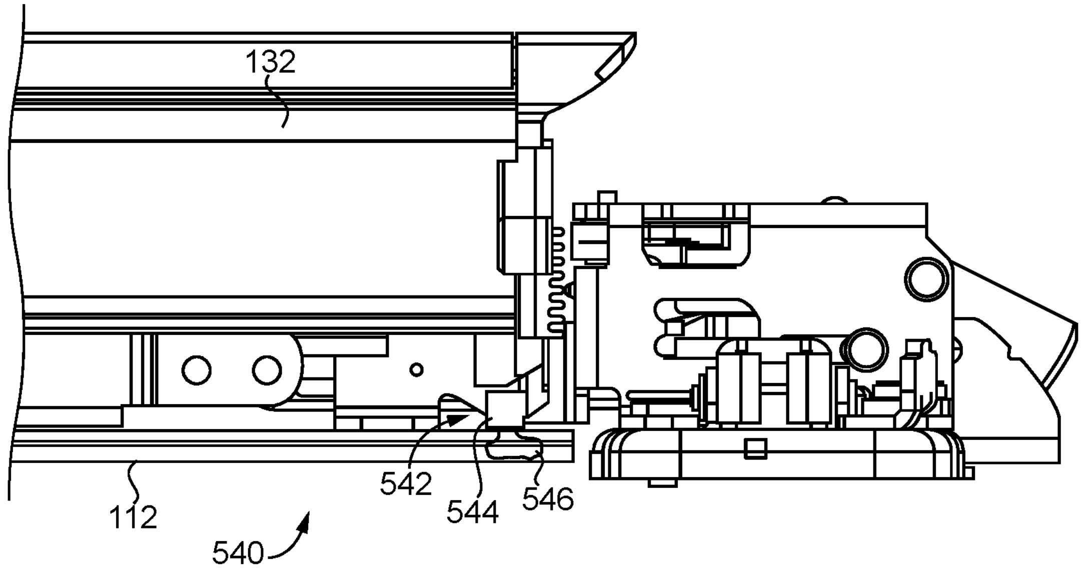
FIG. 22 illustrates the exit device and the mounting plate bumpstop assembly with the pushbar in a depressed position.

FIGS. 21 and 22 illustrate a noise reduction mechanism in the form of a mounting plate bumpstop assembly 540 configured to reduce noise generated by impact of the pushbar 132 on the base plate 112. The bumpstop assembly 540 includes a plurality of bumpers 542, each of which includes a pad 544 and a stem 546. The bumpers 542 may be mounted to the base plate 112 by inserting each of the stems 546 into a corresponding opening in the base plate 112 that matingly receives the stem 546. With the bumpers installed to the base plate 112, the pads 544 are aligned with the edges of the pushbar 132. As the pushbar 132 approaches the fully depressed position (FIG. 22), the edges of the pushbar engage the pads 544.

The bumpers 542 are formed of a material with a relatively low hardness rating, such as an elastomeric material. As a result, the pads 544 flex or deform when engaged by the edges of the pushbar 132, thereby dampening vibrations and reducing noise generation. The bumpers 542 may be configured to engage the pushbar 132 when the pushbar 132 is a predetermined distance from the fully depressed position, and to flex or deform as the pushbar travels through the predetermined distance to the fully depressed position. The predetermined distance may, for example, be approximately 0.1 inches, such as within a range of 0.085 inches to 0.115 inches.

The bumpers 542 may be configured to replace existing bumpers of the exit device 100. For example, the illustrated bumpstop assembly 540 includes four bumpers 542 that are configured to replace four existing bumpers that are mounted to the base plate 112 of the exit device 100. The existing bumpers of the exit device 100 are formed of a relatively hard material. As a result, the existing bumpers transmit impact energy to the mounting assembly 110, which may cause rattling and vibration within the exit device 100 or of the door 84 itself. The bumpers 542 of the bumpstop assembly 540 have a lower hardness rating than the existing bumpers, and therefore are capable of absorbing at least some of the impact energy that would otherwise cause undesirable rattling and vibration. In addition to the softer material, the bumpers 542 may be provided with a greater height and/or a greater diameter than the existing bumpers, which may further increase the energy absorption provided by the bumpstop assembly 540.

Figure 23:
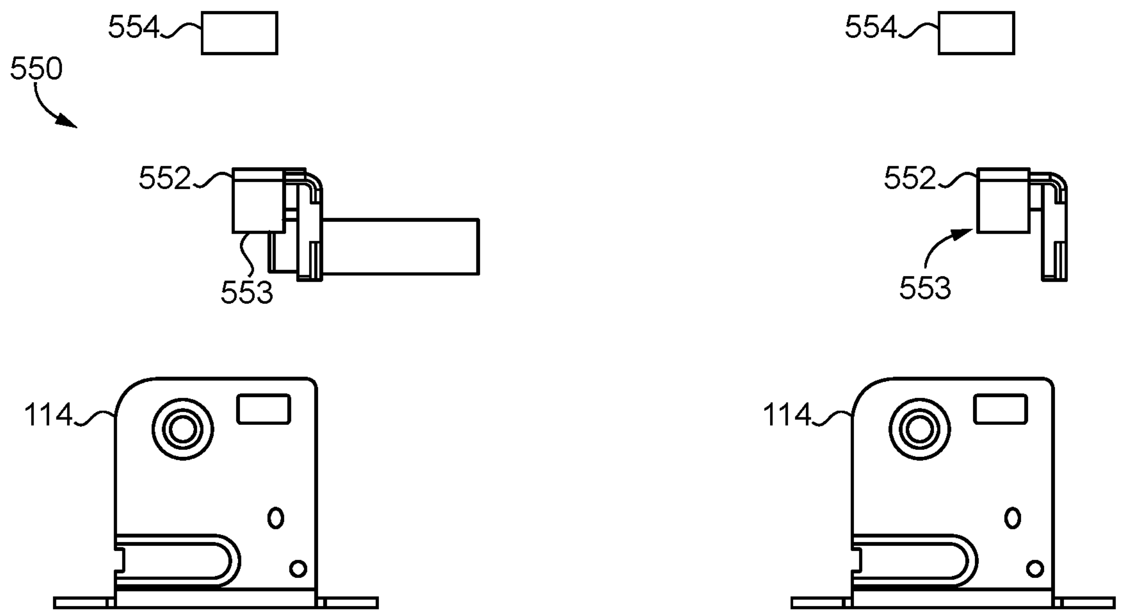
FIG. 23 is an illustration of a portion of the exit device with a mounting bracket bumpstop assembly according to certain embodiments.
Figure 24:
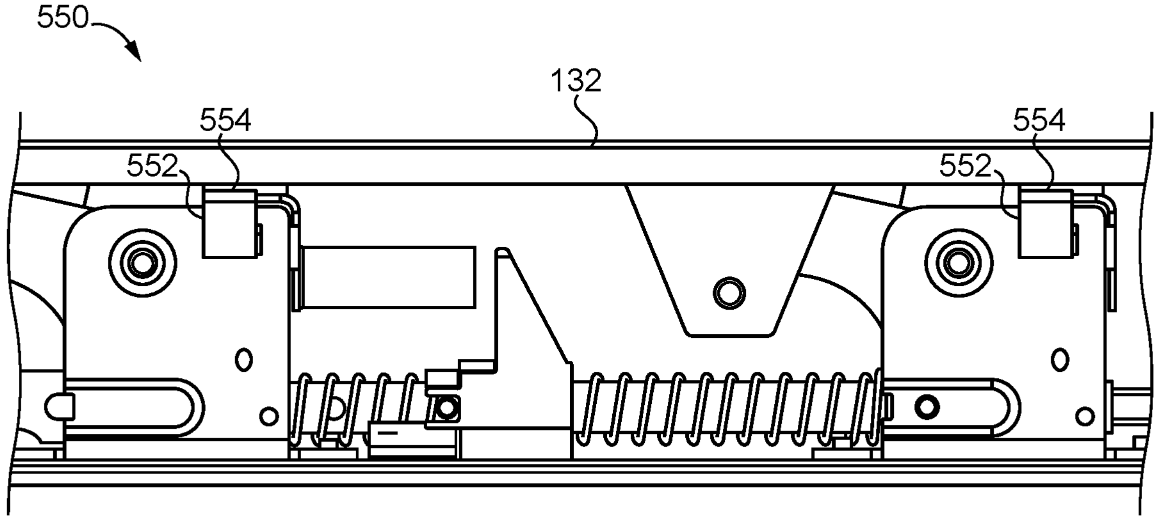
FIG. 24 illustrates the exit device and the mounting bracket bumpstop assembly with the pushbar in a depressed position.

FIGS. 23 and 24 illustrate a noise reduction mechanism in the form of a bell crank bracket bumpstop assembly 550 configured to reduce noise generated by impact of the pushbar 132 on the bell crank brackets 114 of the mounting assembly 110. The bumpstop assembly 550 includes a pair of housing brackets 552, each of which has a pad 554 mounted thereon. The housing brackets 552 are configured for mounting to the bell crank brackets 114. For example, the housing brackets 552 may include snap features 553 that engage openings in the bell crank brackets 114. The pads 554 are formed of a soft material operable to absorb impact energy and vibrations. As the pushbar 132 approaches the fully depressed position (FIG. 24), the underside of the pushbar 132 comes into contact with the pads 554. The pads 554 absorb the mechanical impact energy, thereby reducing noise generation.

While other forms are contemplated, the illustrated pads 554 are formed of a foam, such as a microcell foam. The pads 554 may be mounted to the housing brackets 552 via an adhesive, such as a double-sided adhesive tape. In certain forms, the pads 554 may be provided with an adhesive side that is coated with a protective film. In such forms, installation of the bumpstop assembly 550 may include removing the protective film and placing the adhesive side of each pad 554 in contact with the appropriate surface of the housing bracket 552.

Figure 25:
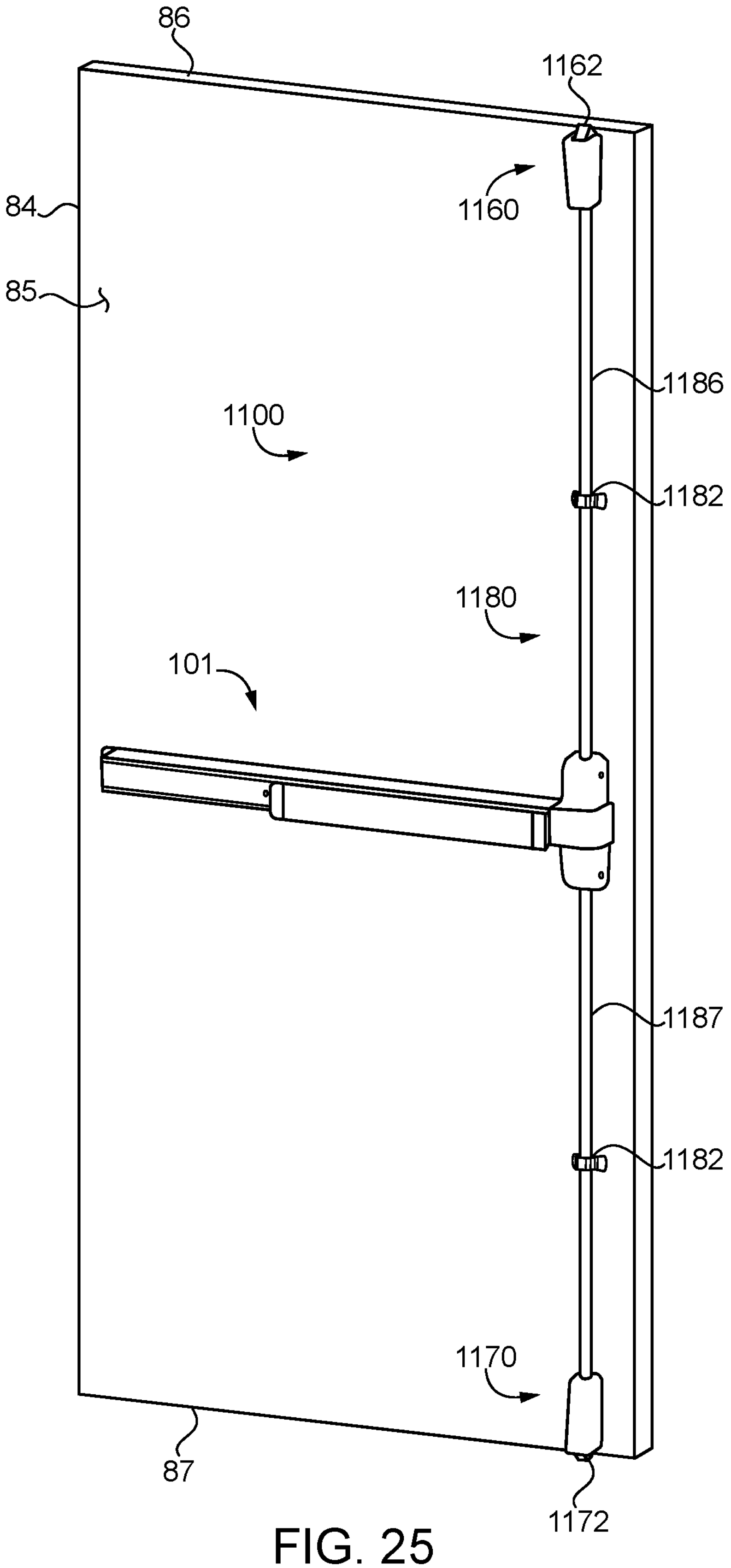
FIG. 25 is an illustration of another form of exit device installed to a door.

With reference to FIG. 25, illustrated therein is an exit device 1100 that may be utilized in connection with certain embodiments. The exit device 1100 includes the pushbar assembly 101 illustrated in FIG. 1, and further includes a remote latching assembly 1150 of the type commonly referred to as a surface vertical rods (SVR) remote latching assembly. While the above-described latch mechanism 150 is omitted in the illustrated embodiment, it is also contemplated that the exit device 1100 may include both the remote latching assembly 1150 and a latch mechanism 150 of the type illustrated in FIGS. 1-3.

The remote latching assembly 1150 is mounted to the interior side surface 85 of the door 84, and generally includes an upper latch mechanism 1160 mounted adjacent the upper edge 86 of the door 84, a lower latch mechanism 1170 mounted adjacent the lower edge 87 of the door 84, and a connection assembly 1180 extending between the pushbar assembly 101 and the upper and lower latch mechanisms 1160, 1170. As described herein, the connection assembly 1180 operably connects the pushbar assembly 101 with the upper and lower latch mechanisms 1160, 1170 such that actuation of the pushbar assembly 101 causes a corresponding actuation of the latch mechanisms 1160, 1170. In certain forms, the connection assembly 1180 may be considered to be included in the latch control assembly 140.

The upper latch mechanism 1160 includes an upper latchbolt 1162, and the lower latch mechanism 1170 includes a lower latchbolt 1172. The upper latchbolt 1162 has an upward extended position in which the latchbolt 1162 extends above the top edge 86 and is operable to engage a strike on the upper jamb of the frame, and a downward retracted position in which the latchbolt 1162 is disengaged from upper jamb. Similarly, the lower latch bolt 1172 has a downward extended position in which the latchbolt 1172 extends below the bottom edge 87 and is operable to engage a pocket in the floor, and an upward retracted position in which the latchbolt 1172 is disengaged from the floor. Thus, each of the latchbolts 1162, 1172 has a laterally-outward extended position in which the latchbolt 1162/1172 is operable to engage the frame to retain the door 84 in the closed position, and a laterally-inward retracted position in which the latchbolt 1162/1172 is disengaged from the frame and does not prevent the door 84 from being opened. One or both of the latch mechanisms 1160, 1170 includes a biasing member urging the latch mechanism 1160/1170 to the deactuated state thereof, which may involve urging the respective latchbolt 1162/1172 to the extended position thereof.

The connection assembly 1180 generally includes an upper rod 1186 and a lower rod 1187, each of which is rigid. Each of the rods 1186, 1187 is slidably mounted for movement in the vertical lateral directions, and guide brackets 1182 aid in constraining the rods 1186, 1187 to movement in the lateral directions. In certain forms, the guide brackets 1182 may be considered to be included in the mounting assembly 110. Each of the rods 1186, 1187 is connected between the pushbar assembly 101 and a corresponding one of the latch mechanisms 1160, 1170 such that actuation of the drive assembly 120 causes a corresponding actuation of the remote latching assembly 1150. More specifically, the laterally inward end of each rod 1186, 1187 is connected to a corresponding one of the connector links 146, and the laterally outward end of each rod 1186, 1187 is connected to a corresponding one of the latch mechanisms 1160, 1170.

During operation of the exit device 1100, actuation of the drive assembly 120 causes a corresponding actuation of the latch control assembly 140 in the manner described above. This actuation of the latch control assembly 140 drives the connector links 146 laterally inward (i.e., toward one another), thereby causing a corresponding laterally inward movement of the rods 1186, 1187. The laterally inward movement of the rods 1186, 1187 actuates the latch mechanisms 1160, 1170 against the biasing forces urging the latch mechanisms 1160, 1170 to the deactuated states thereof. When the drive assembly 120 is subsequently released, the latch control assembly 140 becomes free to move toward its deactuated state. The biasing members of the latch mechanisms 1160, 1170 urge the rods 1186, 1187 laterally outward, thereby driving the connector links 146 laterally outward and deactuating the latch control assembly 140.

The deactuating movement of the latch control assembly 140 may be slowed by one or more of the above-described noise reduction mechanisms, such as the control link damper assembly 300 illustrated in FIGS. 8-10. Additionally or alternatively, the deactuating movement of the latch control assembly 140 may be slowed by another form of noise reduction mechanism, such as a noise reduction mechanism that slows the deactuating movement of the remote latching assembly 1150. Two examples of such SVR damper assemblies will now be provided.

Figure 26:
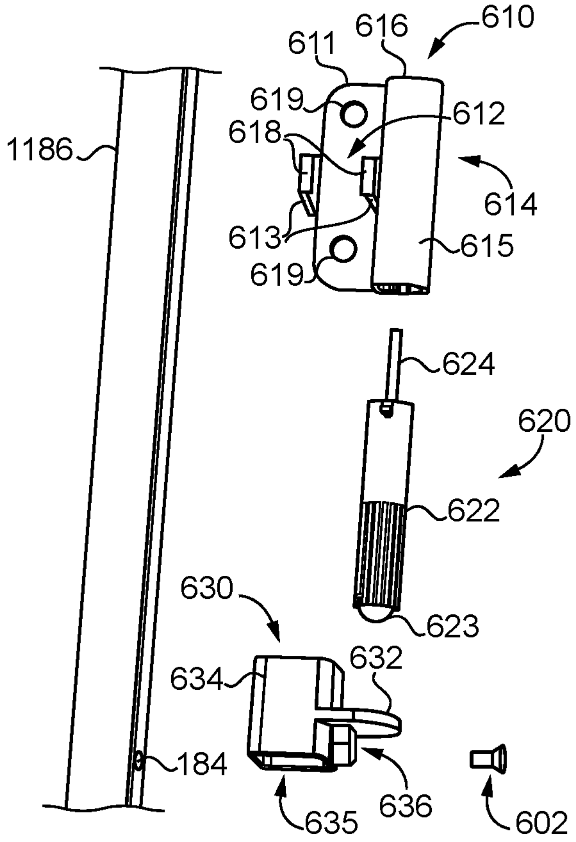
FIG. 26 is an exploded assembly illustration of a vertical rod linear damper assembly according to certain embodiments.
Figure 27:
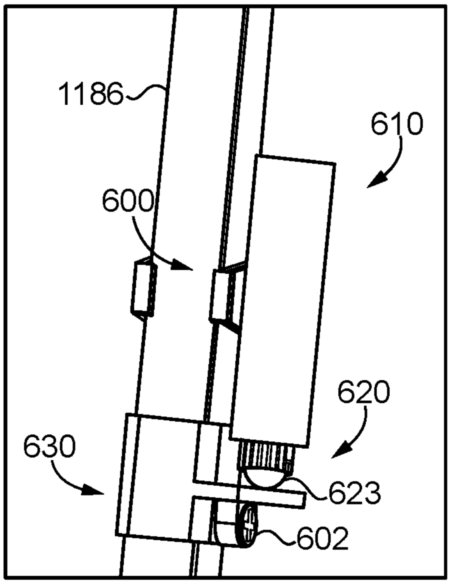
FIG. 27 illustrates the vertical rod linear damper assembly of FIG. 26 with the rod in an extended or deactuated position.
Figure 28:
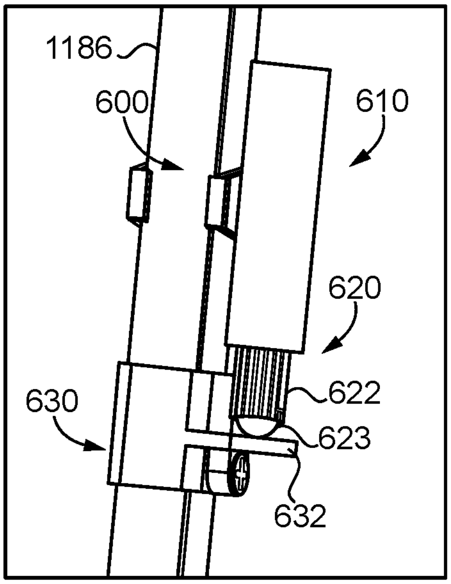
FIG. 28 illustrates the vertical rod linear damper assembly of FIG. 26 with the rod in a retracted or actuated position.
Figure 30:
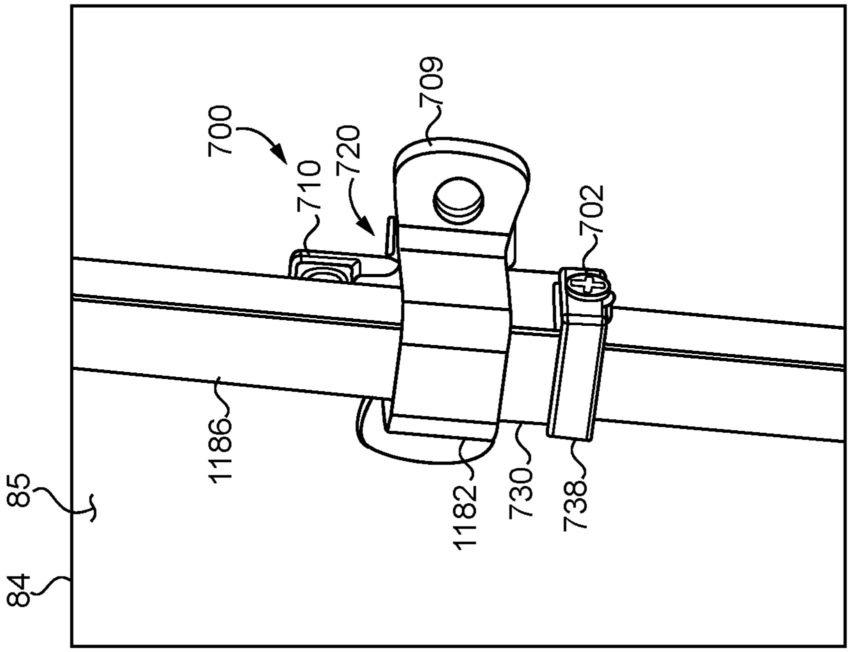
FIG. 30 is a perspective illustration of the vertical rod rotary damper assembly of FIG. 29 as installed.
Figure 29:
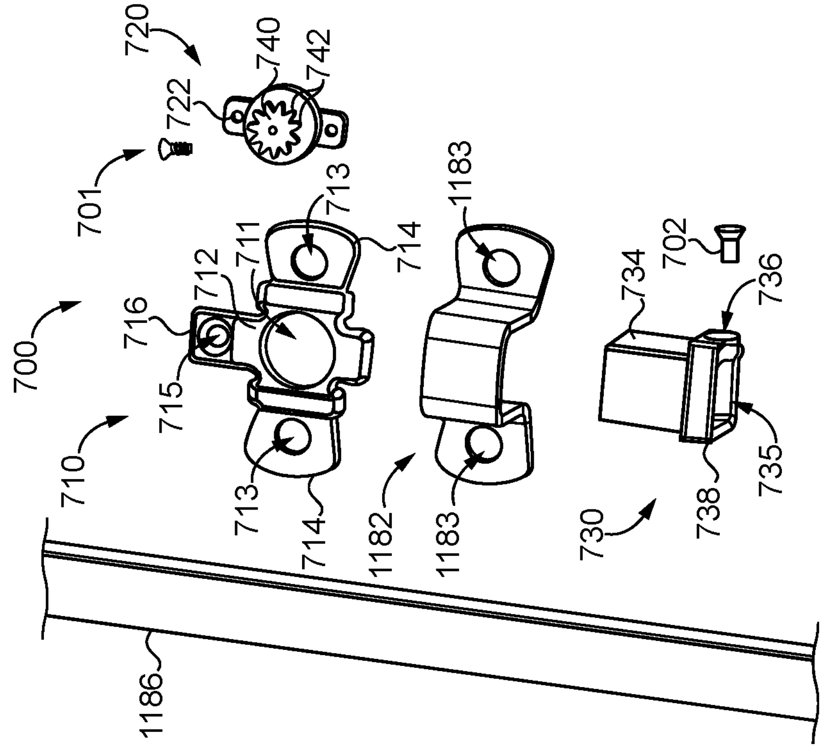
FIG. 29 is an exploded assembly illustration of a vertical rod rotary damper assembly according to certain embodiments.
Figure 31:
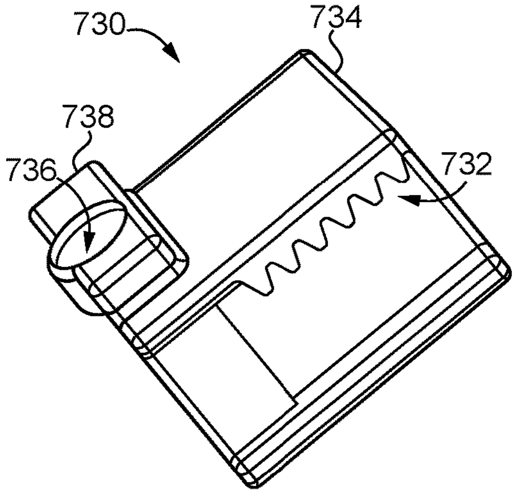
FIG. 31 is a perspective illustration of a component of the vertical rod rotary damper assembly illustrated in FIG. 29.
Figure 32:
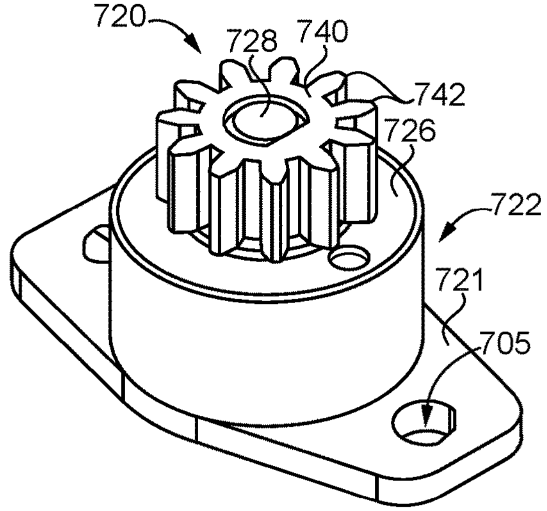
FIG. 32 is a perspective illustration of a rotary damper that may be utilized in the vertical rod rotary damper assembly illustrated in FIG. 29.
Figure 33:
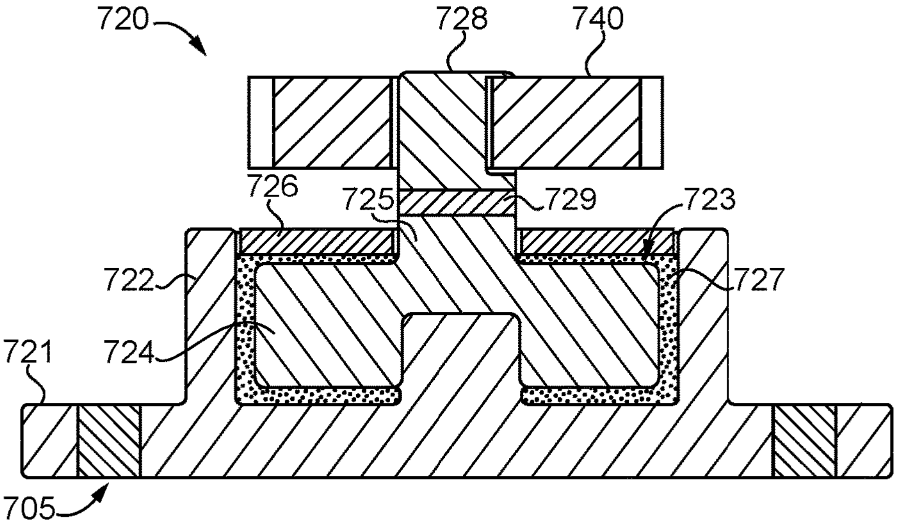
FIG. 33 is a schematic cross-sectional representation of the rotary damper illustrated in FIG. 32.
Figure 34:
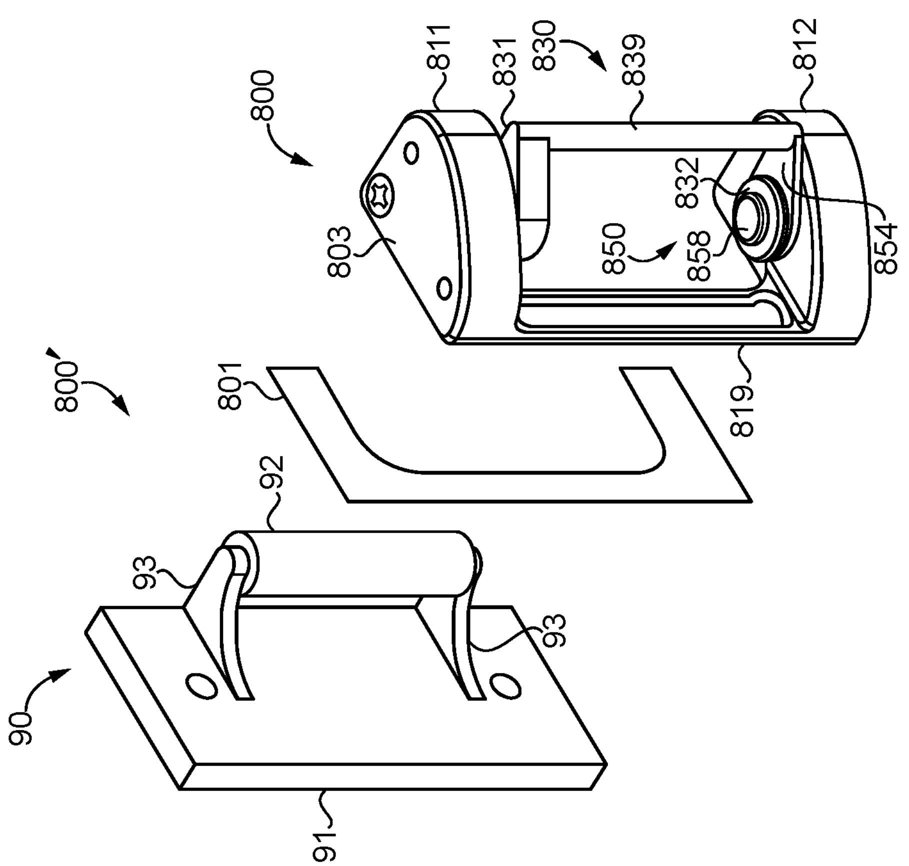
FIG. 34 is a partially-exploded assembly illustration of a strike and a latchbolt damper assembly according to certain embodiments.
Figure 35:
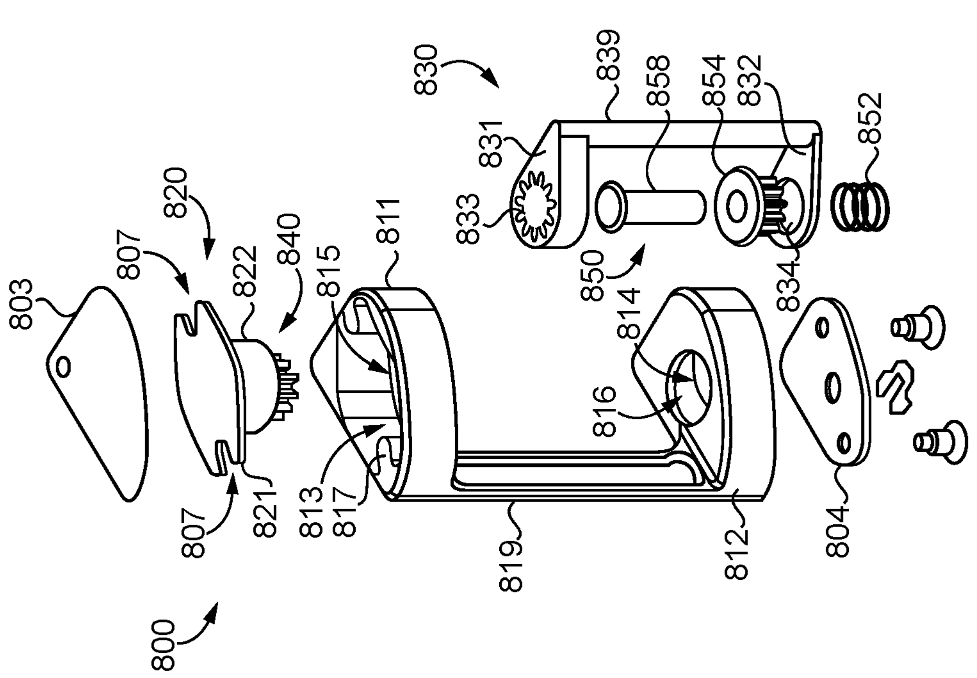
FIG. 35 is an exploded assembly illustration of the latchbolt damper assembly illustrated in FIG. 34.
Figure 36:
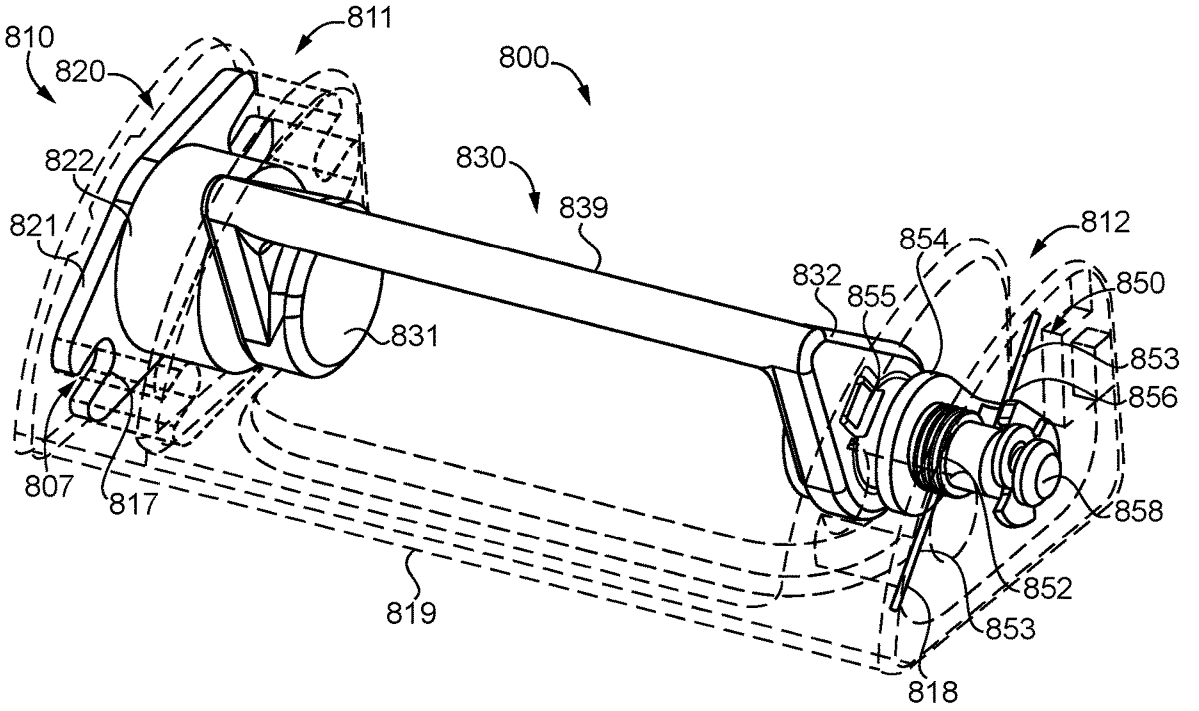
FIG. 36 is a perspective illustration of the latchbolt damper assembly of FIG. 34.

With reference to FIGS. 26-28, illustrated therein is a noise reduction mechanism in the form of an SVR linear damper assembly 600 configured for use with SVR remote latching assemblies, such as those of the type illustrated in FIG. 25. The damper assembly 600 is similar to the above-described connector link damper assembly 200, and similar reference characters are used to indicate similar elements and features. For example, the SVR linear damper assembly 600 includes a housing bracket 610, a linear damper 620, and a stop member 630, which respectively correspond to the housing bracket 210, linear damper 220, and stop member 230 of the above-described connector link damper assembly 200. In the interest of conciseness, the following description of the damper assembly 600 focuses primarily on elements and features that are different from those of the damper assembly 200 and/or were not specifically described with reference to the damper assembly 200.

The housing bracket 610 generally includes a base plate 611, a pair of sidewalls 613 extending from the base plate 611, and a mounting feature 614 including a tube 615 operable to slidably receive the damper 620. The sidewalls 613 are spaced apart from one another such that the sidewalls 613 define a channel 612, and one or both of the sidewalls 613 may terminate in a tab 618 that extends toward the other sidewall and at least partially encloses the channel 612. In certain forms, the base plate 611 may be considered to be included in the mounting assembly 110 of the exit device 1100.

The base plate 611 may include one or more openings 619 that facilitate mounting of the housing bracket 610 to the door 84. For example, screws may be inserted through the openings 619 and engaged with the material of the door 84 to secure the housing bracket 610 to the interior side face 85 at a location behind the upper rod 1186. The rod 1186 may then be inserted into the channel 612 such that the sidewalls 613 and the tabs 618 aid in constraining the rod 1186 to sliding movement in the lateral directions. With the housing bracket 610 mounted to the door, the tube 615 extends in the lateral directions and terminates in an upper wall 616. As a result, the tube 615 is operable to constrain the damper 620 to movement in the vertical directions, and to limit movement of the damper 620 in the upward deactuating direction.

As is the case with certain previously-described embodiments, the illustrated damper 620 is movably mounted to the housing bracket 610. More specifically, the damper 620 is inserted into the tube 615 such that the plunger 624 abuts the upper wall 616, and the body portion 622 is slidingly engaged with one or more walls of the tube 615. Additionally, the bumper 623 projects below the lower extent of the tube 615 such that the stop member 630 is capable of engaging the bumper 623.

The interface member or stop member 630 includes a stop wall 632 that extends from a body portion 634 defining an opening 635. The opening 635 is sized and configured to receive the rod 1186 to facilitate coupling of the stop member 630 and the rod 1186. With the rod 1186 received in the opening 635, the stop member 630 can be coupled to the rod 1186, such as by engaging the rod 1186 with a screw 602 that extends through an aperture 636 formed in the stop member 630.

In order to place the stop member 630 in the appropriate position relative to the upper rod 1186, the damper assembly 600 may first be partially installed, with the housing bracket 610 mounted to the door 84, the damper 620 mounted to the housing bracket 610, and the stop member 630 slidably seated on the rod 1186. With the rod 1186 in its extended or deactuated position, the stop member 630 is then moved upward such that the stop wall 632 engages the bumper 623 and depresses the plunger 624. With the plunger 624 in its depressed position, the screw 602 is advanced to engage the rod 1186, thereby coupling the rod 1186 and the stop member 630 in the appropriate relative position.

While the location at which the stop member 630 is coupled to the rod 1186 is adjustable in the illustrated embodiment, it is also contemplated that this position may be predetermined. For example, a predetermined location may be defined by the alignment of an aperture 1184 in the rod 1186 and the aperture 636 in the stop member 630. In certain embodiments, the location at which the stop member 630 is coupled to the rod 1186 may be both predetermined and adjustable. For example, the rod 1186 may include plural apertures or an elongated scalloped slot, where each aperture or scallop defines one of the plurality of predetermined locations.

During operation of the exit device 1100, the SVR linear damper assembly 600 functions in a manner analogous to that in which the previously-described linear damper assemblies 200, 300, 400 function. When the exit device 1100 is in its natural deactuated state, the rods 1186, 1187 are retained in the laterally-outward or extended positions thereof, for example by biasing members internal to the latch mechanisms 1160, 1170. In this state (FIG. 27), the stop wall 632 is in close proximity to the housing bracket 610, and engages the damper 620 to retain the plunger 624 in its depressed position. As the exit device 1100 is actuated, the rods 1186, 1187 travel laterally inward, thereby causing the stop wall 632 to move away from the damper 620. As a result, the damper 620 expands under the force of its internal biasing mechanism to the state illustrated in FIG. 28, in which the plunger 624 is in its projected position.

When subsequent deactuation of the exit device 1100 causes the rods 1186, 1187 to travel laterally outward, the stop wall 632 engages the damper 620 and drives the plunger 624 toward its depressed position. This relative movement of the body portion 622 and plunger 624 is resisted by the damper 620, such that the damper 620 slows the extension speed of the upper rod 1186. This slowing of the deactuating speed of the upper rod 1186 in turn slows the deactuating speeds of the latch control assembly 140 and the latch mechanisms 1160, 1170, thereby reducing operational noise in the manner described above.

As should be evident from the foregoing, the linear damper 620 includes a first member and a second member, and is configured to resist relative movement of the first member and the second member in a deactuating direction. The first member includes one of the body portion 622 or the plunger 624, and the second member includes the other of the body portion 622 or the plunger 624. The body portion 622 and the plunger 624 are coupled to one another for relative movement in the deactuating direction, which corresponds to compression of the damper 620, and an opposite actuating direction corresponding to expansion of the damper 620. The damper 620 is engaged with the rod 1186 and the housing bracket 610 such that deactuating movement of the rod 1186 causes relative movement of the body portion 622 and the plunger 624 in the deactuating direction, thereby causing the damper 620 to slow the deactuation of the latch control assembly 140 to which the rod 1186 is coupled. Additionally, the damper 620 is engaged with the rod 1186 via an interface member in the form of a stop member 630.

While the SVR linear damper assembly 600 has been illustrated and described as being associated with the upper rod 1186, it also contemplated that the damper assembly 600 may be rotated about the transverse axis 180° from the illustrated orientation for installation at the lower rod 1187. It is to be appreciated that as a result of the interconnection of the rods 1186, 1187 via the latch control assembly 140, a damper assembly associated with one of the rods 1186, 1187 will also provide for slowing of the other of the rods 1186, 1187. If desired, further slowing of both rods 1186, 1187 may be achieved by using plural instances of the damper assembly 600, or by using the damper assembly 600 in combination with one or more of the above-described damper assemblies 200, 300.

With reference to FIG. 29-33, illustrated therein is a noise reduction mechanism in the form of an SVR rotary damper assembly 700 configured for use with SVR remote latching assemblies, such as those of the type illustrated in FIG. 25. The damper assembly 700 generally includes a housing bracket 710 configured for mounting with the guide bracket 1182, a rotary damper 720 configured for mounting to the housing bracket 710, and a rack member 730 that is configured for mounting to either of the rods 1186, 1187 and which is operable to engage a pinion gear 740 of the rotary damper 720.

The illustrated housing bracket 710 includes a body portion 712, a pair of wings 714 extending from opposite sides of the body portion 712, and a tab 716 extending from another side of the body portion 712. The housing bracket 710 also includes a plurality of apertures that facilitate the installation of the damper assembly 700 to the exit device 1100 and the door 84. More specifically, the housing bracket 710 includes a receiving aperture 711 formed in the body portion 712, a pair of mounting apertures 713 formed in the wings 714, and an attachment aperture 715 formed in the tab 716.

The damper 720 is mounted behind the body portion 712 such that a portion of the damper 720 extends through the receiving aperture 711, and may be attached to the housing bracket via the attachment aperture 715. For example, a screw 701 may extend through the attachment aperture 715 and engage a threaded aperture 705 of the damper 720. The mounting apertures 713 are sized and spaced for alignment with corresponding mounting apertures 1183 formed in the guide bracket 1182. In certain embodiments, the guide bracket 1182 may be an existing guide bracket 1182 provided with the exit device 1100. In certain embodiments, the damper assembly 700 may include the guide bracket 1182. In certain embodiments, the guide bracket 1182 may be considered to be included in the mounting assembly 110.

The rotary damper 720 generally includes a base plate 721, a body portion or stator 722 defining a chamber 723, a rotor 724 rotatably mounted to the stator 722, and a cap 726 that encloses the chamber 723. The rotor 724 is mounted in the chamber 723, and includes a stem 725 that extends through an opening in the cap 726. The cap 726 cooperates with the stator 722 and the rotor 724 to form a fluid-tight seal for the chamber 723. The sealed chamber 723 is filled with a hydraulic fluid 727 that generates a resistive torque in response to rotation of the rotor 724 relative to the stator 722, such as silicone oil. The stem 725 is engaged with a shaft 728 via a one-way clutch 729 that couples the stem 725 and shaft 728 for joint rotation in one rotational direction while allowing relative rotation of the stem 725 and shaft 728 in the opposite rotational direction. The pinion gear 740 is mounted to the shaft 728 such that the gear 740 is engaged with the rotor 724 via the one-way clutch 729.

Like the above-described stop member 630, the rack member 730 is configured for mounting to the rods 1186, 1187, and includes a body portion 734 defining an opening 735 sized and shaped to receive and guide the rod 1186, 1187, and an aperture 736 that facilitates the mounting of the rack member 730 to the rod 1186, 1187 using a screw 703. However, in lieu of the stop wall 632, the rack member 730 includes a gear rack 732 sized and shaped to engage the teeth 742 of the gear 740, thereby providing an interface between the rod 1186 and the damper 720. One end portion of the rack member 730 includes a shoulder 738 through which the screw aperture 736 extends, and which facilitates installation of the damper assembly 700 in the manner described herein.

With the damper assembly 700 installed (FIG. 30), the wings 714 of the housing bracket 710 are clamped between the corresponding portions of the guide bracket 1182 by a pair of screws 709, which extend through the mounting apertures 1183, 713 and engage the interior side face 85 of the door 84. The rotary damper 720 and the pinion gear 740 are held in place behind the rod 1186 by the housing bracket 710, and the rack member 730 is attached to the upper rod 1186 such that the gear rack 732 faces the interior side door face 85 and is aligned or engaged with the pinion gear 740.

In certain embodiments, the rack member 730 may be provided with the appropriate location relative to the rod 1186 using a technique similar to that described above with reference to the stop member 630. For example, the damper assembly 700 may first be partially installed, with the housing bracket 710 mounted to the door 84, the damper 720 mounted to the housing bracket 710, and the rack member 730 slidably seated on the upper rod 1186 with the gear rack 732 facing the door 84. With the rod 1186 in its extended or deactuated state, the rack member 730 is then moved upward such that the shoulder 738 abuts the guide bracket 1182, and the screw 802 is advanced to secure the rack member 730 to the rod 1186. In this state, the pinion gear 840 is engaged with the lower end portion of the gear rack 732, which ensures that the pinion gear 740 remains engaged with the gear rack 732 throughout at least the latter portion of the deactuating movement of the upper rod 1186.

During actuation of the exit device 1100, the rods 1186, 1187 move laterally inward in the manner described above, thereby carrying the rack member 730 in the laterally inward direction of the rod 1186/1187 to which it is mounted. This movement of the rack member 730 causes the gear rack 732 to engage the teeth 742 of the pinion gear 740 such that the pinion gear 740 and the shaft 728 rotate in an actuating rotational direction. The directionality of the one-way clutch 729 is selected such that this rotation of the shaft 728 and gear 740 is not transmitted to the rotor 724. As a result, the actuating movement of the pinion gear 740 and the rack member 730 (and thus of the rods 1186, 1187, latch mechanisms 1160, 1170, and latch control assembly 140) is not inhibited by the damper 720.

During a subsequent deactuation of the exit device 1100, the rods move laterally outward in the manner described above, thereby carrying the rack member 730 in the laterally outward direction of the rod 1186/1187 to which it is mounted. This movement of the rack member 730 causes the gear rack 732 to rotate the pinion gear 740 and the shaft 728 in a deactuating rotational direction opposite the actuating rotational direction. The directionality of the one-way clutch 729 is selected such that this rotation of the shaft 728 and gear 740 is transmitted to the rotor 724, thereby causing the rotor 724 to rotate within the hydraulic fluid 727. The hydraulic fluid 727 resists such rotation of the rotor, thereby slowing the movement speed of the pinion gear 740 and the rack member 730. As a result, the deactuating speeds of the rods 1186, 1187, the latch mechanisms 1160, 1170, and the latch control assembly 140 are slowed, thereby reducing the level of noise generated during deactuation of the exit device 1100, such as noise resulting from rattle, impact, and sliding engagement.

As should be evident from the foregoing, the rotary damper 720 includes a first member and a second member, and is configured to resist relative movement of the first member and the second member in a deactuating direction. The first member includes one of the stator 722 or the pinion gear 740, and the second member includes the other of the stator 722 or the pinion gear 740. The stator 722 and the pinion gear 740 are coupled to one another for relative movement in the deactuating direction and an actuating direction opposite the deactuating direction. The rotary damper 720 is engaged with the rod 1186 and the guide bracket 1182 such that deactuating movement of the rod 1186 causes relative movement of the stator 722 and the pinion gear 740 in the deactuating direction, thereby causing the damper 720 to slow the deactuation of the latch control assembly 140 to which the rod 1186 is coupled. Additionally, the damper 720 is engaged with the rod 1186 via an interface member in the form of a rack member 730.

Although the SVR rotary damper assembly 700 is illustrated as being associated with the upper rod 1186, it also contemplated that the damper assembly 700 may be rotated about the transverse axis 180° from the illustrated orientation for installation at the lower rod 1187. It is to be appreciated that as a result of the interconnection of the rods 1186, 1187 via the latch control assembly 140, a damper assembly associated with one of the rods 1186, 1187 will also provide for slowing of the other of the rods 1186, 1187. If desired, further slowing of both rods 1186, 1187 may be achieved by using plural instances of the damper assembly 700, or by using the damper assembly 700 in combination with one or more of the above-described damper assemblies 200, 300, 600.

While two embodiments of SVR damper assemblies 600, 700 have been illustrated and described herein, it is to be appreciated that other principles of operation may be utilized to provide the resistance that slows the movement of the rods 1186, 1187. By way of example, a case with magnets may be fit over the rods 1186, 1187 such that eddy current effects slow movement of the rods 1186, 1187 in both directions. Furthermore, while the illustrated exit device 1100 provides for joint movement of the rods 1186, 1187, other exit devices having vertical rods may allow for movement of the rods relative to one another. For exit devices of this type, two instances of a damper assembly and/or a magnetic assembly may be utilized to provide both rods with the desired degree of slowing.

Additionally, while certain exemplary arrangements of the SVR damper assemblies 600, 700 have been illustrated, it is to be appreciated that other arrangements are also contemplated. For example, in the illustrated embodiments, the interface member (i.e., the stop member 630 and the rack member 730) is mounted to the rod 1186, and the housing bracket 610/710 is secured to the door 84 such that a portion of the damper 620/720 is stationary relative to the door 84 and the mounting assembly. It is also contemplated that these arrangements may be reversed, such that the interface member 630/730 is secured to the door 84, and the housing bracket 610/710 is mounted to the rod 1186 such that a portion of the damper 620/720 is stationary relative to the rod 1186.

Turning now to FIGS. 34-39, illustrated therein is another embodiment of a noise-reduction mechanism in the form of a latchbolt damper assembly 800 configured for use with exit devices having latchbolts that interface with roller strikes in the manner described herein. While the following descriptions are made with specific reference to the latchbolt 152, it is to be appreciated that the latchbolt damper assembly 800 may be utilized in combination with other forms of latchbolts, such as the latchbolt 1162 of the upper latch mechanism 1160. Unlike the embodiments that are configured to be installed to the door or the exit device itself, the current embodiment is configured to be installed to the frame 82. More particularly, the damper assembly 800 is a modular construct configured to be mounted to the strike 90, and may alternatively be referred to herein as a strike module. In certain forms, the damper assembly 800 may be provided in a strike assembly 800' that further includes the strike 90. As described herein, the damper assembly 800 is configured to slow the deactuating movement of the latchbolt 152 when the door 84 is at or near its closed position.

The strike 90 generally includes a base plate 91, a pair of spaced-apart arms 93 extending from the base plate 91, and a roller 92 rotatably supported by the arms 93. As the door 84 approaches its closed position during normal operation of the exit device 100, the roller 92 engages the latchbolt 152 and urges the latchbolt 152 toward its retracted position. As the door 84 reaches its fully closed position, the latchbolt 152 clears the roller 92 and moves toward its extended position under the urging of the return spring 153. Thereafter, the roller 92 is operable to engage the forward side of the latchbolt 152 to prevent the door 84 from opening while the latchbolt 152 remains in its extended position.

The damper assembly 800 generally includes a housing 810, a rotary damper 820 mounted to the housing 810, a damping arm 830 pivotably mounted to the housing 810 and engaged with a pinion gear 840 of the rotary damper 820, and a bias mechanism 850 urging the damping arm 830 toward a projected rest position. In the illustrated embodiment, the damper assembly 800 is provided as a retrofit for an existing strike 90, and is configured to be mounted to the strike 90 using a double-sided adhesive tape 801, such as a metal adhesive tape. It is also contemplated that the damper assembly 800 may be configured to be mounted to the strike 90 in another manner, such as using screws or other forms of fasteners. In other embodiments, the strike 90 and the damper assembly 800 may be provided as a unit. For example, the housing 810 may be secured to or integral with the base plate 91 of the strike 90 at the time of sale.

The illustrated housing 810 is configured to be mounted to the base plate 91 of the strike 90, and is generally C-shaped to provide clearance for the roller 92 and the arms 93 of the strike 90. The housing 810 includes a connecting portion 819 from which a pair of spaced-apart limbs 811, 812 extend. Each limb 811, 812 of the housing 810 includes a pocket 813, 814 that receives internal components of the damper assembly 800 and which is covered by a corresponding cover plate 803, 804. As described herein, each pocket 813, 814 is connected to an opening 815, 816 facing the opposite limb 811, 812, and includes an engagement feature 817, 818 configured to engage the internal components housed therein.

The first limb 811 includes a first pocket 813 that receives the rotary damper 820 and which is covered by a first cover plate 803. The first pocket 813 is connected to a first opening 815 through which a portion of the rotary damper 820 extends. Additionally, the first pocket 813 is defined in part by an engagement feature 817 in the form of a pair of protrusions 817 that aid in rotationally coupling a portion of the rotary damper 820 to the housing 810.

Similarly, the second limb 812 includes a second pocket 814 that houses the bias mechanism 850 and which is covered by a second cover plate 804. The second pocket 814 is connected to a second opening 816 through which a portion of the bias mechanism 850 extends. Additionally, the second pocket 814 is defined in part by an engagement feature 818 in the form of an anchor wall 818 that provides an anchor point for a torsion spring 852 of the bias mechanism 850.

The rotary damper 820 is substantially similar to the above-described rotary damper 720, and similar reference characters are used to indicate similar elements and features. For example, the damper 820 includes a base plate 821, a stator 822 defining a chamber, a rotor having a stem, a cap, a hydraulic fluid, a shaft, a one-way clutch, and a pinion gear 840, which respectively correspond to the base plate 721, stator 722 defining a chamber 723, rotor 724 having a stem 725, cap 726, hydraulic fluid 727, shaft 728, one-way clutch 729, and pinion gear 740 of the above-described rotary damper 720. In the illustrated form, however, the threaded openings in the base plate have been replaced with a pair of notches 807 configured to matingly engage the protrusions 817 of the first pocket 813. When so engaged, the base plate 821 rotationally couples the stator 822 with the first limb 811, and the pinion gear 840 projects through the first opening 815 and provides a first support bearing for the damping arm 830.

Like the housing 810, the damping arm 830 includes a pair of spaced apart limbs 831, 832 that are connected by a connecting portion, which for the damping arm 830 is provided in the form of a contact bar 839 configured to contact the latchbolt 152. The contact bar 839 may be formed of or coated with a cushioning material that dampens vibrations resulting from the impact of the latchbolt 152 on the contact bar 839. The first limb 831 includes a gear-receiving recess 833 configured to matingly receive the pinion gear 840 such that the pinion gear 840 rotationally couples the first limb 831 of the damping arm 830 with the shaft of the rotary damper 820. Similarly, the second limb 832 includes a coupling opening 834 configured to matingly receive a coupling member 854 of the bias mechanism 850 such that the coupling member 854 is rotationally coupled with the second limb 832 of the damping arm 830.

In the illustrated form, the damper 820 includes the pinion gear 840, and the recess 833 of the first damping arm limb 831 is sized and shaped to matingly receive the pinion gear 840. It is also contemplated that the pinion gear 840 may be omitted. In such forms, the shaft of the damper 820 may be directly coupled to the first limb 831, or may be indirectly coupled to the first limb via one or more intermediate coupling members.

The bias mechanism 850 generally includes the torsion spring 852, the coupling member 854, and a pivot pin 858 that provides a second support bearing for the damping arm 830. The torsion spring 852 includes first and second arms 853, which are connected by a coiled portion that biases the arms 853 toward a rest position relative to one another. The coupling member 854 is rotatably mounted to the pivot pin 858, and includes a coupling portion 855 configured to be received in and mate with the coupling opening 834 to rotationally couple with the second limb 832 of the damping arm 830. The coupling member 854 further includes an anchor wall 856 that provides an anchor point for one of the torsion spring arms 853. With the other torsion spring arm 853 engaged with the anchor wall 818 of the second housing limb 812, the torsion spring 852 biases the damping arm 830 toward the projected rest position illustrated in FIGS. 33 and 36.

With the damper assembly 800 assembled, the damping arm 830 is biased toward a projected rest position by the biasing mechanism, and is capable of pivoting between the projected position and a depressed position through an intermediate position. Thus, with the damping arm 830 in the intermediate position, the damping arm 830 is biased in a projecting direction (i.e., toward the projected position) by the bias mechanism 850, and is capable of being driven in an opposite depressing direction (i.e., toward the depressed position). As a result of the rotational coupling between the damping arm 830 and the pinion gear 840, pivoting of the damping arm 830 in either direction will cause a corresponding rotation of the shaft to which the pinion gear 840 is mounted. Due to the provision of the one-way clutch, however, the rotary damper 820 will resist pivoting of the damping arm 830 only in the depressing direction. Thus, the rotary damper 820 will not inhibit the damping arm 830 from pivoting in the projecting direction under the urging of the bias mechanism 850.

Figure 37:
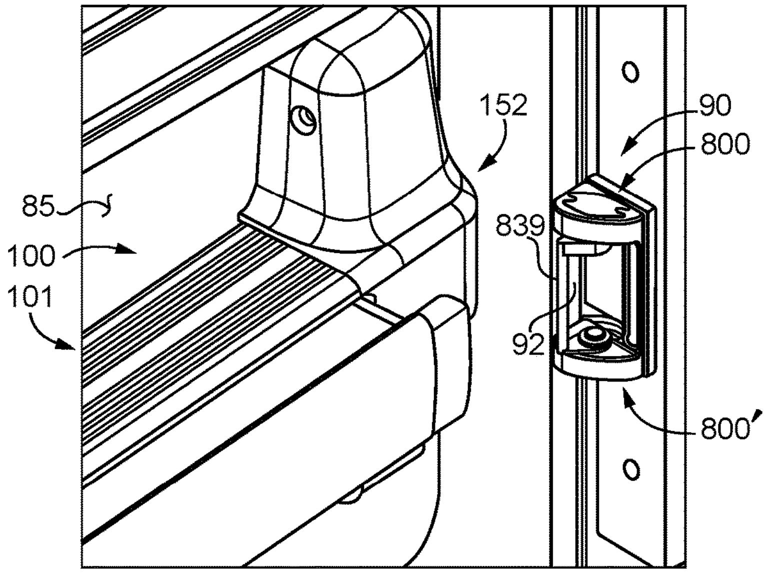
FIG. 37 illustrates the latchbolt damper assembly of FIG. 34 as installed to a door frame, with a door in an open position.
Figure 39:
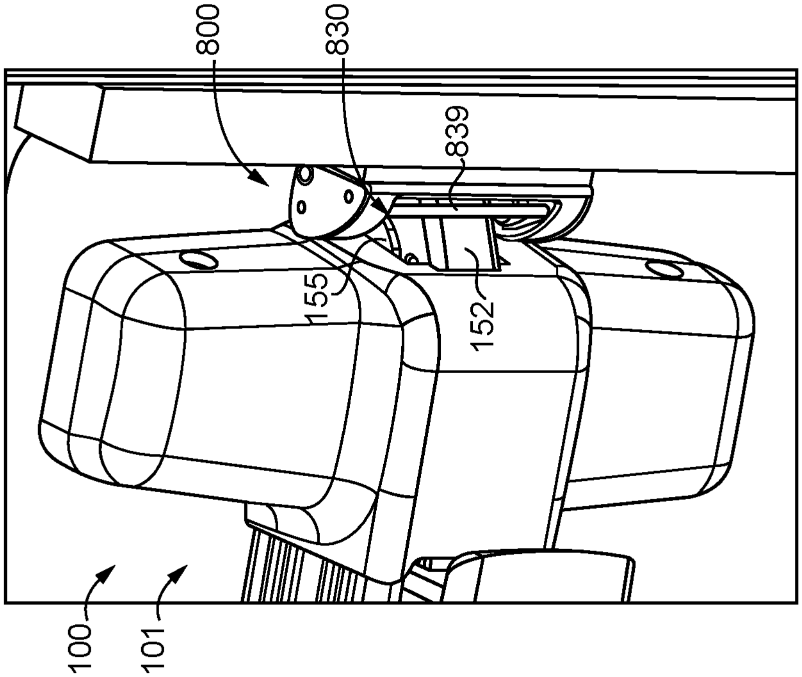
FIG. 39 illustrates the latchbolt damper assembly of FIG. 34 as installed to a door frame, with the door in a fully-closed position.
Figure 38:
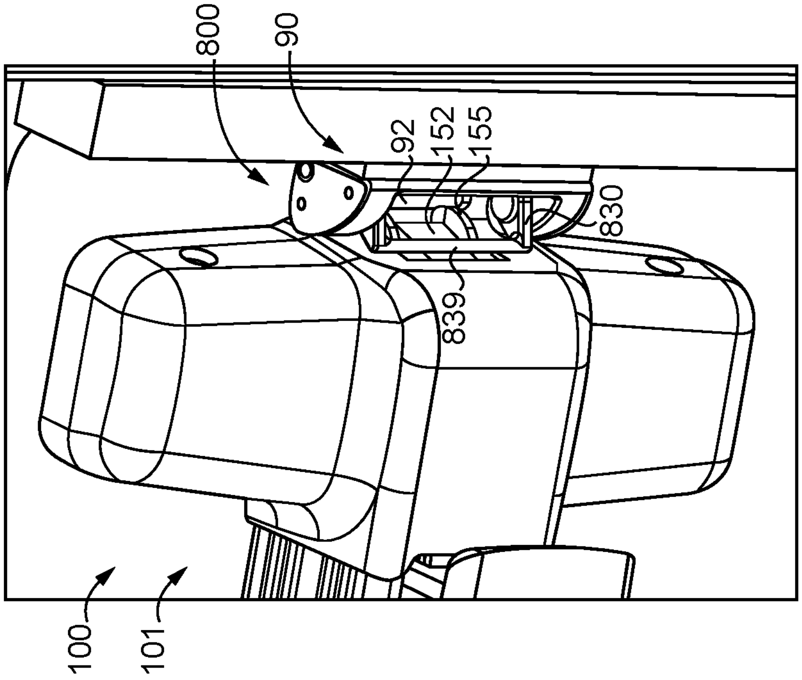
FIG. 38 illustrates the latchbolt damper assembly of FIG. 34 as installed to a door frame, with the door in a partially-closed position.

With reference to FIGS. 37-39, further details regarding the operation of the installed damper assembly 800 will now be provided. In FIG. 37, the damper assembly 800 is illustrated as being installed to the strike 90, thereby forming the strike assembly 800', and the door 84 is illustrated as approaching its closed position. In this state, the damping arm 830 has adopted its rest position under the urging of the torsion spring 852. With the damping arm 830 in its rest position, the contact bar 839 is positioned adjacent the roller 92. As the door 84 approaches its partially-closed position (FIG. 38), the latchbolt 152 and the guard bolt 155 are driven to their retracted positions by the roller 92, and the latchbolt 152 and/or the guard bolt 155 engage the contact bar 839 and pivot the damping arm 830 from the rest position to an intermediate position.

As the door 84 moves from its partially-closed position (FIG. 38) to its fully-closed position (FIG. 39), the latchbolt 152 clears the roller 92 and begins to move toward its extended position. In doing so, the latchbolt 152 engages the contact bar 839 and begins to pivot the damping arm 830 toward the depressed position. This pivotal movement in the depressing direction is resisted by the rotary damper 820 such that the damping arm 830 slows the extension speed of the latchbolt 152, thereby reducing the operational noise associated with the deactuation of the exit device 100. When the exit device 100 is subsequently actuated to retract the latchbolt 152, the damping arm pivots toward its intermediate position under the urging of the bias mechanism 850. As the door 84 moves toward its open position, the bias mechanism 850 returns the damping arm 830 to its projected position.

Figure 40:
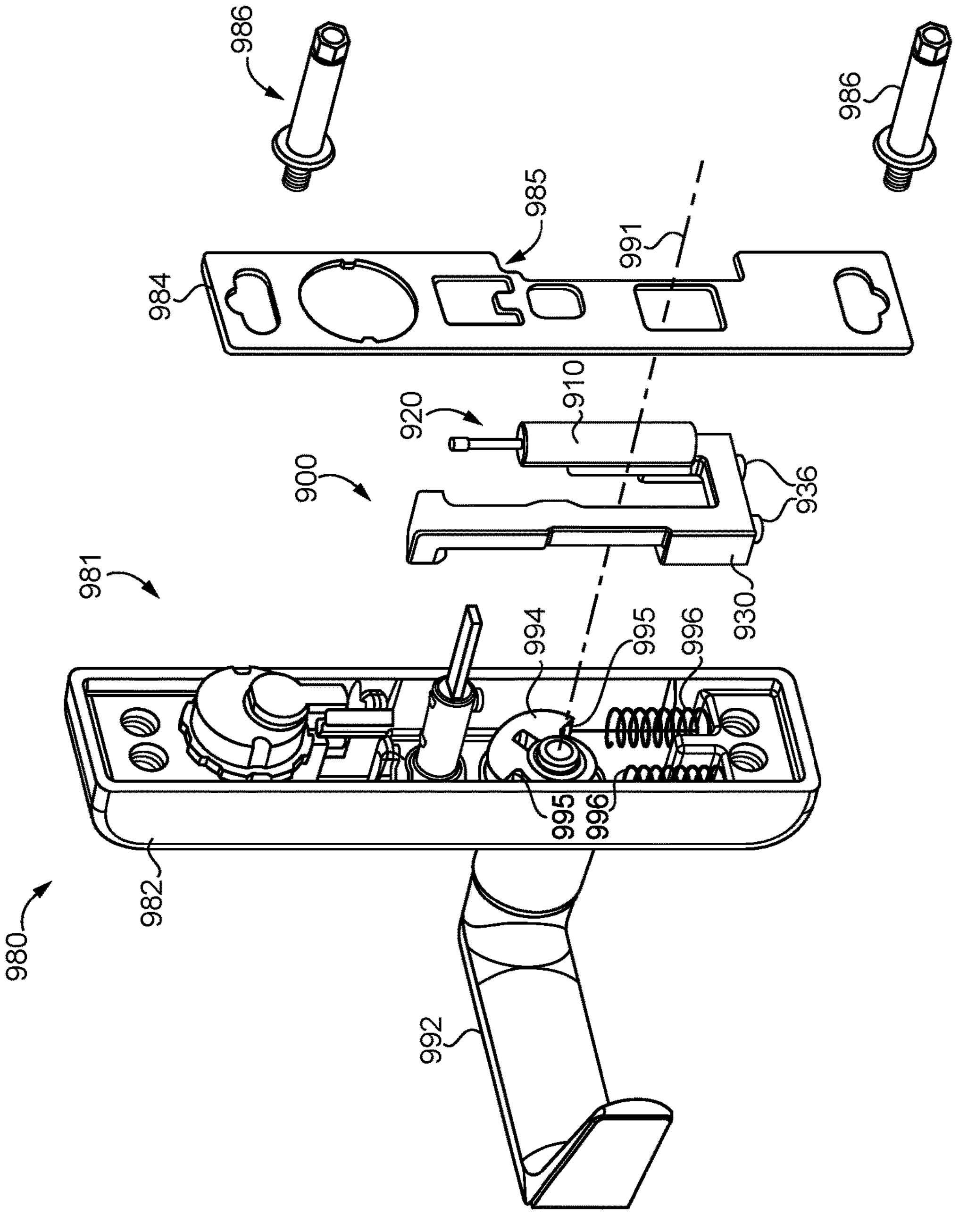
FIG. 40 is an exploded assembly view of a trim assembly including a damper assembly according to certain embodiments.

With reference to FIG. 40, illustrated therein is another form of trim assembly 980 including a noise reducing mechanism in the form of a trim damper assembly 900. The illustrated trim assembly 980 includes a housing assembly 981 including a vertically-oriented escutcheon 982, a base plate 984 mounted to the escutcheon 982, and a pair of standoffs 986 that secure the base plate 984 to the escutcheon 982 and project rearward therefrom. The trim assembly 980 further includes a handle 992 rotatably mounted to the escutcheon 982, and a cam 994 mounted within the escutcheon 982 and coupled to the handle 992 for joint rotation therewith. The cam 994 includes a pair of radial arms 995 that pivot about the rotational axis 991 of the handle 992 as the handle 992 rotates relative to the escutcheon 982.

Figure 41:
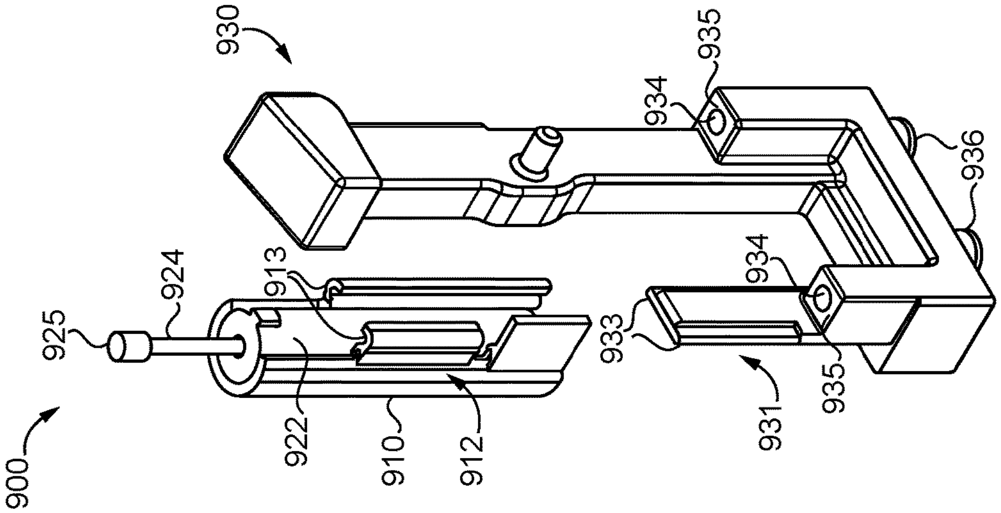
FIG. 41 is an exploded perspective illustration of the damper assembly illustrated in FIG. 40.

With additional reference to FIG. 41, the trim damper assembly 900 generally includes a housing 910, a damper 920 mounted in the housing 910, and a slider 930 to which the housing 910 is mounted. The housing 910 includes an engagement feature 912 including a pair of channels 913 for engaging the slider 930. The slider 930 includes a corresponding engagement feature 931 including splines 933 that are slidably received in the channels 913.

The damper 920 includes a first member in the form of a body portion 922 mounted within the housing 910, and a second member in the form of a plunger 924 that is movably mounted to the body portion 922. The plunger 924 has a projected position and a depressed position relative to the body portion 922, and is biased toward the projected position. The body portion 922 is filled with a hydraulic fluid that resists movement of the plunger 924 relative to the body portion. Like the previously-described dampers, the damper 920 is a one-way damper such that movement of the plunger 924 from the projected position to the depressed position is resisted to a greater degree than movement of the plunger 924 from the depressed position to the projected position.

The slider 930 is movably mounted within the escutcheon 982, and is retained in the escutcheon 982 by the base plate 984. The slider 930 is biased in its deactuating direction by a pair of springs 996, which are mounted in the escutcheon 982 and are engaged with posts 936 formed on the bottom of the slider 930. The slider 930 also includes a pair of ledges 935, each of which is operable to be engaged by a corresponding one of the arms 995 of the cam 994.

Figure 42:
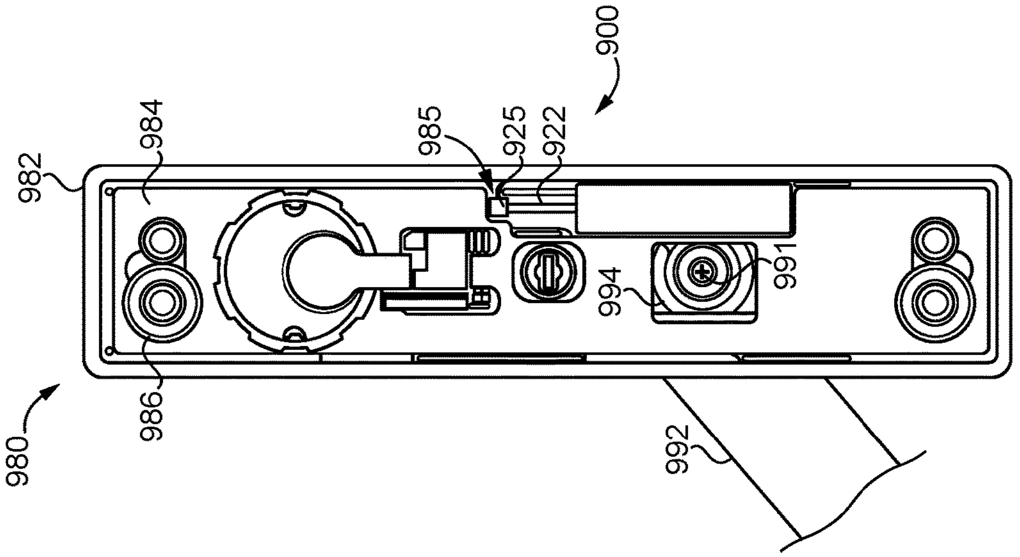
FIG. 42 is a plan view of the trim assembly illustrated in FIG. 40.

With additional reference to FIG. 42, the plunger 924 of the damper 920 is engaged with a tab 985 formed on the base plate 984. The plunger 924 may have a bumper 925 mounted thereon to reduce vibrations resulting from impact and/or engagement between the plunger 924 and the tab 985. With the handle 992 in its home position, the springs 996 urge the slider 930 upward, thereby urging the housing 910 and plunger 924 upward and retaining the plunger 924 in its depressed position.

During actuation of the trim assembly 980, rotation of the handle 992 from its home position causes a corresponding rotation of the cam 994, thereby causing one of the arms 995 to engage the corresponding ledge 935 of the slider 930. The slider 930 may be formed of a sound dampening material and/or may have a pad 934 mounted to the ledges 935 to dampen vibrations resulting from such impact. As the handle 992 continues to rotate about the rotational axis 991, the cam 994 drives the slider 930 downward, thereby compressing the springs 996. As the slider 930 moves in its actuating direction, the plunger 924 presses against the tab 985 and drives the body portion 922 downward, thereby causing the plunger 924 to adopt the projected position corresponding to the expanded state of the damper 920.

During deactuation of the trim assembly 980, the slider 930 returns to its upward position under the biasing force of the springs 996. During this upward deactuating movement, the ledge 935 engages the cam arm 995, thereby rotating the cam 994 and returning the handle 992 to its home position. Accordingly, the rate at which the handle 992 returns to its home position corresponds to the rate at which the slider 930 moves in its deactuating direction under the force of the springs 996. This upward movement of the slider 930 also causes the damper body portion 922 to move upward, thereby driving the plunger 924 to the depressed position corresponding to the compressed state of the damper 920. As a result, the damper 920 resists the upward movement of the slider 930, thereby slowing the rate at which the handle 992 returns to its home position. Thus, the damper assembly 900 controls the deactuating speed of the trim assembly 980, thereby reducing the operational noise associated with such deactuation.

Figure 43:
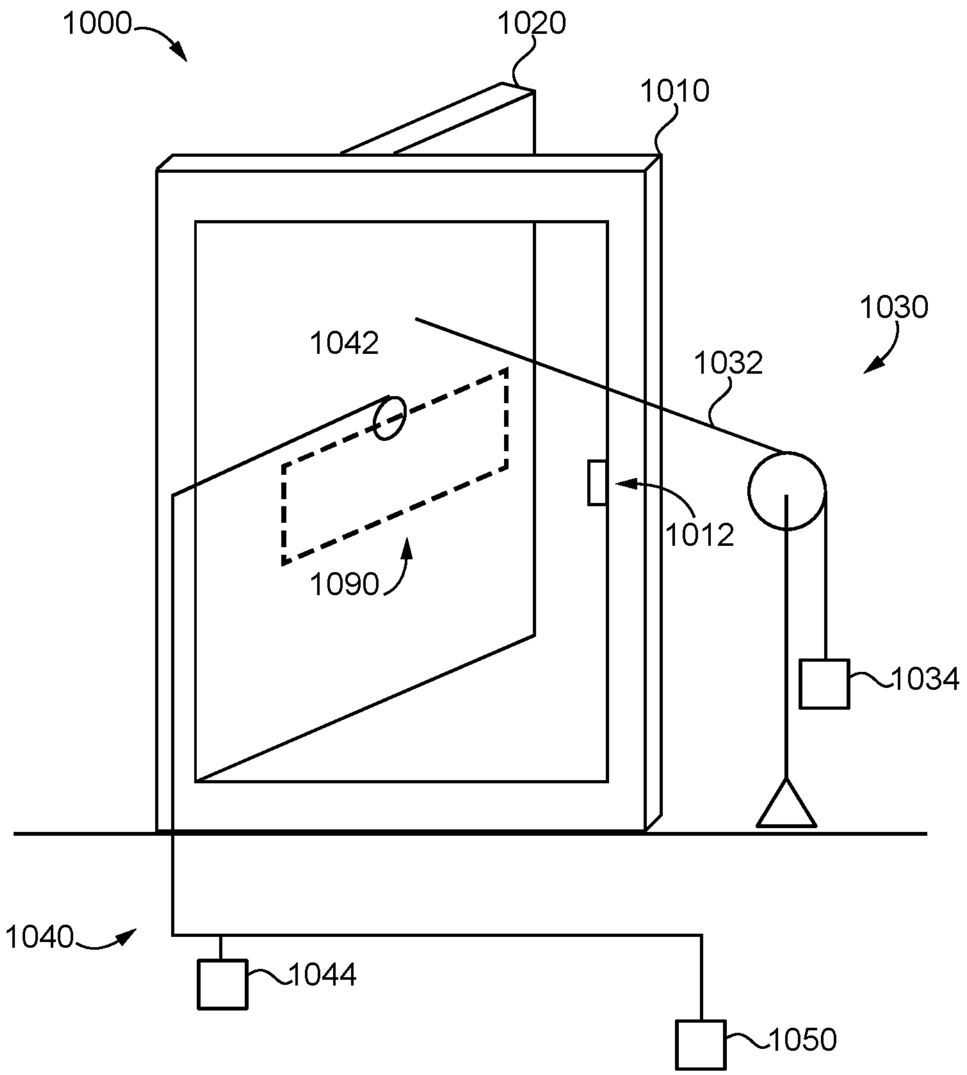
FIG. 43 illustrates a system for evaluating the sound output performance of door hardware.

With reference to FIG. 43, illustrated therein is a system 1000 for providing a standardized quantification of the noise generated by various types of door hardware 1090, such as the exit devices 100, 1100. The system 1000 includes a frame 1010, a swinging door 1020 pivotally mounted to the frame 1010, a pulley system 1030, a sensor assembly 1040, and a computing device 1050 in communication with the sensor assembly 1040.

The door 1020 includes mounting features that facilitate the mounting of various types of door hardware 1090, such as exit devices, hospital latches, and/or other types of hardware. The pulley system 1030 has a rope 1032 that can be coupled to the door 1020 and/or the door hardware 1090, such that a weight 1034 attached to the rope 1032 will cause an operational movement of the door 1020 and/or hardware 1090 as the weight 1034 drops under the force of gravity. The pulley system 1030 thereby quietly controls specific operational movements in a controlled fashion. The force exerted by the pulley system 1030 may be adjusted by attaching and detaching weights 1034. The pulley system 1030 provides a simple and repeatable method of quietly operating either the door hardware 1090 or the door 1020 itself. As will be appreciated, operational movements may be controlled by mechanisms other than the illustrated pulley system 1030, such as motorized and/or electronically-controlled mechanisms.

The sensor assembly 1040 includes a speed sensor 1042 and an acoustic sensor 1044. The speed sensor 1042 may be mounted to the door 1020 or a component of the hardware 1090 to measure the speed of the component to which it is mounted during an operational movement. The acoustic sensor 1044 is operable to sense the amplitude and frequency of noises generated during the operational movements, and is positioned a predetermined offset distance from the frame 1010. The computing device 1050 is configured to receive and interpret data from the sensor assembly 1040 such that the speed and acoustic data can be analyzed.

In certain embodiments, the offset distance may be constant for all types of door hardware and operational movements under evaluation, which may facilitate the like-for-like comparison of noise generation across different types of door hardware 1090 and operational movements. It is also contemplated that the offset distance may be specific to the type of door hardware 1090 and/or operational movement being evaluated, in which case the offset distance may vary from one test to the next. The offset distance may be measured with reference to any suitable reference point, such as the strike 1012 or the center of the door 1020 when the door is in a closed position. In certain forms, the offset distance may be defined in the metric system, such as an offset distance of one meter, two meters, or three meters. In other forms, the offset distance may be defined in the imperial system, such as an offset distance of three feet, five feet, or ten feet.

For certain types of operational movements, the speed sensor 1042 and computing device 1050 may be used to measure the speed of a moving component during the operational movement, thereby ensuring a repeatable input. For the tests in which the operational movement is to be provided with a given speed, multiple iterations of the operational movement may be performed. Acoustic sensor data associated with iterations in which the operational movement falls outside the specified range of speed may be discarded, and acoustic sensor data associated with iterations in which the operational movement falls within the specified range of speed may be used to quantify the sound performance of the hardware 1090 for the operational movement.

For exit devices, the operational movements to be analyzed with the system 1000 may take a number of forms. It has been found that three types of operational movements are particularly useful in evaluating the noise performance of exit devices: a drive assembly operational movement, in which the drive assembly is driven to its actuated state and permitted to return to its deactuated state under free release conditions; a door closing and relatching operational movement, in which the door is moved to a closed position and the latchbolt assembly actuates and deactuates as a result of engagement and disengagement with a strike; and a trim operational movement, in which the trim assembly is driven to its actuated state and permitted to return to its deactuated state under free release conditions. While these operational movements are described herein with specific reference to the exit device 100 illustrated in FIGS. 1-4, it is to be appreciated that the descriptions herein may be equally applicable to another form of exit device for which acoustic performance is to be evaluated.

For the drive assembly operational movement, the pushbar 132 may be moved from the extended position to the fully depressed position at a controlled rate of speed, such as 300 mm/s (+/−15 mm/s). The controlled rate of speed may, for example, be provided by the pulley assembly 1030 and monitored using the sensor assembly 1040 and the computing device 1050. The pushbar 132 may then be released such that the drive assembly 120 returns to the deactuated state under the force of the internal biasing mechanisms of the exit device 100, including the main spring 126. Noise generated during the pushbar actuation and free return operational movement may be sensed by the acoustic sensor 1044 and received by the computing device 1050.

For the door closing and relatching operational movement, the door 1020 is opened to a predetermined angle, such as approximately 30°. The door 1020 is then closed at a controlled rate of speed that may, for example, be provided by the pulley assembly 1030 and monitored using the sensor assembly 1040 and computing device 1050. It has been found that a closing speed of 1000 mm/s+/−50 mm/s is satisfactory, and that such a closing speed can be achieved with a weight 1034 of about two pounds. During the final closing movement of the door 1020, the latchbolt 152 is driven to the retracted position by a strike 1012 mounted to the frame 1010. As the door 1020 approaches the fully closed position, the latchbolt 152 clears the strike 1012 and returns to the extended position under the force of the internal biasing mechanisms of the exit device 100. Noise generated during the door closing and relatching operational movement may be sensed by the acoustic sensor 1044 and received by the computing device 1050.

For the trim assembly operational movement, the handle 192 is released from its fully rotated position, and is driven to its home position under the force of the internal springs of the trim assembly 180. Noise generated during the trim actuation and return operational movement may be sensed by the acoustic sensor 1044 and received by the computing device 1050.

As will be appreciated, the system 1000 may also be used to quantify sound performance for types of door hardware other than exit devices, including hospital-type latches, mechanical locks, and electromechanical locks. For some types of door hardware, each of the above-described operational movements may be evaluated. For example, door hardware including actuating paddles, such as hospital-type latches, may be evaluated for each of the above-described operational movements. For other types of hardware, such as mechanical locks and electromechanical locks, the pushbar actuation and return operational movement may be inapplicable, and alternative operational movements may be evaluated.

Data from the acoustic sensor 1044 may be used to quantify the acoustic performance of the door hardware 1090 as that acoustic performance is perceived by the human ear. In certain embodiments, the acoustic performance is evaluated based upon the peak instantaneous loudness as measured in sones. This metric was chosen over more commonly used sound metrics, such as decibels (dB), due to the fact that the sone unit of measure has been found to provide a more accurate representation of the sound level perceived by the human ear. The sone unit takes into account not only the sound pressure level, but also the frequency at which the sound pressure occurs. This is an important factor because the frequency plays a major role in how humans perceive the sound.

Another benefit of using this metric is that the sone unit is measured on a linear scale, whereas the decibel unit is measured on a logarithmic scale. For example, when the sound being evaluated is doubled, the measurement in sones will likewise double, while the measurement in decibels will increase by 10 dB. For many people, the linear scale is more intuitive than the logarithmic scale. Thus, the use of such a linear scale may facilitate the comparison of the noise generated by different types of door hardware and/or different operational movements.

The calculation of the loudness level in sones may be performed according to any of a number of methods known in the art. In certain embodiments, the loudness level may be calculated for room field or diffuse field conditions, whereas in other embodiments, the loudness level may be calculated for direct field or free field conditions. Additionally, the loudness level may be calculated based upon individual frequencies, or based upon frequency groups.

When evaluating the loudness of door hardware, it may be desirable that the peak instantaneous loudness generated during one or more operational movements fall within a target range. The target range for each of the operational movements includes a target maximum peak instantaneous loudness level. When evaluating exit devices with an offset distance of one meter, the following maximum peak instantaneous loudness levels are achievable and should be the target for the industry: pushbar actuation and free return: 30 sones; door closing and relatching: 25 sones; trim actuation and free release: 10 sones.

In certain circumstances, it may be desirable to reduce the noise generated during one or more operational movements without completely eliminating such noise. By way of example, it may be desirable that the relatching operational movement result in a quiet but audible noise, such as a click. Such an audible noise may provide an indication to the user that the relatching operational movement has been completed, and that the door is once again latched to the frame. Accordingly, the target range for one or more of the operational movements may have a non-zero target minimum peak instantaneous loudness level, such as 5 sones or 10 sones.

It has been found that the targets described above can be achieved by implementing one or more of the above-described noise reduction mechanisms into an exit device such as the exit device 100. Due to the modular nature of the above-described noise reduction mechanisms, the noise reduction mechanisms can be easily installed in various combinations and configurations to provide the exit device 100 with desired acoustic performance properties. Additionally, while the noise reduction mechanisms are illustrated and described herein as being configured for use with the exit device 100 illustrated in FIGS. 1-4, and the exit device 1100 illustrated in FIG. 25, it is to be appreciated that the principles described herein may be applied to achieve similar noise reductions for other types of door hardware, including other forms of exit devices.

Certain embodiments of the present application relate to an exit device, comprising: a mounting assembly configured for mounting to a face of a door, the mounting assembly including a channel member extending along a longitudinal axis; a drive assembly mounted to the mounting assembly for movement between a deactuated condition and an actuated condition; a latch control assembly mounted to the mounting assembly for movement between a deactuated state and an actuated state, the latch control assembly including a control component having a deactuated position and an actuated position, wherein the deactuated state of the latch control assembly includes the deactuated position of the control component, and wherein the actuated state of the latch control assembly includes the actuated position of the control component; a lost motion connection operably connecting the drive assembly and the latch control assembly, wherein the lost motion connection is configured to move the latch control assembly from the deactuated state to the actuated state in response to movement of the drive assembly from the deactuated condition to the actuated condition, and wherein the lost motion connection is configured to permit the latch control assembly to move between the actuated state and the deactuated state when the drive assembly is in the deactuated condition; a latchbolt mechanism operably coupled with the latch control assembly such that actuation of the latch control assembly causes a corresponding actuation of the latchbolt mechanism; and a fluid damper comprising a first member and a second member movably mounted to the first member, wherein the first member and the second member are movable relative to one another in a first direction and an opposite second direction, and wherein the fluid damper is configured to resist relative movement of the first member and the second member in the first direction; wherein the fluid damper is mounted adjacent the control component such that the control component engages the fluid damper and causes relative movement of the first member and the second member in the first direction as the control component moves from the actuated position to the deactuated position, thereby causing the fluid damper to resist movement of the control component toward the deactuated position such that a deactuating speed of the latch control assembly is reduced.

In certain embodiments, the first member is a body portion; wherein the second member is a plunger; wherein relative movement of the first member and the second member in the first direction comprises depression of the plunger; and wherein relative movement of the first member and the second member in the second direction comprises projection of the plunger.

In certain embodiments, the fluid damper further comprises an elastomeric bumper configured to dampen vibrations resulting from impact between the control component and the fluid damper.

In certain embodiments, the exit device further comprises a damper assembly including the fluid damper, the damper assembly further comprising: a housing bracket mounted to the mounting assembly, wherein the fluid damper is mounted to the housing bracket; and an interface member mounted to the control component, wherein the control component is configured to engage the fluid damper via the interface member.

In certain embodiments, the fluid damper is a rotary damper; wherein the first member is a body portion; wherein the second member is a gear rotatably mounted to the body portion; and wherein the interface member includes a gear rack engaged with the gear.

In certain embodiments, the fluid damper is a linear damper; wherein the first member is a body portion; wherein the second member is a plunger movably mounted to the body portion; and wherein the interface member includes a stop wall operable to engage the fluid damper.

In certain embodiments, the exit device further comprises a remote latching assembly including the latchbolt mechanism; wherein the latch control assembly comprises a longitudinally-moving control link, a laterally-moving connector link, a pivot crank correlating longitudinal movement of the control link with lateral movement of the connector link, and a rigid rod extending between and connecting the connector link and the latchbolt mechanism; and wherein the control member is the rigid rod.

In certain embodiments, the fluid damper is a rotary damper; wherein the first member comprises a body portion; wherein the second member comprises a pinion gear rotatably mounted to the body portion; wherein a gear rack is engaged with the gear and is mounted to one of the rigid rod or the mounting assembly; and wherein the body portion is mounted to the other of the rigid rod or the mounting assembly.

In certain embodiments, the fluid damper is a linear damper; wherein the first member is a body portion; wherein the second member is a plunger movably mounted to the body portion; wherein a stop member is mounted to one of the rigid rod or the mounting assembly; and wherein the stop member is configured to engage the linear damper as the rigid rod moves from the actuated position to the deactuated position.

In certain embodiments, the latch control assembly comprises a longitudinally-moving control link, a laterally-moving connector link, and a pivot crank correlating longitudinal movement of the control link with lateral movement of the connector link; and wherein the control member is one of the control link or the connector link.

In certain embodiments, the exit device further comprises a housing bracket defining a channel and a mount; wherein the housing bracket is formed of a non-metal material; wherein the housing bracket is mounted to the mounting assembly such that the connector link slides within the channel; and wherein the fluid damper is mounted to the mount such that the damper engages the connector link as the connector link moves from the actuated position to the deactuated position.

In certain embodiments, the exit device further comprises a stop member mounted to the connector link; wherein the damper is configured to engage the connector link via the stop member.

In certain embodiments, the fluid damper is configured to resist movement of the control component from the actuated position toward the deactuated position without resisting movement of the control component from the deactuated position toward the actuated position.

In certain embodiments, the fluid damper is a rotary damper comprising a unidirectional clutch.

In certain embodiments, the exit device further comprises a gear rack mounted to the control component; wherein the rotary damper further comprises a housing, a rotor rotatably mounted in the housing, a hydraulic fluid configured to resist rotation of the rotor relative to the housing, and a pinion gear coupled to the rotor via the one-way clutch; and wherein the pinion gear is engaged with the gear rack.

In certain embodiments, the fluid damper is engaged with the control component for unidirectional transmission of pushing forces.

In certain embodiments, the fluid damper is a one-way damper configured to resist relative movement of the first member and the second member in the first direction to a greater degree than the one-way damper resists relative movement of the first member and the second member in the second direction.

In certain embodiments, the exit device further comprises a second fluid damper, wherein the second fluid damper is engaged between the mounting assembly and the drive assembly and is configured to slow movement of the drive assembly from the actuated condition to the deactuated condition.

In certain embodiments, the fluid damper is configured to reduce the deactuating speed of the latch control assembly irrespective of the actuated/deactuated condition of the drive assembly.

In certain embodiments, the fluid damper is configured to not resist movement of the control component toward the actuated position such that an actuating speed of the latch control assembly is not materially altered.

Certain embodiments of the present application relate to an exit device, comprising: a mounting assembly mounted to a face of the door, the mounting assembly including a channel member extending along a horizontal axis; a drive assembly mounted to the mounting assembly, the drive assembly including a pushbar operable to actuate the drive assembly; a latch control assembly movably mounted to the mounting assembly, wherein the latch control assembly is operably connected with the drive assembly such that actuation of the drive assembly causes a corresponding actuation of the latch control assembly, wherein the latch control assembly comprises a rigid rod extending along a vertical axis, and wherein the rigid rod is configured to move in an actuating direction during actuation of the latch control assembly and to move in a deactuating direction opposite the actuating direction during deactuation of the latch control assembly; a remote latch mechanism vertically offset from the drive assembly, wherein the remote latch mechanism is biased toward a deactuated position, wherein the remote latch mechanism is operably connected to the rigid rod such that actuation of the latch control assembly causes a corresponding actuation of the remote latch mechanism, and such that deactuation of the remote latch mechanism causes a corresponding deactuation of the latch control assembly; and a fluid damper engaged between the mounting assembly and the rigid rod, wherein the fluid damper is configured to slow movement of the rigid rod in the deactuating direction, thereby slowing deactuation of the latch control assembly and the remote latch mechanism.

In certain embodiments, the fluid damper comprises a first member and a second member; wherein the first member is engaged with one of the rigid rod or the mounting assembly; wherein the second member is engaged with the other of the rigid rod or the mounting assembly; wherein the first member and the second member are coupled to one another for relative movement in an actuating direction and a deactuating direction opposite the actuating direction; wherein the fluid damper is engaged with the rigid rod and the mounting assembly such that deactuation of the latch control assembly causes relative movement of the first member and the second member in the deactuating direction; and wherein the fluid damper is configured to resist relative movement of the first member and the second member in the deactuating direction.

In certain embodiments, the exit device further comprises a damper assembly including the fluid damper, the damper assembly further comprising: a housing bracket mounted to the one of the rigid rod or the mounting assembly, wherein the first member is engaged with the one of the rigid rod or the mounting assembly via the housing bracket; and an interface member mounted to the other of the rigid rod or the mounting assembly, wherein the second member is engaged with the other of the rigid rod or the mounting assembly via the interface member.

In certain embodiments, the fluid damper is a rotary damper comprising a stator, a rotor rotatably mounted to the stator, a pinion gear operably connected with the rotor, and a hydraulic fluid configured to resist relative rotation of the rotor and the stator; wherein the first component comprises the stator; wherein the second component comprises the pinion gear; and wherein the interface member comprises a gear rack engaged with the pinion gear.

In certain embodiments, the rotary damper further comprises a one-way clutch; wherein the pinion gear is operably connected with the rotor via the one-way clutch; wherein the one-way clutch is configured to couple the pinion gear and the rotor for joint rotation in the deactuating direction; and wherein the one-way clutch is configured to rotationally decouple the pinion gear from the rotor in response to rotation of the pinion gear in the actuating direction.

In certain embodiments, the fluid damper is a linear damper comprising a body portion and a plunger; wherein one of the first member or the second member comprises the body portion; wherein the other of the first member or the second member comprises the plunger; and wherein the interface member comprises a stop wall operable to engage the second member during deactuation of the latch control assembly.

In certain embodiments, one of the stop wall or the second member comprises an elastomeric bumper configured to dampen impact between the stop wall and the second member.

In certain embodiments, the mounting assembly further comprises a guide bracket configured to guide the rigid rod for movement along the vertical axis, and wherein one of the housing bracket or the interface member is mounted to the guide bracket.

Certain embodiments of the present application relate to an exit device, comprising: a pushbar assembly including a manually-actuated pushbar having a projected position and a depressed position; a vertical rod connected with the pushbar assembly such that movement of the pushbar from the projected position to the depressed position moves the vertical rod in an actuating direction, wherein the rod is operable to move in a deactuating direction opposite the actuating direction; a latch mechanism vertically offset from the pushbar assembly, wherein the latch mechanism is operably coupled with the rod such that the latch mechanism is actuated in response to movement of the rod in the actuating direction, and wherein the latch mechanism is configured to move the rod in the deactuating direction during deactuation of the latch mechanism; and a fluid damper having a first member and a second member movably coupled to the first member, wherein the fluid damper is configured to resist relative movement of the first member and the second member in a first direction of relative movement; wherein the rod is engaged with the fluid damper such that movement of the rod in the deactuating direction causes relative movement of the first member in the second member in the first direction of relative movement, thereby causing the fluid damper to resist movement of the rod in the deactuating direction.

In certain embodiments, the first member is engaged with the rod via one of an interface member or a housing bracket; wherein the second member is engaged the other of the interface member or the housing bracket; wherein the one of the interface member or the housing bracket is secured to the rod; and wherein the other of the interface member or the housing bracket has a fixed position relative to the pushbar assembly.

In certain embodiments, the one of the interface member or the housing bracket is releasably secured to the rod such that the one of the interface member or the housing bracket has an adjustable position relative to the rod.

In certain embodiments, the fluid damper is a rotary damper comprising a stator, a rotor rotatably mounted to the stator, a pinion gear engaged with the rotor, and a hydraulic fluid resisting relative rotation of the rotor and the stator.

In certain embodiments, the first member comprises the pinion gear; wherein the second member comprises the stator; and wherein the interface member comprises a rack gear engaged with the pinion gear.

In certain embodiments, the rotary damper further comprises a one-way clutch; wherein the pinion gear is engaged with the rotor via the one-way clutch; wherein the one-way clutch is configured to rotationally couple the pinion gear and the rotor during relative rotation of the first member and the second member in the first direction of relative movement; and wherein the one-way clutch is configured to rotationally decouple the pinion gear and the rotor during relative movement of the first member and the second member in a second direction of relative movement opposite the first direction of relative movement.

In certain embodiments, the fluid damper is a linear damper comprising a body portion and a plunger; wherein the first member comprises one of the body portion or the plunger; wherein the second member comprises the other of the body portion or the plunger; wherein the interface member comprises a stop wall; and wherein an elastomeric bumper is positioned between the first member and the stop wall.

In certain embodiments, the fluid damper is configured to permit the rod to move in the actuating direction without resisting movement of the rod in the actuating direction.

Certain embodiments of the present application relate to a system, comprising: a latchbolt having an extended position and a retracted position, wherein the latchbolt is biased toward the extended position; a latch control assembly operably connected with the latchbolt, the latch control assembly having an actuating movement in which the latch control assembly retracts the latchbolt, the latch control assembly having a deactuating movement in which the latch control assembly permits the latchbolt to extend; a manual actuator operably connected with the latch control assembly and operable to drive the latch control assembly in the actuating movement; and slowing means engaged with the latch control assembly, wherein the slowing means is configured to slow the deactuating movement of the latch control assembly.

In certain embodiments, the slowing means is configured to slow the deactuating movement of the latch control assembly without slowing the actuating movement of the latch control assembly.

In certain embodiments, the slowing means comprises a fluid damper configured to engage a moving component of the latch control assembly during the deactuating movement.

In certain embodiments, the slowing means comprises a damping grease applied to the latch control assembly.

Certain embodiments of the present application relate to a trim assembly, comprising: a housing assembly including an escutcheon; a handle mounted to the escutcheon for rotation in a handle actuating direction and a handle deactuating direction opposite the handle actuating direction; a slider mounted to the housing assembly for linear movement in a slider actuating direction and a slider deactuating direction opposite the slider actuating direction, wherein the slider is biased in the slider deactuating direction; a cam coupled with the handle and engaged with the slider, wherein the cam is configured to drive the slider in the slider actuating direction in response to rotation of the handle in the handle actuating direction, and is configured to drive the handle in the handle deactuating direction in response to movement of the slider in the slider deactuating direction; and a fluid damper engaged between the housing assembly and the slider, wherein the fluid damper is configured to resist movement of the slider in the slider deactuating direction, thereby slowing movement of the handle in the handle deactuating direction.

In certain embodiments, the slider comprises a lift finger configured to engage an exit device to retract a latchbolt when driven in the slider actuating direction.

In certain embodiments, the fluid damper is a linear damper comprising a first member and a second member movably coupled with the first member, the linear damper having an expanded state and a compressed state; wherein the linear damper is biased toward the expanded state, wherein the first member is operable to engage the housing assembly; and wherein the second member is operable to engage the slider.

In certain embodiments, the linear damper is engaged with one of the housing assembly or the slider via a unidirectional engagement such that the linear damper resists movement of the slider in the slider deactuating direction and does not resist movement of the slider in the slider actuating direction.

In certain embodiments, the housing assembly further comprises a pair of rods and a first base plate; wherein the slider is slidably mounted to the pair of rods; wherein the first base plate comprises a pair of openings through which the pair of rods extend; and wherein the first base plate further comprises a first pair of spring tabs engaged with the pair of rods such that the first pair of spring tabs reduce rattling of the rods during operation of the trim assembly.

In certain embodiments, the housing assembly further comprises a second base plate; and wherein the second base plate comprises a second pair of spring tabs engaged with the pair of rods such that the second pair of spring tabs further reduce rattling of the rods during operation of the trim assembly.

Certain embodiments of the present application relate to a trim assembly, comprising: a housing assembly, comprising: an escutcheon; a base plate mounted to the escutcheon such that an open space is formed therebetween; and a pair of rods mounted in the escutcheon, wherein a portion of each rod is positioned in the open space formed between the base plate and the escutcheon; a handle rotatably mounted to the escutcheon; a slider mounted to the pair of rods, wherein the slider is operable to slide along the rods in an actuating direction and a deactuating direction opposite the actuating direction; a pair of springs mounted to the pair of rods, wherein each spring is mounted to a corresponding and respective one of the rods such that the springs bias the slider in the deactuating direction; and a cam mounted to the handle, wherein the cam is configured to drive the slider in the actuating direction in response to rotation of the handle; wherein the base plate includes a pair of spring tabs projecting into the open space, wherein each spring tab is engaged with a corresponding and respective rod such that the spring tabs inhibit rattling of the rods.

In certain embodiments, the base plate further comprises a pair of openings, each rod extending through a corresponding and respective one of the openings.

In certain embodiments, the rods are vertically oriented, and wherein the spring tabs are engaged with upper end portions of the rods.

In certain embodiments, the trim assembly further comprises a second base plate including a pair of second spring tabs, wherein each of the second spring tabs engages a corresponding and respective one of the rods such that the second spring tabs aid in inhibiting rattling of the rods.

In certain embodiments, each of the springs is positioned between a corresponding and respective one of the spring tabs and a corresponding and respective one of the second spring tabs.

In certain embodiments, the trim assembly further comprises a fluid damper engaged between the slider and the housing assembly, wherein the fluid damper is configured to resist movement of the slider in the deactuating direction.

Certain embodiments of the present application relate to a strike module, comprising: a housing comprising a first housing limb, a second housing limb, and a connecting portion extending between and connecting the first housing limb and the second housing limb, wherein the first housing limb comprises a first pocket, and wherein the second housing limb comprises a second pocket; a damping arm pivotably mounted to the housing for movement in a first direction and a second direction opposite the first direction, the damping arm comprising a first damping arm limb adjacent the first housing limb, a second damping arm limb adjacent the second housing limb, and a contact bar extending between and connecting the first damping arm limb and the second damping arm limb; a rotational damper mounted in the first pocket and engaged with the first limb such that the rotational damper resists pivoting of the damping arm in the first direction; and a bias mechanism mounted in the second pocket and engaged with the second limb such that the bias mechanism urges the damping arm in the second direction.

In certain embodiments, the rotational damper is a rotary damper comprising a stator rotationally coupled with the first housing limb, a rotor rotatably mounted to the stator, a hydraulic fluid configured to resist relative rotation of the rotor and the stator, and a shaft engaged with the rotor and rotationally coupled with the first limb.

In certain embodiments, the rotary damper further comprises a one-way clutch, wherein the shaft is engaged with the rotor via the one-way clutch such that rotation of the output shaft in the first direction is transmitted to the rotor and rotation of the shaft in the second direction is not transmitted to the rotor.

In certain embodiments, the housing comprises an adhesive for mounting the housing to a strike.

In certain embodiments, the first arm is pivotally supported by the output shaft, and wherein the second arm is pivotally supported by a post of the bias mechanism.

In certain embodiments, the post is rotationally coupled with the second damping arm limb and is rotatably supported by the second housing limb; and wherein the bias mechanism further comprises a torsion spring seated in the second pocket and engaged between the post and the second housing limb such that the torsion spring biases the post in the second direction.

Certain embodiments of the present application relate to a strike assembly including the strike module, the strike assembly further comprising a strike, the strike comprising: a strike plate secured to the housing; and a roller rotatably mounted to the strike plate, wherein the roller is received between the first housing arm and the second housing arm and is parallel to the connecting portion.

In certain embodiments, the damping arm has a first position in which the contact bar is adjacent the roller, wherein the damping arm has a second position in which the contact bar is adjacent the connecting portion, wherein the damping arm is operable to pivot from the first position toward the second position in the first direction, and wherein the damping arm is operable to pivot from the second position toward the first position in the second direction.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A trim assembly, comprising:

a housing assembly, comprising:

an escutcheon;

a first base plate mounted to the escutcheon, wherein the first base plate comprises a first single-piece structure defining:

a first plate portion;

a first tab extending from the first plate portion and comprising a first tab aperture; and a first spring tab extending from the first base plate in a longitudinal direction, the first spring tab comprising a first edge that extends transverse to the longitudinal direction;

a second base plate mounted to the escutcheon and separable from the first base plate, wherein the second base plate comprises a second single-piece structure defining:

a second plate portion; and a second spring tab extending from the second base plate in the longitudinal direction, the second spring tab comprising a second edge that extends transverse to the longitudinal direction; and a first rod mounted in the escutcheon, wherein the first rod extends through the first tab aperture in the longitudinal direction and comprises a first end portion and a second end portion opposite the first end portion, wherein the first edge resiliently engages the first end portion of the first rod and thereby reduces rattling of the first rod, and wherein the second edge resiliently engages the second end portion of the first rod and thereby further reduces rattling of the first rod;

a slider mounted to the first rod, wherein the slider is operable to slide along the first rod in an actuating direction and a deactuating direction opposite the actuating direction;

a first spring mounted to the first rod and biasing the slider in the deactuating direction; and an actuator movably mounted to the escutcheon, wherein actuation of the actuator drives the slider in the actuating direction.

2. The trim assembly of claim 1, further comprising:

a second rod to which the slider is slidably mounted; and a second spring mounted to the second rod and biasing the slider in the deactuating direction;

wherein the first base plate further comprises an additional spring tab and an additional tab including an additional tab aperture;

wherein the second rod extends through the additional tab aperture; and wherein the additional spring tab resiliently engages the second rod such that the additional spring tab reduces rattling of the second rod.

3. The trim assembly of claim 1, wherein the first plate portion is spaced apart from the escutcheon such that an open space is formed between the first plate portion and the escutcheon; and wherein the first tab extends from the first plate portion into the open space.

4. The trim assembly of claim 1, further comprising a damper configured to slow movement of the slider in the deactuating direction.

5. The trim assembly of claim 4, wherein the damper is engaged with the slider via a unidirectional engagement.

6. The trim assembly of claim 1, wherein the first spring tab extends obliquely relative to the first plate portion.

7. The trim assembly of claim 1, wherein each of the first spring tab and the second spring tab extends at least primarily in the longitudinal direction.

8. The trim assembly of claim 1, wherein the rod, the first spring tab, and the second spring tab are colinear in plan view.

9. The trim assembly of claim 1, wherein the first edge defines an end of the first spring tab; and wherein the second edge defines an end of the second spring tab.

10. The trim assembly of claim 1, wherein each of the first spring tab and the second spring tab urges the first rod into contact with the escutcheon.

11. A trim assembly, comprising:

an escutcheon;

a first base plate mounted in the escutcheon, the first base plate comprising a first opening and a second opening;

a second base plate mounted in the escutcheon, wherein the second base plate is separable from the first base plate;

a first rod extending through the first opening in a longitudinal direction;

a second rod extending through the second opening in the longitudinal direction a slider movably mounted to the first rod and the second rod;

an actuator operable to drive the slider along the first rod and the second rod;

a first pair of spring tabs extending from the first base plate in the longitudinal direction, the first pair of spring tabs extending obliquely from the first base plate and each spring tab of the first pair of spring tabs comprising a corresponding and respective first edge that extends transverse to the longitudinal direction, wherein each first edge is resiliently engaged with a first end portion of a corresponding one of the first rod or the second rod to thereby reduce rattling of the corresponding one of the first rod or the second rod, and wherein the first pair of spring tabs is integrally formed with the first base plate as a first monolithic structure; and a second pair of spring tabs extending obliquely from the second base plate, wherein each spring tab of the second pair of spring tabs comprises a corresponding and respective second edge that extends transverse to the longitudinal direction, wherein each second edge is resiliently engaged with a second end portion of a corresponding one of the first rod or the second rod to thereby reduce rattling of the corresponding one of the first rod or the second rod, and wherein the pair of second spring tabs is integrally formed with the second base plate as a second monolithic structure.

12. The trim assembly of claim 11, wherein the rod, the first spring tab, and the second spring tab are colinear in plan view.

13. The trim assembly of claim 11, wherein each of the first spring tab and the second spring tab extends at least primarily in the longitudinal direction.

14. The trim assembly of claim 11, wherein each first edge defines an end of the corresponding first spring tab; and wherein each second edge defines an end of the corresponding second spring tab.

15. A trim assembly, comprising:

an escutcheon;

a base plate mounted in the escutcheon, the base plate comprising a pair of openings;

a second base plate mounted in the escutcheon and separable from the first base plate;

a pair of rods, each extending through a corresponding opening of the pair of openings in a longitudinal direction, each rod including a first end portion and a second end portion opposite the first end portion;

a slider movably mounted to the pair of rods;

an actuator operable to drive the slider along the pair of rods;

a pair of first spring tabs integrally formed with the first base plate and extending from the first base plate in the longitudinal direction, each of the first spring tabs respectively comprising:

a first base at which the first spring tab is joined to the first base plate; and a first edge opposite the first base such that each first spring tab (a) extends longitudinally between the first base thereof and the first edge thereof, and (b) terminates at the first edge thereof;

a pair of second spring tabs integrally formed with the second base plate and extending from the second base plate in the longitudinal direction, each of the second spring tabs respectively comprising:

a second base at which the second spring tab is joined to the second base plate; and a second edge opposite the second base such that each second spring tab (a) extends longitudinally between the second base thereof and the second edge thereof, and (b) terminates at the second edge thereof;

wherein each of the first edges extends transverse to the longitudinal direction and is engaged with the first end portion of a corresponding rod of the pair of rods to thereby discourage rattling of the corresponding rod; and wherein each of the second edges extends transverse to the longitudinal direction and is engaged with the second end portion of a corresponding rod of the pair of rods to thereby further discourage rattling of the corresponding rod.

16. The trim assembly of claim 15, wherein each of the first spring tabs is defined by a corresponding and respective portion of the first base plate; and wherein each of the second spring tabs is defined by a corresponding and respective portion of the second base plate.

17. The trim assembly of claim 15, wherein each rod of the pair of rods is colinear in plan view with the corresponding first spring tab and the corresponding second spring tab.

18. The trim assembly of claim 15, wherein each first spring tab extends obliquely relative to the first base plate; and wherein each second spring tab extends obliquely relative to the second base plate.

19. The trim assembly of claim 15, wherein each first spring tab and each second spring tab extends at least primarily in the longitudinal direction.

* * * * *